United States Patent
Itagaki et al.

(10) Patent No.: US 11,802,328 B2
(45) Date of Patent: *Oct. 31, 2023

(54) FE-BASED AMORPHOUS ALLOY RIBBON, IRON CORE, AND TRANSFORMER

(71) Applicant: PROTERIAL, LTD., Tokyo (JP)

(72) Inventors: Hajime Itagaki, Tokyo (JP); Morifumi Kuroki, Tokyo (JP); Makoto Sasaki, Tokyo (JP); Shin Nakajima, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 127 days.

This patent is subject to a terminal disclaimer.

(21) Appl. No.: 17/619,756

(22) PCT Filed: Jun. 24, 2020

(86) PCT No.: PCT/JP2020/024910
§ 371 (c)(1),
(2) Date: Dec. 16, 2021

(87) PCT Pub. No.: WO2020/262493
PCT Pub. Date: Dec. 30, 2020

(65) Prior Publication Data
US 2022/0375666 A1 Nov. 24, 2022

(30) Foreign Application Priority Data

Jun. 28, 2019 (JP) .................................. 2019-121525
Sep. 30, 2019 (JP) .................................. 2019-178568
(Continued)

(51) Int. Cl.
*C22C 45/00* (2023.01)
*C21D 8/12* (2006.01)
(Continued)

(52) U.S. Cl.
CPC .......... *C22C 45/008* (2013.01); *B23K 26/362* (2013.01); *C21D 8/1294* (2013.01);
(Continued)

(58) Field of Classification Search
None
See application file for complete search history.

(56) References Cited

U.S. PATENT DOCUMENTS 4,685,980 A  8/1987 Sato et al.
4,724,015 A  2/1988 Sato et al.
(Continued)

FOREIGN PATENT DOCUMENTS

EP  0897016 A1  2/1999
JP  S5797606 A  6/1982
(Continued)

OTHER PUBLICATIONS

International Search Report issued in PCT/JP2020/024910, dated Sep. 29, 2020, 2 pages.
(Continued)

*Primary Examiner* — Brian D Walck
(74) *Attorney, Agent, or Firm* — Meunier Carlin & Curfman LLC

(57) ABSTRACT

An Fe-based amorphous alloy ribbon reduced in an iron loss in a condition of a magnetic flux density of 1.45 T is provided. One aspect of the present disclosure provides an Fe-based amorphous alloy ribbon. The Fe-based amorphous alloy ribbon has continuous linear laser irradiation marks on at least one surface. The linear laser irradiation marks are formed along a direction orthogonal to a casting direction of the Fe-based amorphous alloy ribbon. Each linear laser irradiation mark has unevenness on its surface. When the unevenness is evaluated in the casting direction, a difference HL between a highest point and a lowest point in the
(Continued)

thickness direction of the Fe-based amorphous alloy ribbon is 0.25 μm to 2.0 μm.

19 Claims, 29 Drawing Sheets

(30) Foreign Application Priority Data

Feb. 17, 2020 (JP) ................................ 2020-024119
Mar. 25, 2020 (JP) ................................ 2020-054544

(51) Int. Cl.
*B23K 26/362* (2014.01)
*C22C 45/02* (2006.01)
*H01F 1/153* (2006.01)
*H01F 27/25* (2006.01)
*H01F 27/255* (2006.01)
*H01F 30/10* (2006.01)
*H01F 30/12* (2006.01)

(52) U.S. Cl.
CPC ......... *C22C 45/02* (2013.01); *H01F 1/15308* (2013.01); *H01F 27/25* (2013.01); *H01F 27/255* (2013.01); *H01F 30/10* (2013.01); *H01F 30/12* (2013.01)

(56) References Cited

U.S. PATENT DOCUMENTS

| | | | |
|---|---|---|---|
| 7,744,703 | B2 | 6/2010 | Imai et al. |
| 8,198,973 | B2 | 6/2012 | Fukui et al. |
| 9,290,831 | B2 | 3/2016 | Yoshizawa et al. |
| 10,468,182 | B2 | 11/2019 | Yoshizawa et al. |
| 2008/0068121 | A1 | 3/2008 | Fukui et al. |
| 2010/0043927 | A1 | 2/2010 | Makino |
| 2012/0154084 | A1 | 6/2012 | Yoshizawa et al. |
| 2013/0098507 | A1 | 4/2013 | Omura et al. |
| 2013/0314198 | A1 | 11/2013 | Yoshizawa et al. |
| 2014/0034193 | A1 | 2/2014 | Duman et al. |
| 2016/0035474 | A1* | 2/2016 | Azuma .............. B23K 26/0622 29/605 |
| 2016/0276081 | A1 | 9/2016 | Omura et al. |
| 2022/0364212 | A1* | 11/2022 | Itagaki .................. C21D 8/1294 |

FOREIGN PATENT DOCUMENTS

| | | | |
|---|---|---|---|
| JP | S60233804 | A | 11/1985 |
| JP | S61258404 | A | 11/1986 |
| JP | H0253935 | B1 | 11/1990 |
| JP | H0332886 | B2 | 5/1991 |
| JP | H0332888 | B2 | 5/1991 |
| JP | 2005072160 | A | 3/2005 |
| JP | 2008071982 | A | 3/2008 |
| JP | 2012031498 | A | 2/2012 |
| JP | 2012174824 | A | 9/2012 |
| JP | 2012199506 | A | 10/2012 |
| JP | 2017054896 | A | 3/2017 |
| TW | I535861 | B | 6/2016 |
| WO | 2011/030907 | A1 | 3/2011 |

OTHER PUBLICATIONS

International Search Report issued in PCT/JP2020/024911, dated Sep. 29, 2020, 2 pages.
Notice of Reasons for Refusal dated May 24, 2022 in the corresponding Japanese Patent Application No. 2020-563568 (with English translation) (10 pages).
Amendment filed Aug. 9, 2022 in the corresponding Japanese Patent Application No. 2020-563568 (with English translation) (6 pages).
Decision to grant a patent dated Nov. 8, 2022 in the corresponding Japanese Patent Application No. 2020-563568 (with English translation) (5 pages).
Office Action for Philippine Patent Application No. 1-2021-553193 dated Mar. 20, 2023 (8 pages).
Office Action for Philippine Patent Application No. 1-2021-553195 dated Mar. 20, 2023 (6 pages).
Office Action for Indonesian Patent Application No. P00202200667 dated Apr. 3, 2023 (with English summary) (4 pages).
Office Action for Japanese Patent Application No. 2022-026130 dated May 30, 2023 (with English summary) (6 pages).
Non-final Office Action dated May 15, 2023 in U.S. Appl. No. 17/620,284.
Notice of Reasons for Refusal dated May 24, 2022 in JP2020-563569 (with machine-generated English translation).
Notice of Reasons for Refusal dated May 24, 2022 in JP2020-563568 (with machine-generated English translation).
Extended European Search Report dated Jul. 18, 2022 for EP Patent Application No. 20831189.4.
Extended European Search Report dated Jul. 19, 2022 for EP Patent Application No. 20832876.5.
Office Action with machine translation dated Sep. 2, 2022 for Taiwan Patent Application No. 109121628.
Explanation of Circumstances Concerning Accelerated Examination submitted on Dec. 2, 2021 in the corresponding Japanese Patent Application No. 2020-563568.
Explanation of Circumstances Concerning Accelerated Examination submitted on Dec. 2, 2021 in the corresponding Japanese Patent Application No. 2020-563569.
Notice of Reasons for Refusal dated Jan. 18, 2022 in the corresponding Japanese Patent Application No. 2020-563568.
Notice of Reasons for Refusal dated Jan. 11, 2022 in the corresponding Japanese Patent Application No. 2020-563569.
International Preliminary Report on Patentability (Form PCT/IB/373) and Written opinion of the international searching authority (Form PCT/ISA/237) issued in PCT/JP2020/024910.
International Preliminary Report on Patentability (Form PCT/IB/373 ) and Written opinion of the international searching authority (Form PCT/ISA/237) issued in PCT/JP2020/024911.

* cited by examiner

100 μm

100 μm

100 μm

100 μm

100 μm

FE-BASED AMORPHOUS ALLOY RIBBON, IRON CORE, AND TRANSFORMER

CROSS-REFERENCE TO RELATED APPLICATION

This international application claims priorities based on Japanese Patent Application No. 2019-121525 filed on Jun. 28, 2019, Japanese Patent Application No. 2020-024119 filed on Feb. 17, 2020, Japanese Patent Application No. 2020-054544 filed on Mar. 25, 2020, and Japanese Patent Application No. 2019-178568 filed on Sep. 30, 2019 with the Japan Patent Office, the entire contents of each of which being herein incorporated by reference in their entireties.

TECHNICAL FIELD

The present disclosure relates to an Fe-based amorphous alloy ribbon, an iron core, and a transformer.

BACKGROUND ART

Fe-based amorphous (non-crystalline) alloy ribbons have become increasingly popular as iron core materials for transformers.

As methods of reducing an anomalous eddy current loss of the Fe-based amorphous alloy ribbon, a method of mechanically scratching a surface of the Fe-based amorphous alloy ribbon, and a method of segmenting the magnetic domain of the Fe-based amorphous alloy ribbon by irradiating a surface of the Fe-based amorphous alloy ribbon with a laser light to locally melt and rapidly solidify the surface, a laser scribing method, are known.

With respect to the laser scribing method, for example, Japanese Examined Patent Application Publication No. H03-32886 discloses a method of segmenting the magnetic domain by irradiating an amorphous alloy ribbon with a pulse laser in its width direction to locally and instantaneously melt a surface of the amorphous alloy ribbon, and then rapidly solidifying the melted surface to form amorphized spots in lines.

Japanese Unexamined Patent Application Publication No. S61-258404 discloses that a laser light is swept to irradiate the ribbon in a width direction of the ribbon while a surface temperature of the ribbon is 300° C. or more.

Japanese Examined Patent Application Publication No. H2-053935 discloses that a ribbon is locally heated to form strip-shaped crystalized regions in which the strips are arranged in lines in a longitudinal direction of this ribbon at intervals of from 2 to 100 mm, each with an angle, with respect to the width direction of the ribbon, of 30 degrees or less, and a d/D ratio, the ratio of an average depth d of each of the regions in a thickness direction of the ribbon and the thickness D of the ribbon, is made to be 0.1 or more; and also at the same time, these regions occupy 8% by volume or less of the ribbon.

Transformers are used in various sizes, from small transformers to large transformers, with various configurations in every aspect of living environment. Due to such a large usage, the transformers have become major contributors to a problem of power loss; therefore, there has always been a demand for reducing the loss in the transformers. There are standards in each country in the world to reduce the loss. Examples of major standards include JIS C 4304: 2013 and JIS C 4306: 2013 from the Japanese "Top-runner program"; DOE Standard of the US Department of Energy 10 CFR Part 431.196; the Commission Regulation (EU) No. 548/2014, the National Standard of China GB 20052-2013; and Indian Standard IS 1180 (Part 1): 2018, all of which update the allowable loss or the energy efficiency more strictly in every regular revision. In response to these standards, high-efficiency transformers with less loss are widely available.

A transformer includes an iron core and a winding as major components. Generally, a grain oriented electrical steel sheet is commonly used for the iron core. However, as a material that causes a lower loss than the grain oriented electrical steel sheet, there is also an Fe-based amorphous alloy ribbon. An iron core that is made of this Fe-based amorphous alloy ribbon is also used for the transformer.

The loss of the transformer largely includes a no-load loss (iron loss) and a load loss (copper loss). A constant amount of the no-load loss is produced at the iron core at all times regardless of a load current of the transformer. The load loss is produced at the winding proportionally to the square of the load current. Considerations have been repeatedly made to reduce both of the losses, but further reductions are still required although some improvements have been achieved.

Some methods have been proposed to reduce the no-load loss of the transformer.

Japanese Unexamined Patent Application Publication No. 2017-054896 discloses that, to obtain an efficient iron core with a reduced no-load loss, a wound iron core made of an amorphous material is used; a joint structure of an iron core on an inner circumference of the wound iron core is an overlap joint, a joint structure of an iron core on an outer circumference of the wound iron core is a step lap joint, and the iron core on the inner circumference having the overlap joint structure occupy 32% to 62% of the wound iron core.

Japanese Unexamined Patent Application Publication No. 2008-071982 discloses a transformer that includes an iron core made by forming a multi-layered amorphous alloy ribbon into a ring-shape, and a winding for excitation. An insulation thin film is formed on a surface of the amorphous alloy ribbon forming the iron core, which can help inhibit an increase in an eddy current loss and reduce the no-load loss of the transformer.

Japanese Unexamined Patent Application Publication No. 2005-072160 discloses a three-phase five-leg wound iron core transformer, in which magnetic materials for the wound iron core include both an amorphous alloy ribbon and an electrical steel sheet. Specifically, in this three-phase five-leg wound iron core transformer, wound iron cores on the outer side each of which are coupled only to one winding are electrical steel sheets; another wound iron core in the middle which is coupled to two windings is an amorphous alloy ribbon. With this structure, it is aimed to provide an amorphous alloy ribbon wound iron core and a three-phase five-leg wound iron core transformer that require no reinforcing materials for holding the windings, reduce man-hours and material costs of an assembling work due to its compactness, and achieve less no-load losses than a structure that has magnetic materials only including electrical steel sheets.

PRIOR ART DOCUMENTS

Patent Documents

Patent Document 1: Japanese Examined Patent Application Publication No. H03-32886
Patent Document 2: Japanese Unexamined Patent Application Publication No. S61-258404
Patent Document 3: Japanese Examined Patent Application Publication No. H02-53935

Patent Document 4: Japanese Unexamined Patent Application Publication No. 2017-54896
Patent Document 5: Japanese Unexamined Patent Application Publication No. 2008-71982
Patent Document 6: Japanese Unexamined Patent Application Publication No. 2005-72160

SUMMARY OF THE INVENTION

Problems to be Solved by the Invention

The iron loss of an Fe-based amorphous alloy ribbon has been conventionally measured commonly in a condition of a magnetic flux density of 1.3 T (see, for example, respective Examples in Japanese Examined Patent Application Publication No. H03-02886, Japanese Unexamined Patent Application Publication No. S61-258404, and Japanese Examined Patent Application Publication No. H02-53935).

However, not the iron loss in a condition of a magnetic flux density of 1.3 T, but the iron loss in a condition of a magnetic flux density of 1.45 T have been recently demanded to be reduced in some cases in view of, for example, downsizing of a transformer produced with an Fe-based amorphous alloy ribbon.

In addition, the conventional method of irradiating a laser light uses a pulse laser, which is a method of forming dotted irradiation marks. The method that uses a pulse laser has a problem with productivity, which leads to increased costs.

A surface figure of the amorphous alloy ribbon may be largely deformed due to a laser irradiation. If the deformation is large, then the lamination factor of the amorphous alloy ribbon becomes low when formed into a core by, for example, winding and layering. Such a large deformation of the surface figure of the amorphous alloy ribbon is not preferable in terms of core characteristics. Desired characteristics of the iron core also cannot be obtained due to crystallization if a crystalized region is formed by locally heating the ribbon.

As mentioned above, the power losses of the transformer mainly include the no-load loss produced in the iron core and the load loss produced in the winding. To reduce the no-load loss of the transformer, it has been considered to use an Fe-based amorphous alloy ribbon that produces small iron loss. Particularly in a case of a distribution transformer, it is known that an average equivalent load factor that corresponds to an annual effective value of the load rate is as low as 15% as disclosed in "An Evaluation of Amorphous Transformer using Load Curve Pattern Model for Pole Transformer" by Takagi, Yamamoto, and Yamaji published in The Transactions of the Institute of Electrical Engineering of Japan B, A publication of Power and Energy Society, P 885-892, Vol. 128 No. 6, 2008, or disclosed in Final Report, LOT 2: Distribution and power transformers Tasks 1-7 2010/ETE/R/106, January 2011. Thus, transformers using Fe-based amorphous alloy ribbons that produce small no-load loss are highly effective in view of an energy saving and a reduction of $CO_2$ emission.

As shown in Tables 1 and 2 of JIS C2534:2017 (corresponding IEC Standards: IEC60404-8-11), the Fe-based amorphous alloy ribbons for the iron core of the transformer are broadly divided into two grades of materials, conventional grade and high flux density grade, each grade includes 16 types categorized based on the maximum iron loss and the minimum lamination factor. The Fe-based amorphous alloy ribbon with the least iron loss has a maximum iron loss of 0.08 W/kg at a frequency of 50 Hz and a magnetic flux density of 1.3 T; and a maximum iron loss of 0.11 W/kg at a frequency 60 Hz and the magnetic flux density of 1.3 T. However, it is necessary to use an Fe-based amorphous alloy ribbon that has less iron loss than one just mentioned above to obtain a transformer with higher efficiency.

The aforementioned laser scribing method has been tested to reduce the iron loss of the amorphous alloy ribbon, however, it has not yet reached the minimum iron loss shown in Tables 1 and 2 of JIS C2534:2017 (for example, see embodiments in Japanese Examined Patent Application Publication No. H3-032886, Japanese Unexamined Patent Application Publication No. S61-258404, and Japanese Examined Patent Application Publication No. H2-053935).

In one aspect of the present disclosure, it is preferable to provide an Fe-based amorphous alloy ribbon reduced in an iron loss in a condition of a magnetic flux density of 1.45 T.

In another aspect of the present disclosure, it is preferable to provide an iron core and a transformer each having excellent performance by use of the Fe-based amorphous alloy ribbon according to the one aspect.

Means for Solving the Problems

One aspect of the present disclosure provides an Fe-based amorphous alloy ribbon. The Fe-based amorphous alloy ribbon has continuous linear laser irradiation marks on at least one surface. The linear laser irradiation marks are formed along a direction orthogonal to a casting direction of the Fe-based amorphous alloy ribbon. Each linear laser irradiation mark has unevenness on its surface, and a difference HL between a highest point and a lowest point in a thickness direction of the Fe-based amorphous alloy ribbon, when the unevenness is evaluated in the casting direction, is 0.25 μm to 2.0 μm.

In one aspect of the present disclosure, HL×WL calculated from the difference HL between the highest point and the lowest point of the linear laser irradiation mark and a line width WL, which is a length of the linear laser irradiation mark in the casting direction, may be 6.0 to 180 μm².

In one aspect of the present disclosure, the line width WL may be 28 μm or more.

In one aspect of the present disclosure, a line interval, when the line interval is defined as an interval between mutually adjacent linear laser irradiation marks of the linear laser irradiation marks, may be 2 mm to 200 mm.

In one aspect of the present disclosure, a proportion of the length of the linear laser irradiation mark to a total length of the Fe-based amorphous alloy ribbon in a width direction, when the width direction is defined as a direction orthogonal to the casting direction, may be in a range from 10% to 50% each in both directions from a midpoint of the Fe-based amorphous alloy ribbon in the width direction towards ends in the width direction.

In one aspect of the present disclosure, a portion where the linear laser irradiation marks are formed may be non-crystalline.

In one aspect of the present disclosure, the Fe-based amorphous alloy ribbon may have a free solidified surface and a roll surface. A maximum cross-sectional height Rt on the free solidified surface, except for a portion where the linear laser irradiation marks are formed, may be 3.0 μm or less.

In one aspect of the present disclosure, an alloy composition of the Fe-based amorphous alloy ribbon may consist of Fe, Si, B, and an impurity. A content of Fe may be 78 atom % or more, a content of B may be 10 atom % or more, and a total content of B and Si may be 17 atom % to 22 atom % when a total content of Fe, Si, and B is 100 atom %.

In one aspect of the present disclosure, the Fe-based amorphous alloy ribbon may have a thickness of 18 µm to 35 µm.

In one aspect of the present disclosure, the Fe-based amorphous alloy ribbon may have an iron loss of 0.150 W/kg or less under a condition of a frequency of 60 Hz and a magnetic flux density of 1.45 T.

In one aspect of the present disclosure, the Fe-based amorphous alloy ribbon may have an iron loss of 8.6 W/kg or less and an exciting power VA of 8.7 VA/kg or less under a condition of a frequency of 1 kHz and a magnetic flux density of 1 T.

In one aspect of the present disclosure, a coercive force Hc of a DC B-H loop measured at a maximum applied magnetic field of 800 A/m may be 5.0 A/m or less.

In one aspect of the present disclosure, a square ratio [residual magnetic flux density Br/maximum magnetic flux density Bm] of the DC B-H loop measured at the maximum applied magnetic field of 800 A/m may be 40% or less.

Another aspect of the present disclosure provides an iron core formed by layering the Fe-based amorphous alloy ribbons, or by winding at least one Fe-based amorphous alloy ribbon.

In one aspect of the present disclosure, the iron core may be formed by bending and winding, in an overlapping manner, the Fe-based amorphous alloy ribbons layered. The iron core may have an iron loss of 0.240 W/kg or less under a condition of a frequency of 60 Hz and a magnetic flux density of 1.45 T.

Another aspect of the present disclosure provides a transformer, comprising an iron core that is formed using the Fe-based amorphous alloy ribbon, and a coil wound around the iron core.

In one aspect of the present disclosure, the iron core may be formed by bending and winding, in an overlapping manner, the Fe-based amorphous alloy ribbons layered, and have an iron loss of 0.240 W/kg or less under a condition of a frequency of 60 Hz and a magnetic flux density of 1.45 T.

In one aspect of the present disclosure, the transformer may be a single phase transformer, and a no-load loss per weight of the iron core at 50 Hz may be 0.15 W/kg or less, or a no-load loss per weight of the iron core at 60 Hz may be 0.19 W/kg or less.

In one aspect of the present disclosure, the transformer may be a three-phase transformer, and a no-load loss per weight of the iron core at 50 Hz may be 0.19 W/kg or less, or a no-load loss per weight of the iron core at 60 Hz may be 0.24 W/kg or less.

In one aspect of the present disclosure, the transformer may have a rated capacity of 10 kVA or more.

Effects of the Invention

According to one aspect of the present disclosure, an Fe-based amorphous alloy ribbon reduced in an iron loss under the condition of a frequency of 60 Hz and a magnetic flux density of 1.45 T is provided.

According to another aspect of the present disclosure, an iron core and a transformer each having excellent performance are provided by use of the Fe-based amorphous alloy ribbon according to the above one aspect.

MODE FOR CARRYING OUT THE INVENTION

Figure 1:
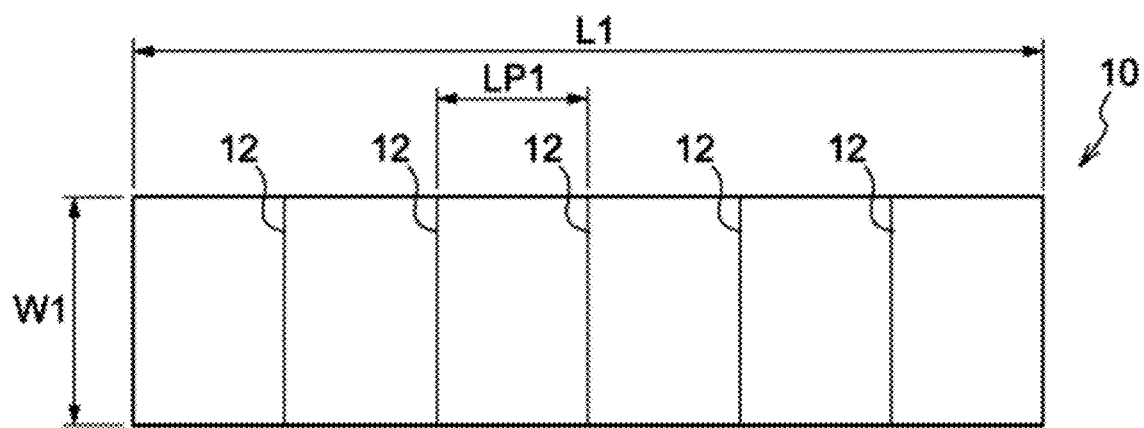
FIG. 1 is a schematic plan view schematically showing a free solidified surface of a laser-processed Fe-based amorphous alloy ribbon piece (ribbon 10).

A range of numerical values expressed with " . . . to . . . " herein means that the range includes the numerical values written before and after "to" as a minimum value and a maximum value. In ranges of numerical values described in stages herein, the maximum value or the minimum value included in one range of numerical values may be replaced with the maximum value or the minimum value in another range of numerical values. The maximum value or the minimum value of a range of numerical values described herein may be replaced with a value shown in Examples.

The term "process" includes not only an independent process, but also a process that can achieve an intended object even in a case in which the process is not clearly distinguished from other processes.

The Fe-based amorphous alloy ribbon herein refers to a ribbon made of an Fe-based amorphous alloy.

The Fe-based amorphous alloy herein refers to an amorphous alloy containing Fe (iron) as a main component. The main component here refers to a component contained at the highest ratio (mass %).

Embodiments of the present disclosure will be described hereinafter. The present disclosure is not limited to the following embodiments, and may be modified as appropriate within the scope of the technical ideas of the present disclosure.

[Fe-Based Amorphous Alloy Ribbon]

An Fe-based amorphous alloy ribbon of a first embodiment of the present disclosure has continuous linear laser irradiation marks on at least one surface of the ribbon. The linear laser irradiation marks are arranged along a direction orthogonal to a casting direction of the Fe-based amorphous alloy ribbon. Each linear laser irradiation mark has unevenness on its surface. When the unevenness is evaluated in the casting direction, a difference HL between a highest point and a lowest point in a thickness direction of the Fe-based amorphous alloy ribbon is 0.25 μm to 2.0 μm.

The main feature of the first embodiment is that the difference HL between the highest point and the lowest point in the thickness direction of the Fe-based amorphous alloy ribbon is 0.25 μm to 2.0 μm when the unevenness is evaluated in the casting direction.

The linear laser irradiation mark of the present disclosure has the aforementioned feature. Nevertheless, effects of the present disclosure can be achieved, for example, even if not all of the linear laser irradiation marks formed on the Fe-based amorphous alloy ribbon have the aforementioned configuration of the present disclosure. It is preferable that 60% or more of the linear laser irradiation marks of all the linear laser irradiation marks have the aforementioned configuration of the present disclosure. It is more preferable that 70% or more of the linear laser irradiation marks have the aforementioned configuration of the present disclosure. It is yet more preferable that 80% or more of the linear laser irradiation marks have the aforementioned configuration of the present disclosure. It is even more preferable that 90% or more of the linear laser irradiation marks have the aforementioned configuration of the present disclosure. It is most preferable that all the linear laser irradiation marks have the aforementioned configuration of the present disclosure.

For example, it is preferable that 60% or more of the laser irradiation marks of the laser irradiation marks formed on the Fe-based amorphous alloy ribbon have any of the following features.

(1) When the unevenness on the surface of the linear laser irradiation mark is evaluated in the casting direction, the difference HL between the highest point and the lowest point in the thickness direction of the Fe-based amorphous alloy ribbon is 0.25 μm to 2.0 μm.

(2) When the unevenness on the surface of the linear laser irradiation mark is evaluated in the casting direction, HL×WL calculated from the difference HL between the highest point and the lowest point in the thickness direction of the Fe-based amorphous alloy ribbon, and a line width WL of the linear laser irradiation mark is 6.0 to 180 μm$^2$.

In the Fe-based amorphous alloy ribbon (hereinafter, simply referred to as "ribbon") of the present embodiment, an iron loss CL under a condition of a frequency of 60 Hz and a magnetic flux density of 1.45 T is reduced by having the aforementioned configuration. The Fe-based amorphous alloy ribbon also reduced in a coercive force Hc (60 Hz, 1.45 T) is obtained. An increase in an exciting power VA (60 Hz, 1.45 T) can be also inhibited. The Fe-based amorphous alloy ribbon also having less deformation by laser irradiation is obtained. The Fe-based amorphous alloy ribbon by laser irradiation that has high productivity is obtained.

The iron loss CL under a condition of a frequency of 1 kHz and a magnetic flux density of 1 T is reduced. The exciting power VA (1 kHz, 1 T) can be also reduced. This makes the Fe-based amorphous alloy ribbon of the present disclosure useful for high frequency applications.

The Fe-based amorphous alloy ribbon of the present embodiment is an Fe-based amorphous alloy ribbon having a free solidified surface and a roll surface.

The Fe-based amorphous alloy ribbon having the free solidified surface and the roll surface is a ribbon produced (cast) by a single roll method. The roll surface is a surface which is brought into contact with a cooling roll and rapidly solidified in casting, and the free solidified surface is a surface opposite to the roll surface (namely, a surface exposed to an atmosphere in casting).

The single roll method can be appropriately found in any known document such as International Patent Application Publication No. 2012/102379.

The Fe-based amorphous alloy ribbon of the present disclosure may be a ribbon not cut after casting (for example, a rolled body wound up in the form of a roll after casting) or may be a ribbon piece cut out to a desired size after casting.

FIG. 1 shows a schematic diagram of the Fe-based amorphous alloy ribbon of the present embodiment. In FIG. 1, linear laser irradiation marks 12 are formed on a free solidified surface (or a roll surface) of a Fe-based amorphous alloy ribbon 10. In FIG. 1, the left and right direction (arrow direction of L1) corresponds to the casting direction, and the up and down direction (arrow direction of W1) corresponds to the width direction of the ribbon. The linear laser irradiation marks 12 are arranged along a direction toward the width direction orthogonal to the casting direction of the ribbon. L1 indicates a length of the ribbon, W1 indicates a width of the ribbon, and LP1 indicates a line interval between the linear laser irradiation marks.

<Linear Laser Irradiation Mark>

The Fe-based amorphous alloy ribbon of the present embodiment has continuous linear laser irradiation marks on at least one of the free solidified surface and the roll surface. These continuous linear laser irradiation marks (linear laser irradiation marks) are formed by laser processing that uses a CW (continuous wave) oscillation method, and differ from clusters of dotted laser irradiation marks formed by a pulse laser.

Methods of segmenting the magnetic domain by laser irradiation have been conventionally known, and those methods commonly use a pulse laser to form dotted laser irradiation marks. However, the methods that use a pulse laser have the following problem in productivity, and are not suitable for low cost production.

For example, an oscillation frequency has to be raised in high speed processing. However, it is not possible to raise the oscillation frequency while maintaining a pulse energy and a pulse width.

In a case of laser processing that uses a CW oscillation method, productivity can be easily increased simply by continuously oscillating the laser to increase an output power of the oscillator. As a result, an Fe-based amorphous alloy ribbon having desired characteristics is obtained without increasing the cost. For example, an Fe-based amorphous alloy ribbon reduced in the iron loss under the condition of a frequency of 60 Hz and a magnetic flux density of 1.45 T is obtained.

In the present embodiment, the continuous linear laser irradiation marks are formed into a continuous line formed by laser processing that uses a CW (continuous wave) oscillation method, unlike the one obtained by continuously forming dotted laser irradiation marks by a pulse laser. There is no problem if the marks are partially interrupted. The marks may be continuous at least 5 mm or more. The dotted laser irradiation mark formed by a pulse laser can be distinguished from a linear laser irradiation mark formed using a CW oscillation method by observing the laser irradiation marks.

In the linear laser irradiation mark, the ribbon is melt-solidified by laser irradiation, and the appearance (color, shape) has changed as compared to a non-laser irradiated portion. In other words, the portion where the appearance has changed is the linear laser irradiation mark. The width of the portion where the appearance has changed (width of the melt-solidified portion of the ribbon; length in a direction orthogonal to a direction in which the continuous line extends) is defined as the line width WL of the linear laser irradiation mark.

It is preferable that the continuous linear laser irradiation mark has a straight line shape. Although some fluctuations occur due to formation by scanning of the laser irradiation that uses a CW oscillation method, a linear laser irradiation mark having a substantially straight line shape is formed. Examples of the linear laser irradiation mark are shown in FIGS. 5A-5D, 6A-6D, and 15.

It is also preferable that the melt-solidified portion where the linear laser irradiation marks are formed is non-crystal-line. If the portion where the linear laser irradiation marks are formed is crystalized, the magnetic characteristics deteriorate.

The linear laser irradiation marks are traces to which energy is applied by the laser irradiation, and, as previously noted, is a portion where the ribbon is melt-solidified. On the surfaces of the marks, unevenness (shape deformation) is formed. However, it was found that the desired characteristics (low iron loss) cannot be obtained if the unevenness is too large. In other words, the Fe-based amorphous alloy ribbon reduced in the iron loss under the condition of a frequency of 60 Hz and a magnetic flux density of 1.45 T cannot be obtained if the unevenness is too large. According to the present disclosure, it is preferable that the difference HL between the highest point and the lowest point in the thickness direction of the Fe-based amorphous alloy ribbon (hereinafter, also referred to as "height difference HL") is 0.25 µm to 2.0 µm, when the unevenness on the surface of the linear laser irradiation mark is evaluated in the casting direction. When the laser output energy density of the laser irradiation is too high, the height difference HL tends to be larger than 2.0 µm. It is considered that the shape deformation has increased due to too strong laser. Too large shape deformation causes inconveniences; unnecessary space is formed when winding or layering the Fe-based amorphous alloy ribbon, a lamination factor of the Fe-based amorphous alloy ribbon (ribbon density of the core) is reduced, or desired shape cannot be obtained. When the laser is too strong, the portion where the laser irradiation marks are formed is crystalized, and the characteristics tend to deteriorate. Accordingly, it is preferable that the height difference HL is 2.0 µm or less, more preferably 1.8 µm or less, yet more preferably 1.7 µm or less.

When the laser output energy density is too small, the height difference HL tends to be less than 0.25 µm. It is preferable that the shape deformation is small in formation of a core and the like. However, the effect by the laser irradiation becomes low, and the desired characteristics cannot be obtained. Accordingly, it is preferable that the height difference HL is 0.25 µm or more, more preferably 0.30 µm or more.

Also in the present embodiment, it is preferable that HL×WL calculated from the height difference HL and the line width WL of the linear laser irradiation mark is 6.0 to 180 µm². If the laser intensity is too strong, deformation in portion where the irradiation marks are formed increases and the iron loss increases. The value of HL×WL also increases when the laser intensity is too strong. Thus, if HL×WL calculated from the height difference HL and the line width WL is 180 µm² or less, the laser intensity becomes appropriate, and an Fe-based amorphous alloy ribbon reduced in the iron loss under the condition of a frequency of 60 Hz and a magnetic flux density of 1.45 T is obtained.

When the laser output energy density is too small, the effect by the laser irradiation decreases, and the desired characteristics cannot be obtained. Thus, it is preferable that HL×WL is 6.0 µm² or more, more preferably 7 µm² or more, and yet more preferably 10 µm² or more.

In the embodiments of the present disclosure, it is preferable that the line width WL is 28 µm or more, more preferably 29 µm or more, and yet more preferably 30 µm or more.

In the present embodiment, the linear laser irradiation mark is arranged along the direction toward the width direction orthogonal to the casting direction of the Fe-based amorphous alloy ribbon. It is also preferable that the linear laser irradiation marks are formed in the width direction of the ribbon so as to include a "central part in the width direction" to be described later. The "casting direction" herein is a direction corresponding to a circumferential direction of the cooling roll when the Fe-based amorphous alloy ribbon is casted; in other words, it corresponds to a longitudinal direction of the casted Fe-based amorphous alloy ribbon before cutting. The direction orthogonal to the longitudinal direction is the width direction.

The "casting direction" can also be confirmed on the cut ribbon piece by observing the free solidified surface and/or the roll surface of the ribbon piece. For example, a thin line is observed on the free solidified surface and/or the roll surface of the ribbon piece along the casting direction. A direction orthogonal to the casting direction is the width direction.

In the Fe-based amorphous alloy ribbon of the embodiment, a line interval is preferably 2 mm to 200 mm, in a case in which the line interval is defined as an interval at a central part in the width direction orthogonal to the casting direction of the Fe-based amorphous alloy ribbon, between mutually adjacent linear laser irradiation marks of the linear laser irradiation marks.

The width direction is a direction orthogonal to the casting direction of the Fe-based amorphous alloy ribbon.

In a case in which the linear laser irradiation marks are formed on both the free solidified surface and the roll surface of the ribbon, the line interval is measured with respect to the linear laser irradiation marks on the both surfaces by transparently observing the ribbon. For example, if the linear line laser irradiation marks are alternately formed on the both surfaces in the casting direction of the ribbon, the "mutually adjacent linear laser irradiation marks" include the linear laser irradiation marks formed on one surface and the other surface of the free solidified surface and the roll surface, which are adjacent to one another in the casting direction.

If the line interval is less than 2 mm, reduction in the iron loss cannot be expected.

Having the line interval of 200 mm or less has an excellent effect of reducing the iron loss measured under the condition of a frequency of 60 Hz and a magnetic flux density of 1.45 T.

The line interval is more preferably 3.5 mm or more, yet more preferably 5 mm or more, and even more preferably 10 mm or more. The line interval is more preferably 100 mm or less, yet more preferably 80 mm or less, and even more preferably 60 mm or less. The line interval can be further narrowed to 50 mm or less, 40 mm or less, and 30 mm or less.

The directions of the linear laser irradiation marks are preferably, but not limited to be, approximately parallel to one another. The directions of the linear laser irradiation marks may be, but do not have to be, parallel to one another.

The "central part in the width direction" of the Fe-based amorphous alloy ribbon may be a portion that has a certain range of width from the midpoint to the both ends in the width direction. For example, the central part may be a region that has "the certain range of width" from the midpoint to the both ends in the width direction equal to one fifth of the total width of the ribbon (one fifth from the midpoint to one end; the length of the central part in the width direction is one fifth of the entire width direction). Accordingly, in a region that has a length from the midpoint to the both ends in the width direction equal to one fifth each from the midpoint to the ends, in other words, a region that has a length of the central part in the width direction equal to one fifth of the total width of the ribbon, it is preferable that the line interval is in a range from 2 mm to 200 mm.

Preferably, in a region that has a length of the central part in the width direction equal to a quarter of the total width of the ribbon, it is preferable that the line interval is in a range from 2 mm to 200 mm. More preferably, in a region that has a length of the central part in the width direction equal to a half of the total width of the ribbon, it is preferable that the line interval is in a range from 2 mm to 200 mm.

In one embodiment of the present disclosure, the linear laser irradiation marks of the Fe-based amorphous alloy ribbon may be arranged with a positional relationship in which each linear laser irradiation mark is not parallel to the width direction which is orthogonal to the casting direction of the Fe-based amorphous alloy ribbon.

In other words, each linear laser irradiation mark may be arranged at an angle of 10 degrees or more relative to the width direction of the Fe-based amorphous alloy ribbon, so that each linear laser irradiation mark may intersect with the casting direction at an acute angle or at an obtuse angle.

In another embodiment of the present disclosure, it is preferable that each linear laser irradiation mark of the Fe-based amorphous alloy ribbon is approximately parallel to a direction that is orthogonal to the casting direction and a thickness direction of the Fe-based amorphous alloy ribbon.

What is meant by that each linear laser irradiation mark is approximately parallel to the direction that is orthogonal to the casting direction and the thickness direction of the Fe-based amorphous alloy ribbon is that each linear laser irradiation mark is arranged at an angle of 10 degrees or less relative to the direction orthogonal to the casting direction and the thickness direction of the Fe-based amorphous alloy ribbon.

Nevertheless, the positional relationship of the linear laser irradiation marks relative to one another is not limited to being approximately parallel.

In one embodiment of the Fe-based amorphous alloy ribbon of the present disclosure, it is preferable that each linear laser irradiation mark is approximately parallel to the width direction of the Fe-based amorphous alloy ribbon.

What is meant by that each linear laser irradiation mark is approximately parallel to the width direction of the Fe-based amorphous alloy ribbon is that each linear laser irradiation mark is arranged at an angle of 10 degrees or less relative to the width direction of the Fe-based amorphous alloy ribbon.

Nevertheless, the positional relationship of the linear laser irradiation marks relative to one another is not limited to being approximately parallel.

As mentioned above, each linear laser irradiation mark does not have to be parallel to the direction orthogonal to the casting direction of the Fe-based amorphous alloy ribbon, and may be arranged at an angle of inclination over 10 degrees relative to the direction orthogonal to the casting direction of the Fe-based amorphous alloy ribbon. It is to be construed that each linear laser irradiation mark is arranged along the direction orthogonal to the casting direction of the Fe-based amorphous alloy ribbon even if the angle of inclination is over 10 degrees. The angle of inclination is preferably less than 45 degrees, more preferably 40 degrees or less, yet more preferably 30 degrees or less, even more preferably 20 degrees or less, and most preferably 10 degrees or less.

The Fe-based amorphous alloy ribbon in one mode of the present disclosure may include one linear laser irradiation mark in the width direction of the ribbon, or include two or more linear laser irradiation marks in the width direction of the ribbon. In a case in which there are multiple linear laser irradiation marks in the width direction of the ribbon and the linear laser irradiation marks are lined up in a straight line, the linear laser irradiation marks can be regarded as one linear laser irradiation mark.

Specifically, the Fe-based amorphous alloy ribbon of the present disclosure may have laser irradiation mark rows arranged in the casting direction of the Fe-based amorphous alloy ribbon, as (1) a mode of one row in the width direction orthogonal to the casting direction (hereinafter referred to as group of single row) or (2) a mode of multiple rows in the width direction orthogonal to the casting direction (hereinafter referred to as group of multiple rows).

Hereinafter, the laser irradiation mark rows arranged in the casting direction of the Fe-based amorphous alloy ribbon are also referred to as "group of irradiation marks".

The latter group of multiple rows has multiple groups of irradiation marks present in the width direction of the ribbon, the respective positions of the laser irradiation marks in the multiple groups need not to be located on the same line in the width direction and may be in a positional relationship in which the laser irradiation marks are each displaced in the casting direction. For example, in a case in which two groups of irradiation marks are present in the width direction of the ribbon, the two groups may be in a positional relationship in which laser irradiation marks arranged in one of the groups and laser irradiation marks arranged in another of the groups are alternately present at regular intervals in the casting direction.

The line interval in the present disclosure is a value determined as follows.

In a case in which linear laser irradiation mark rows arranged in the casting direction are included as the group of single row having one row in the "central part in the width direction" as in (1) described above, the line interval can be determined as an average value of measurement values obtained by measuring the interval between mutually adjacent two linear laser irradiation marks in the casting direction at five randomly selected points. In this case, linear laser irradiation marks included in the group of single row are preferably present at a regular interval, however, may be present at any interval.

In a case in which linear laser irradiation mark rows arranged in the casting direction are included as the group of multiple rows, including multiple rows, as in (2) described above, the line interval can be determined as a value obtained by further averaging the values (average values) determined with respect to respective "groups of irradiation marks" in the group of multiple rows by the same method as the above. In this case, linear laser irradiation marks included in each "group of irradiation marks" are preferably present at a regular interval, however, may be present at any interval. When one of the group of multiple rows does not reach the central part in the width direction, the linear laser irradiation mark may be temporarily extended to the central part in the width direction to determine the interval in the central part in the width direction.

Preferably, a proportion of a length of the linear laser irradiation mark in the width direction to a total width of the Fe-based amorphous alloy ribbon in the width direction is 10% to 50% each in both directions from the midpoint in the width direction towards ends in the width direction. In this case, the entire length of the Fe-based amorphous alloy ribbon in the width direction is considered 100%.

In a case in which the linear laser irradiation mark is inclined with respect to the width direction, the length of the inclined linear laser irradiation mark per se should not be measured as the length of the linear laser irradiation mark in the width direction; the length of the linear laser irradiation mark with respect to a region in which it is formed is converted to a length with respect to the width direction of the ribbon to obtain the length of the linear laser irradiation mark in the width direction.

When the above proportion of the length in the width direction is 50%, it means that the linear laser irradiation mark reaches one end and the other end of the Fe-based amorphous alloy ribbon in the width direction starting from the midpoint in the width direction. In other words, the linear laser irradiation mark is formed from one end to the other end in the width direction of the ribbon.

For example, when the linear laser irradiation mark is arranged parallel to the width direction of the Fe-based amorphous alloy ribbon, the entire length of the linear laser irradiation mark of the Fe-based amorphous alloy ribbon in the width direction corresponds to the entire width of the Fe-based amorphous alloy ribbon.

When the above proportion of the length in the width direction is 10%, it means that the linear laser irradiation mark occupies 10% of the length of the ribbon starting from the midpoint in the width direction towards each end in the width direction, that is, occupies 20% of the length as the central region in the entire width. In other words, it means that the linear laser irradiation mark is formed by leaving 40% of the margin at both ends in the width direction of the Fe-based amorphous alloy ribbon with respect to the entire length in the width direction.

More preferably, a proportion of a length of the linear laser irradiation mark of the Fe-based amorphous alloy ribbon in the width direction to a total length of the ribbon in the width direction is 25% or more each in both directions from the midpoint in the width direction towards ends in the width direction.

It is further preferable that the linear laser irradiation mark is formed at least inside a region of central six-eights of eight equal sections of the Fe-based amorphous alloy ribbon divided along the width direction, excluding two-eights on both ends of the ribbon.

When there are groups of multiple rows of the linear laser irradiation mark rows, the groups of multiple rows may be combined, and the length of the linear laser irradiation mark in the entire length of the ribbon in the width direction may be evaluated at positions where the linear laser irradiation marks in the combined group of multiple rows are closest to both ends in the width direction.

The linear laser irradiation mark of the present disclosure has the aforementioned features. Nevertheless, effects of the present disclosure can be achieved, for example, even if not all of the linear laser irradiation marks formed on the Fe-based amorphous alloy ribbon have the aforementioned configuration of the present disclosure. It is preferable that 60% or more of the linear laser irradiation marks of all the linear laser irradiation marks have the aforementioned configuration of the present disclosure. It is more preferable that 70% or more of the linear laser irradiation marks have the aforementioned configuration of the present disclosure. It is yet more preferable that 80% or more of the linear laser irradiation marks have the aforementioned configuration of the present disclosure. It is even more preferable that 90% or more of the linear laser irradiation marks have the aforementioned configuration of the present disclosure. It is most preferable that all the linear laser irradiation marks have the aforementioned configuration of the present disclosure.

<Roughness of Free Solidified Surface (Maximum Cross-Sectional Height Rt)>

For example, as disclosed in International Patent Application Publication No. 2012/102379, iron loss has been conventionally reduced by forming the waveform unevenness on the free solidified surface.

However, the inventor of the present disclosure and others have considered and found that the waveform unevenness may cause an increase in the exciting power measured under the condition of a frequency of 60 Hz and a magnetic flux density of 1.45 T.

Accordingly, it is preferable that the waveform unevenness is reduced as much as possible from the viewpoint of inhibiting an increase in the exciting power measured under the condition of the frequency of 60 Hz and the magnetic flux density of 1.45 T.

Specifically, a maximum cross-sectional height Rt on the free solidified surface, except for a portion where the linear laser irradiation marks are formed, is 3.0 μm or less.

What is meant by the maximum cross-sectional height Rt being 3.0 μm or less is that there are no waveform unevenness or reduced waveform unevenness on the free solidified surface.

The maximum cross-sectional height Rt for a portion on the free solidified surface where the linear laser irradiation marks are not formed herein is measured (evaluated) with an evaluation length of 4.0 mm, a cutoff value of 0.8 mm, and a type of cutoff being 2RC (phase compensation) as complying with JIS B 0601: 2001. A direction of the evaluation length is set to be the casting direction of the Fe-based amorphous alloy ribbon. More specifically, the aforementioned measurement with the evaluation length of 4.0 mm is performed by continuously measuring the maximum cross-sectional height Rt five times with the cutoff value of 0.8 mm.

The maximum cross-sectional height Rt on the free solidified surface for a portion where the linear laser irradiation marks are not formed is more preferably 2.5 μm or less.

Although there is no particular lower limit of the maximum cross-sectional height Rt, the lower limit of the maximum cross-sectional height Rt is preferably 0.8 μm, and more preferably 1.0 μm in view of the competence in producing the Fe-based amorphous alloy ribbon.

<Chemical Composition>

There is no limitations as to the chemical compositions of the Fe-based amorphous alloy ribbon of the present disclosure as long as the ribbon has the chemical composition of the Fe-based amorphous alloy (that is, the chemical composition with a main component being Fe (iron)). Nevertheless, from the viewpoint of more effectively obtaining effects of the Fe-based amorphous alloy ribbon of the present disclosure, the chemical composition of the Fe-based amorphous alloy ribbon of the present disclosure is preferably the following chemical composition A. The chemical composition A, which is the preferable chemical composition, consists of Fe, Si, B, and an impurity. When the total content of Fe, Si, and B is 100 atomic %, a content of Fe is 78 atomic % or more; a content of B is 10 atomic % or more; a total content of B and Si is from 17 atomic % to 22 atomic %.

The chemical composition A will be explained in detail hereinafter.

In the chemical composition A, the content of Fe is 78 atomic % or more.

Fe (iron) is one of the transition metals that have the largest magnetic moment even in an amorphous structure. Fe predominantly provides magnetic property in an Fe—Si—B amorphous alloy.

In a case in which the content of Fe is 78 atomic % or more, a saturated magnetic flux density (Bs) of the Fe-based amorphous alloy ribbon can be increased (for example, Bs of about 1.6 T can be achieved).

Furthermore, it facilitates achieving a preferable magnetic flux density of B0.1 (1.52 T or more).

The content of Fe is preferably 80 atomic % or more, more preferably 80.5 atomic % or more, yet more preferably 81.0 atomic % or more. Furthermore, the content of Fe is preferably 82.5 atomic % or less, and more preferably 82.0 atomic % or less.

In the chemical composition A, the content of B is 10 atomic % or more.

B (boron) is an element that contributes in amorphous formation. In a case in which the content of B is 10 atomic % or more, an amorphous forming ability is improved further.

In a case in which the content of B is 10 atomic % or more, the magnetic domain tends to be oriented in the casting direction, which enlarges the width of the magnetic domain and thereby facilitates improvement of the magnetic flux density (B0.1).

The content of B is preferably 11 atomic % or more, and more preferably 12 atomic % or more.

An upper limit of the content of B is preferably 16 atomic %, although it depends on the total content of B and Si, which will be mentioned later.

In the chemical composition A, the total content of B and Si is from 17 atomic % to 22 atomic %.

Si (silicon) is an element that segregates on a surface in a molten state and exerts an effect of preventing oxidation of the molten metal. In addition, Si serves as an auxiliary in amorphous formation with an effect of increasing a glass transition temperature and is an element that helps forming an amorphous phase that is more thermally stable.

In a case in which the total content of B and Si is 17 atomic % or more, the aforementioned effects of Si can be effectively exhibited.

In a case in which the total content of B and Si is 22 atomic % or less, a large amount of Fe that predominantly provides magnetic property can be obtained, and which is advantageous in improving the saturation magnetic flux density Bs and the magnetic flux density B0.1. Preferably, the total content of B and Si is 20 atom % or less, which can be appropriately determined in consideration of the content of Fe.

The content of Si is preferably 2.0 atomic % or more, more preferably 2.4 atomic % or more, and yet more preferably 3.5 atomic % or more.

An upper limit of the content of Si is preferably 6.0 atomic %, although it depends on the total content of B and Si.

From the viewpoint of further improving the iron loss and the exciting power which will be explained later, a more preferable chemical composition of the Fe-based amorphous alloy ribbon among the chemical composition A consists of Fe, Si, B, and an impurity; the content of Fe is 80 atomic % or more, the content of B is 12 atomic % or more, and the total content of B and Si is from 17 atomic % to 20 atomic % when the total content of Fe, Si, and B is 100 atomic %.

The chemical composition A includes an impurity.

In this case, the chemical composition A may include one kind of impurity or two or more kinds of impurities.

Examples of the impurity include any elements other than Fe, Si, and B, specifically, for example, C, Ni, Co, Mn, O, S, P, Al, Ge, Ga, Be, Ti, Zr, Hf, V, Nb, Ta, Cr, Mo, and rare earth element.

The chemical composition can contain 1.5 mass % or less of these elements in total with respect to the total mass of Fe, Si, and B. An upper limit of the total content of these elements is preferably 1.0 mass % or less, more preferably 0.8 mass % or less, and yet more preferably 0.75 mass % or less. These elements may be added to the chemical composition within these ranges.

<Thickness>

A thickness of the Fe-based amorphous alloy ribbon of the present disclosure is not limited to a particular size; however, the thickness is preferably 18 μm to 35 μm.

Having the thickness of 18 μm or more is advantageous in inhibiting undulations of the Fe-based amorphous alloy ribbon and thus in improving the lamination factor of the Fe-based amorphous alloy ribbon. More preferably, the thickness is 20 μm or more.

Having the thickness of 35 μm or less is advantageous in inhibiting embrittlement of the Fe-based amorphous alloy ribbon, and in terms of magnetic saturability. The thickness is more preferably 30 μm or less.

<Iron Loss CL>

As mentioned above, in the Fe-based amorphous alloy ribbon of the present disclosure, the iron loss CL is reduced under the condition of a frequency of 60 Hz and a magnetic flux density of 1.45 T by segmentation of the magnetic domain due to formation of the linear laser irradiation marks.

The iron loss CL under the condition of a frequency of 60 Hz and a magnetic flux density of 1.45 T is preferably 0.150 W/kg or less, which is more preferably 0.140 W/kg or less, and yet more preferably 0.130 W/kg or less.

Although there is no particular lower limit of the iron loss CL under the condition of a frequency of 60 Hz and a magnetic flux density of 1.45 T, the lower limit of the iron loss CL is preferably 0.050 W/kg in view of the competence in producing the Fe-based amorphous alloy ribbon.

In the Fe-based amorphous alloy ribbon of the present disclosure, the iron loss CL is also reduced under the condition of a frequency of 1 kHz and a magnetic flux density of 1 T. The iron loss CL under the condition of a frequency of 1 kHz and a magnetic flux density of 1 T is preferably 8.6 W/kg or less, more preferably 8.0 W/kg or less, and yet more preferably 7.0 W/kg or less.

In the Fe-based amorphous alloy ribbon of the present disclosure, the iron loss CL is also reduced under the condition of a frequency of 50 Hz and a magnetic flux density of 1.45 T. In the Fe-based amorphous alloy ribbon of the present disclosure, it is preferable that the iron loss CL under the condition of a frequency of 50 Hz and a magnetic flux density of 1.45 T is 0.120 W/kg or less.

The iron loss CL of the Fe-based amorphous alloy ribbon is measured in accordance with JIS 7152 (1996).

<Exciting Power VA>

As mentioned above, the Fe-based amorphous alloy ribbon of the present disclosure inhibits an increase in the exciting power VA under the condition of a frequency of 60 Hz and a magnetic flux density of 1.45 T. As the height difference of the linear laser irradiation marks increases, the exciting power VA also tends to increase. Having the height difference of 2.5 μm or less can inhibit a significant increase in the exciting power VA.

In the Fe-based amorphous alloy ribbon of the present disclosure, the exciting power VA is also reduced under the condition of a frequency of 1 kHz and a magnetic flux density of 1 T. The exciting power VA under the condition of a frequency of 1 kHz and a magnetic flux density of 1 T is preferably 8.7 VA/kg or less, more preferably 8.0 VA/kg or less, and yet more preferably 7.5 VA/kg or less.

<Coercive Force Hc>

As mentioned above, in the Fe-based amorphous alloy ribbon of the present disclosure, the coercive force Hc is reduced under the condition of a frequency of 60 Hz and a magnetic flux density of 1.45 T.

<Ratio [Operating Magnetic Flux Density Bmax/Saturation Magnetic Flux Density Bs]>

As mentioned above, the Fe-based amorphous alloy ribbon of the present disclosure can reduce the iron loss and the exciting power to low levels under the condition of a magnetic flux density of 1.45 T, which is higher than the magnetic flux density of 1.3 T in the conventional condition.

Thus, the Fe-based amorphous alloy ribbon of the present disclosure can still reduce the iron loss and the exciting power in a case in which the ribbon is used with a ratio [operating magnetic flux density Bmax/saturation magnetic flux density Bs] (hereinafter, also referred to as "Bmax/Bs ratio") having the operating magnetic flux density Bmax that is higher than that in the conventional condition.

Regarding this matter, an Fe-based amorphous alloy ribbon in one conventional example was used under the condition that the saturation magnetic flux density Bs was 1.56 T and the operating magnetic flux density Bmax was 1.35 T (that is, Bmax/Bs ratio=0.87) (for example, see IEEE TRANSACTIONS ON MAGNETICS, Vol: 44, Issue: 11, November 2008, pp. 4104-4106 (particularly p. 4106)).

Meanwhile, Bs of the Fe-based amorphous alloy ribbon of the present disclosure having, for example, a chemical composition ($Fe_{82}Si_4B_{14}$) of Examples, which will be explained later, is 1.63 T. Bs is determined substantially unambiguously depending on the chemical composition. The Fe-based amorphous alloy ribbon of the present disclosure in this case can be used at Bmax of 1.43 T or more (preferably from 1.45 T to 1.50 T). The Bmax/Bs ratio is 0.88 with Bmax being 1.43 T. The Bmax/Bs ratio is 0.92 with Bmax being 1.50 T.

Accordingly, it is particularly preferable that the Fe-based amorphous alloy ribbon of the present disclosure is used when the operating magnetic flux density Bmax satisfies that the Bmax/Bs ratio is 0.88 to 0.94 (preferably 0.89 to 0.92).

The Fe-based amorphous alloy ribbon of the present disclosure can inhibit increases in the iron loss and the exciting power even when the operating magnetic flux density Bmax satisfies that the Bmax/Bs ratio is 0.88 to 0.94 (preferably 0.89 to 0.92).

The aforementioned characteristics (iron loss CL, exciting power VA, coercive force Hc) are expressed in values obtained by heat-treating the Fe-based amorphous alloy ribbon by applying a magnetic field in the longitudinal direction of the ribbon. The magnetic field heat treatment of the Fe-based amorphous alloy ribbon aims to relax the internal stress and facilitate magnetic alignment in the longitudinal direction of the ribbon, and is appropriately performed to obtain the desired characteristics. The heat treatment can be performed by holding the ribbon for a certain period of time at about 300° C. to 400° C. The holding time is preferably in twenty-four hours, and more preferably in four hours. The magnetic field during the heat treatment is preferably 400 A/m or more, and more preferably 800 A/m or more. The heat treatment can be also performed in the atmosphere, in an inert gas such as argon gas, nitrogen gas, and helium, or in a vacuum. The heat treatment can be also performed after formation of the iron core.

It is preferable that the Fe-based amorphous alloy ribbon of the present disclosure has excellent characteristics after formation of the linear laser irradiation mark and before the heat treatment.

For example, it is preferable that the coercive force Hc of a DC B-H loop measured at the maximum applied magnetic field of 800 A/m is 5.0 A/m or less before the heat treatment. The coercive force Hc is preferably 4.9 A/m or less, and more preferably 4.8 A/m or less. It is also preferable that the square ratio [residual magnetic flux density Br/maximum magnetic flux density Bm] is 40% or less.

When the ribbon before the heat treatment is in an excellent state as such, the holding time during the heat treatment can be shortened, and embrittlement after the heat treatment is unlikely to occur. This improves handleability when preparing transformer iron cores. Large iron cores and laminated iron cores for electronic components may be used without the heat treatment due to the problem of embrittlement. In that case, it is advantageous to have excellent characteristics before the heat treatment.

<Method of Producing Fe-based Amorphous Alloy Ribbon (Method X)>

The aforementioned Fe-based amorphous alloy ribbon of the present disclosure can be produced preferably through the following method X.

Method X includes a process (hereinafter, also referred to as "laser processing process") of forming continuous linear laser irradiation marks on at least one surface of a material ribbon, the material ribbon made of an Fe-based amorphous alloy and having a free solidified surface and a roll surface, by laser processing using a CW (continuous wave) oscillation method, thereby to obtain a Fe-based amorphous alloy ribbon having linear laser irradiation marks, wherein the linear laser irradiation marks are formed at a laser output energy density of 5 J/m or more and 35 J/m or less, and the linear laser irradiation marks are arranged along a direction towards a width direction orthogonal to a casting direction of the Fe-based amorphous alloy ribbon.

The method X may include a process other than the laser processing process as necessary. For example, the method X may include a process of preparing a material ribbon (material preparation process) before the laser processing process. In a case in which the material preparation process includes a process of casting the material ribbon, the process of casting the material ribbon and the laser processing process may be successively performed.

<Material Preparation Process>

The method X may include the material preparation process before the laser processing process. The material preparation process is a process for preparing the material ribbon that includes the free solidified surface and the roll surface.

The material ribbon mentioned here may be a ribbon that is uncut after casting (for example, a rolled body formed by winding into a roll after the casting), or a ribbon piece that is cut into a desired size after the casting.

The material ribbon is the Fe-based amorphous alloy ribbon of the present disclosure before the formation of the linear laser irradiation marks, so to speak.

The free solidified surface and the roll surface of the material ribbon respectively used synonymously with the free solidified surface and the roll surface of the Fe-based amorphous alloy ribbon of the present disclosure.

Preferable modes (for example, preferable chemical composition and preferable Rt) of the material ribbon are the same as the preferable modes of the Fe-based amorphous alloy ribbon of the present disclosure except for the presence of the linear laser irradiation marks.

The material preparation process may be a process of simply preparing a pre-casted (that is, already finished) material ribbon for the laser processing process, or may be a process of casting a new material ribbon.

The material preparation process may be a process of performing at least one of the casting of the material ribbon or the cutting of the ribbon piece from the material ribbon.

<Laser Processing Process>

In the laser processing process in the method X, continuous linear laser irradiation marks are formed on at least one surface of the free solidified surface and the roll surface of the material ribbon by laser processing using a CW oscillation method (that is, by irradiation of a laser that uses the CW oscillation method).

Preferable modes of the linear laser irradiation marks formed by the laser processing process (for example, preferable line interval, and preferable height difference) are the same as the aforementioned preferable modes of the linear laser irradiation marks of the Fe-based amorphous alloy ribbon of the present disclosure.

As mentioned above, each laser irradiation mark is a mark that is left by application of energy by the laser irradiation, and an effect of reducing the iron loss by the laser irradiation is obtained.

Accordingly, there is no particular limits as to the condition of the laser used in the laser processing process. Preferable conditions are as mentioned below.

Line width and unevenness on the surface of the linear laser irradiation marks can be controlled by controlling the laser light irradiation energy with respect to the thickness of the Fe-based amorphous alloy ribbon.

A laser output energy density (also referred to as "laser linear density") to form a linear laser irradiation mark in the laser processing process is preferably 5 J/m or more and 35 J/m or less. A lower limit of the laser output energy density is more preferably 6 J/m, yet more preferably 7 J/m, yet more preferably 8 J/m, and yet more preferably 10 J/m. An upper limit of the laser output energy density is more preferably 31 J/m, yet more preferably 30 J/m, yet more preferably 28 J/m, yet more preferably 25 J/m, and yet more preferably 20 J/m.

In the laser processing process, the ribbon is irradiated with a CW laser light scanning the ribbon in the width direction to form the laser irradiation marks.

Examples of laser light sources can be a YAG laser, a $CO_2$ gas laser, a fiber laser, and a diode laser. Among these laser light sources, the fiber laser is preferable in that it can stably irradiate a high quality laser light for long hours. In a case of a single mode fiber laser, M2 (M square) representing the beam quality is about 1.3 or less.

In the fiber laser, a laser light coupled into a fiber oscillates on the principle of fiber Bragg grating (FBG) due to diffraction gratings provided on both ends of the fiber. The laser light of the fiber laser is excited within a thin fiber; therefore, there is no problems of thermal lens effect, which is induced by temperature gradients occurred inside a crystal and deteriorates the beam quality. Furthermore, a fiber core of the fiber laser is as thin as several microns; thus, even with a high output power, a resulting laser light can have a high energy density with a narrowed beam diameter in addition to providing a single-mode emission. Moreover, the fiber laser has a long focal depth; therefore, it can accurately form the laser irradiation marks on a wide ribbon having a width of 200 mm or more.

A wavelength of the laser light is approximately from 250 nm to 10,600 nm depending on the laser light source. Nevertheless, it is preferably from 900 nm to 1,100 nm for sufficient absorption of the laser light in the alloy ribbon.

The beam diameter of the laser light is preferably 10 μm or more and 500 μm or less, and more preferably 25 μm or more and 100 μm or less.

The laser processing process may be a process for applying the laser processing on the material ribbon after the casting by the single-roll method and before being wound into a roll, or may be a process for applying the laser processing on the material ribbon that is unwound from the wound material ribbon (the rolled body), or may be a process for applying the laser processing on the ribbon piece that is cut out from the material ribbon unwound from the wound material ribbon (the rolled body).

In a case in which the laser processing process is a process for applying the laser processing on the material ribbon after the casting by the single-roll method and before being wound into a roll, the method X is performed with a system, on which a laser processing device is arranged between the cooling roll and a winding roll, for example.

The scanning speed of the CW laser light is preferably 0.2 m/sec or more in view of stability of a CW laser light output power, and preferably 4,000 m/sec or less in view of performing thermal processing on the material ribbon.

<Iron Core>

The iron core of the present disclosure is formed by layering the above-mentioned Fe-based amorphous alloy ribbons of the present disclosure, specifically, by layering the Fe-based amorphous alloy ribbons, and bending and winding the Fe-based amorphous alloy ribbons layered in an overlapping manner. The iron loss under the condition of a frequency of 60 Hz and a magnetic flux density of 1.45 T is 0.240 W/kg or less. The iron loss is preferably 0.230 W/kg or less, more preferably 0.200 W/kg or less, and still more preferably 0.180 W/kg or less.

The lower limit of the iron loss under the condition of a frequency of 60 Hz and a magnetic flux density of 1.45 T is not particularly limited, and the lower limit of the iron loss is preferably 0.050 W/kg, and more preferably 0.080 W/kg in view of competence in producing the Fe-based amorphous alloy ribbon.

The detail of the Fe-based amorphous alloy ribbon of the present disclosure is as described above, and the description thereof is omitted.

A known method can be applied to the method of winding in an overlapping manner.

The shape of the iron core of the present disclosure may be any of a round shape, a rectangular shape, or the like. The type or the like of a coil wound around the iron core is not limited, and may be appropriately selected from those known.

In a case in which the iron core is produced, the iron loss of the material (Fe-based amorphous alloy ribbon) is not maintained as it is, and the iron loss of the iron core becomes larger than the iron loss of the material. This is also called a building factor. For example, the iron loss increases when the iron core is produced due to application of stress to the material. However, in the iron core of the present disclosure, although the iron loss of the iron core increases from the iron loss of the material, it is still possible to obtain an iron core with extremely low iron loss. Specifically, an iron core with low iron loss can be obtained under the condition of a frequency of 60 Hz and a magnetic flux density of 1.45 T. Moreover, an iron core with low iron loss can be obtained even under conditions other than the condition of a frequency of 60 Hz and a magnetic flux density of 1.45 T.

The Fe-based amorphous alloy ribbon of the present disclosure is not limited to the aforementioned iron core structure, and can be also used for iron cores and electronic components having other structures. For example, the Fe-based amorphous alloy ribbon of the present disclosure may be used for wound iron cores and laminated iron cores. For example, the Fe-based amorphous alloy ribbon of the present disclosure may be also used for wound magnetic cores for electronic components, cut cores that form gaps with wound iron cores, and laminate materials.

<Transformer>

The transformer of the present disclosure includes an iron core using the above-mentioned Fe-based amorphous alloy ribbon of the present disclosure, and a coil wound around the iron core, in which the iron core is formed by bending and winding the Fe-based amorphous alloy ribbons layered in an overlapping manner, and the iron loss under the condition of a frequency of 60 Hz and a magnetic flux density of 1.45 T is 0.240 W/kg or less.

The details of the Fe-based amorphous alloy ribbon and the iron core of the present disclosure are as described above, and the description thereof is omitted.

The iron core of the present disclosure is formed by layering the above-mentioned Fe-based amorphous alloy ribbons of the present disclosure, and bending and winding the Fe-based amorphous alloy ribbons layered in an overlapping manner. A known method can be applied to the method of winding in an overlapping manner.

The iron loss under the condition of a frequency of 60 Hz and a magnetic flux density of 1.45 T in the transformer of the present disclosure is 0.240 W/kg or less, preferably 0.230 W/kg or less, more preferably 0.200 W/kg or less, still more preferably 0.180 W/kg or less.

The lower limit of the iron loss under the condition of a frequency of 60 Hz and a magnetic flux density of 1.45 T is not particularly limited, and the lower limit of the iron loss is preferably 0.050 W/kg, more preferably 0.080 W/kg in view of competence in producing the Fe-based amorphous alloy ribbon.

Measurement of the iron loss in the transformer of the present disclosure, provided with the Fe-based amorphous alloy ribbon wound in an overlapping manner, is described below in Examples.

The shape of the iron core in the transformer of the present disclosure may be any of a round shape, a rectangular shape, or the like. The type or the like of a coil wound around the iron core is not limited, and may be appropriately selected from those known.

The iron core in the transformer of the present disclosure is not limited to the iron core formed by bending and winding, in an overlapping manner, the Fe-based amorphous alloy ribbons layered. The iron core of the transformer can be appropriately designed, depending on the use, into a laminated iron core, a wound iron core, or the like.

When the transformer is a single phase transformer, the no-load loss per weight of the iron core at 50 Hz is preferably 0.15 W/kg or less. The no-load loss per weight of the iron core at 60 Hz is preferably 0.19 W/kg or less.

When the transformer is a three-phase transformer, the no-load loss per weight of the iron core at 50 Hz is preferably 0.19 W/kg or less. The no-load loss per weight of the iron core at 60 Hz is preferably 0.24 W/kg or less.

Hereinafter, Examples will be described as embodiments of the Fe-based amorphous alloy ribbon and the transformer of the present disclosure. The present disclosure is not limited to the following Examples.

Example 1

Production of Material Ribbon (Fe-based Amorphous Alloy Ribbon Before Laser Processing)

A material ribbon (namely, Fe-based amorphous alloy ribbon before laser processing) having a chemical composition of $Fe_{82}Si_4B_{14}$ and having a thickness of 25 μm and a width of 210 mm was produced by a single roll method.

The "chemical composition of $Fe_{82}Si_4B_{14}$" here means a chemical composition which consists of Fe, Si, B, and an impurity and in which the content of Fe is 82 atom %, the content of B is 14 atom %, and the content of Si is 4 atom % in a case in which the total content of Fe, Si, and B is 100 atom %.

Hereinafter, production of the material ribbon will be described in detail.

The material ribbon was produced by retaining a molten metal having a chemical composition of $Fe_{82}Si_4B_{14}$, at a temperature of 1300° C., next ejecting the molten metal through a slit nozzle onto a surface of an axially rotating cooling roll, and rapidly solidifying the molten metal ejected, on the surface of the cooling roll.

The ambient atmosphere immediately under the slit nozzle, in which a paddle of the molten metal was to be formed, on the surface of the cooling roll was a non-oxidative gas atmosphere.

The slit length and the slit width of the slit nozzle were 210 mm and 0.6 mm, respectively.

The material of the cooling roll was a Cu-based alloy, and the circumferential speed of the cooling roll was 27 m/s.

The pressure, at which the molten metal was ejected, and the nozzle gap (namely, the gap between the tip of the slit nozzle and the surface of the cooling roll) were adjusted so that the maximum cross-sectional height Rt (specifically, the maximum cross-sectional height Rt measured along the casting direction of the material ribbon) on the free solidified surface of the material ribbon produced was 3.0 μm or less.

<Laser Processing>

A sample piece was cut out from the material ribbon, and the sample piece cut out was subjected to laser processing, thereby obtaining a laser-processed Fe-based amorphous alloy ribbon piece.

Hereinafter, the detail will be described.

FIG. 1 is a schematic plan view schematically illustrating a free solidified surface of a laser-processed Fe-based amorphous alloy ribbon piece (ribbon 10).

The length L1 (namely, the length of the sample piece cut out from the material ribbon) of the ribbon 10 illustrated in FIG. 1 was 120 mm, and the width W1 (namely, the width of the sample piece cut out from the material ribbon) of the ribbon 10 was 25 mm. The sample piece was cut out in an orientation so that the length direction of the sample piece and the length direction of the material ribbon (casting direction) were matched and the width direction of the sample piece and the width direction of the material ribbon were matched.

The free solidified surface of the sample piece cut out was irradiated with a laser that uses a CW (continuous wave) oscillation method, whereby linear laser irradiation marks 12 were formed and thus the ribbon 10 was obtained.

Particularly, the linear laser irradiation marks 12 were formed on the free solidified surface of the sample piece (ribbon 10 before laser processing, the same shall apply hereinafter.) in a direction parallel to the width direction of the sample piece. The linear laser irradiation marks 12 were formed in the entire region in the width direction of the sample piece. In other words, the length of the linear laser irradiation marks in the width direction of the sample piece was set to be 100% with respect to the entire width of the sample piece. This means that a proportion of a length of the linear laser irradiation mark of the Fe-based amorphous alloy ribbon in the width direction to a total length of the ribbon in the width direction is 50% each in both directions from a midpoint of the ribbon in the width direction towards ends in the width direction.

The directions of the linear laser irradiation marks 12 were parallel to one another.

Sample pieces were prepared under different laser processing conditions. The laser processing conditions are shown in Table 1. Table 1 shows the line interval LP1 (mm), and the scanning speed (m/sec) and the laser output energy density (J/m) of the laser that uses a CW oscillation method. The laser output energy density is obtained by dividing the output power of the laser oscillator by the scanning speed. The laser output energy density is an index showing the intensity of the laser per unit length.

The conditions of irradiation of the laser that uses a CW (continuous wave) oscillation method were as follows.

(Conditions of Irradiation of CW Laser)

A laser oscillator used was a fiber laser (YLR-150-1500-QCW) from IPG Photonics Corporation. The laser medium of the laser oscillator was a glass fiber doped with Yb, and the oscillation wavelength is 1,064 nm.

The laser spot diameter on the free solidified surface of the sample piece was adjusted to 37.0 μm. The beam diameter was adjusted using a collimator lens: f100 mm and an fθ lens: focal distance 254 mm/processing point distance 297 mm as optical components.

A beam mode M2 was 1.05 (single mode).

The laser output power was 0 to 275 W, and the Focus was 0 mm.

The Focus mentioned here means a difference (absolute value) between the processing point distance (297 mm) of the condenser lens and an actual distance from the condenser lens to the free solidified surface of the ribbon.

The incident diameter D and the spot diameter DO satisfy a relationship of D0=4λf/πD (where λ represents the laser wavelength and f represents the focal distance), and thus the spot diameter DO tends to decrease as the focal distance of the collimator lens increases (namely, as the incident diameter D increases).

<Measurement and Evaluation>

The laser-processed Fe-based amorphous alloy ribbon (ribbon 10 in FIG. 1) was subject to a magnetic field heat treatment (nitrogen atmosphere) at 370° C., for 20 minutes, at 3,000 A/m. Thereafter, the following measurements and evaluations were performed. The results are shown in Tables 1 and 2.

<Maximum Cross-Sectional Height Rt of Non-Laser-Processed Region>

The maximum cross-sectional height Rt with respect to a portion, other than the portion where the linear laser irradiation marks 12 are formed, on the free solidified surface of the laser-processed Fe-based amorphous alloy ribbon (namely, non-laser-processed region) was measured with the evaluation length of 4.0 mm, the cutoff value of 0.8 mm, and the type of cutoff being 2RC (phase compensation) as complying with JIS B 0601:2001. The measurement of the maximum cross-sectional height Rt can be also performed before the laser processing. The direction of the evaluation length was set to be the casting direction of the material ribbon. The aforementioned measurement of the maximum cross-sectional height Rt with the evaluation length of 4.0 mm was specifically performed by successively measuring the maximum cross-sectional height Rt five times with the cutoff value of 0.8 mm.

The aforementioned measurement with the evaluation length of 4.0 mm was performed at three locations in the non-laser-processed region; an average value of the values obtained from the three measurements was used as the maximum cross-sectional height Rt (μm) in the present example.

As a result, the maximum cross-sectional height Rt of each sample piece was in a range from 1.0 to 2.5 μm.

<Measurement of Iron Loss CL>

The laser-processed Fe-based amorphous alloy ribbon was subjected to measurement of the iron loss CL by sinusoidal excitation with an AC magnetic measuring instrument in two conditions including a condition of a frequency of 60 Hz and a magnetic flux density of 1.45 T and a condition of a frequency of 60 Hz and a magnetic flux density 1.50 T.

<Measurement of Exciting Power VA>

The laser-processed Fe-based amorphous alloy ribbon was subjected to measurement of the exciting power VA by sinusoidal excitation with an AC magnetic measuring instrument in two conditions including a condition of a frequency of 60 Hz and a magnetic flux density of 1.45 T and a condition of a frequency of 60 Hz and a magnetic flux density 1.50 T.

<Measurement of Coercive Force Hc>

The laser-processed Fe-based amorphous alloy ribbon was subjected to measurement of the coercive force Hc by sinusoidal excitation with an AC magnetic measuring instrument in two conditions including a condition of a frequency of 60 Hz and a magnetic flux density of 1.45 T and a condition of a frequency of 60 Hz and a magnetic flux density 1.50 T.

Comparative Example 1

The same operation as in Example 1 was performed except that no laser processing was performed.

The results were shown in No. 1 of Tables 1 and 2.

[Table 1]

[Table 2]

Figure 2:
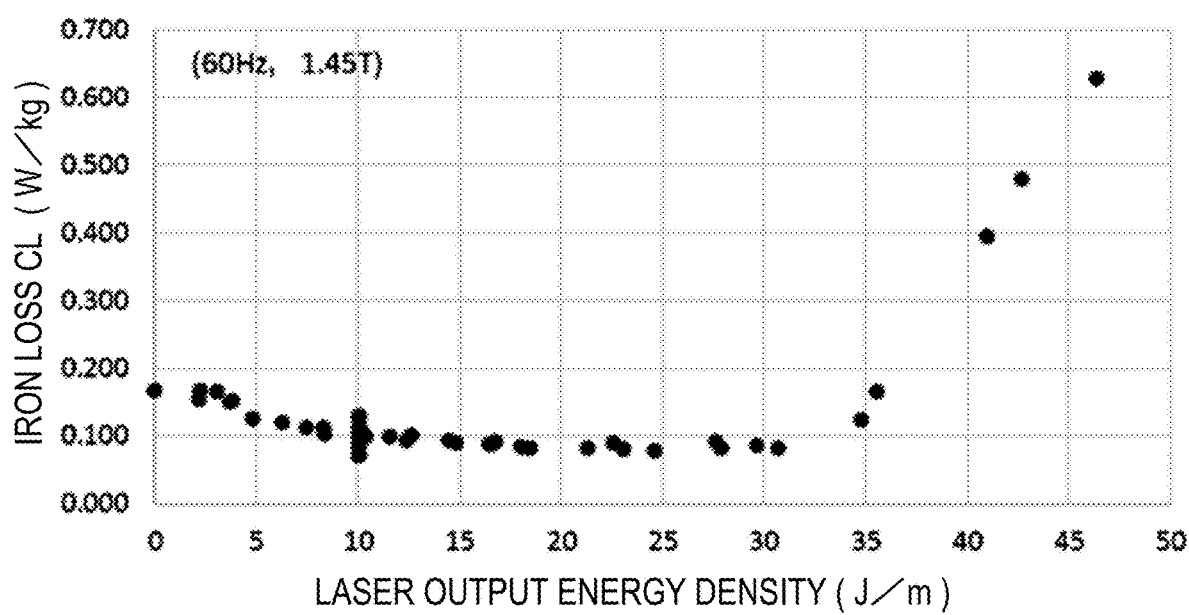
FIG. 2 is a diagram showing a relationship between a laser output energy density and an iron loss CL (60 Hz, 1.45 T).

FIG. 2 shows a relationship between the laser output energy density and the iron loss CL (60 Hz, 1.45 T) of each sample shown in Tables 1 and 2. Tables 1 and 2 and FIG. 2 show that, when the laser output energy density is 5 J/m or more and 35 J/m or less, the iron loss CL (60 Hz, 1.45 T) is 0.150 W/kg or less. An Fe-based amorphous alloy ribbon with low loss was obtained at 60 Hz, 1.45 T.

Figure 3:
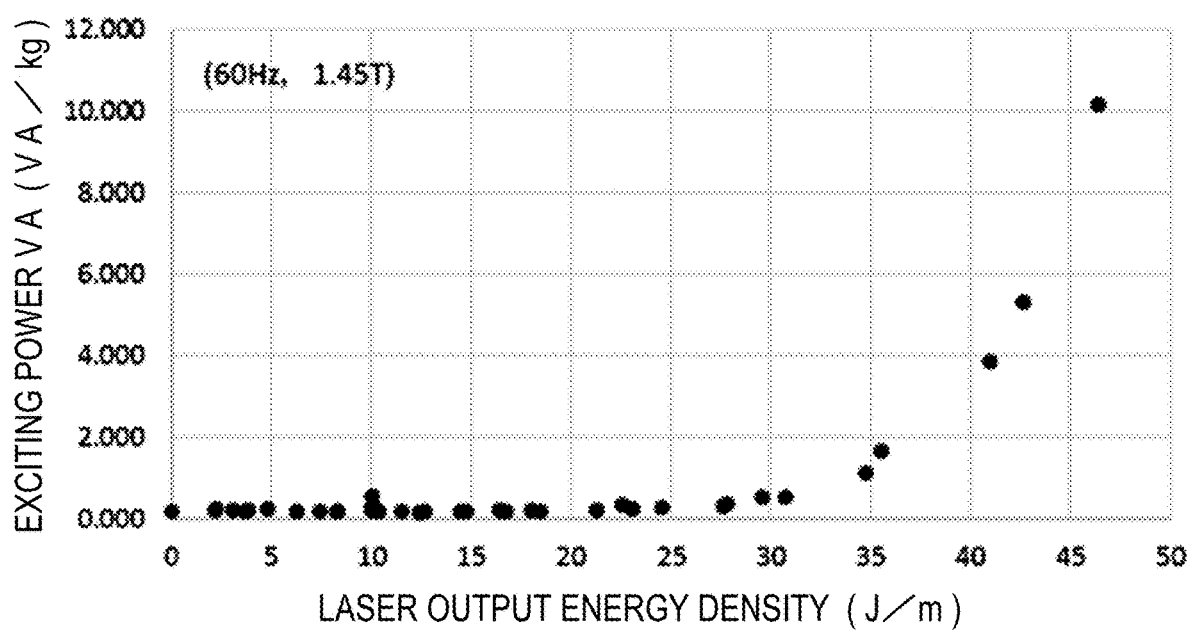
FIG. 3 is a diagram showing a relationship between the laser output energy density and an exciting power VA (60 Hz, 1.45 T).

FIG. 3 shows a relationship between the laser output energy density and the exciting power VA (60 Hz, 1.45 T) of each sample shown in Tables 1 and 2. Tables 1 and 2 and FIG. 3 show that the exciting power VA sharply increases when the laser output energy density exceeds 35 J/m. Accordingly, a significant increase in the exciting power VA can be inhibited by setting the laser output energy density to 35 J/m or less. The increase in the exciting power VA is further inhibited when the laser output energy density is 31 J/m or less.

Figure 4:
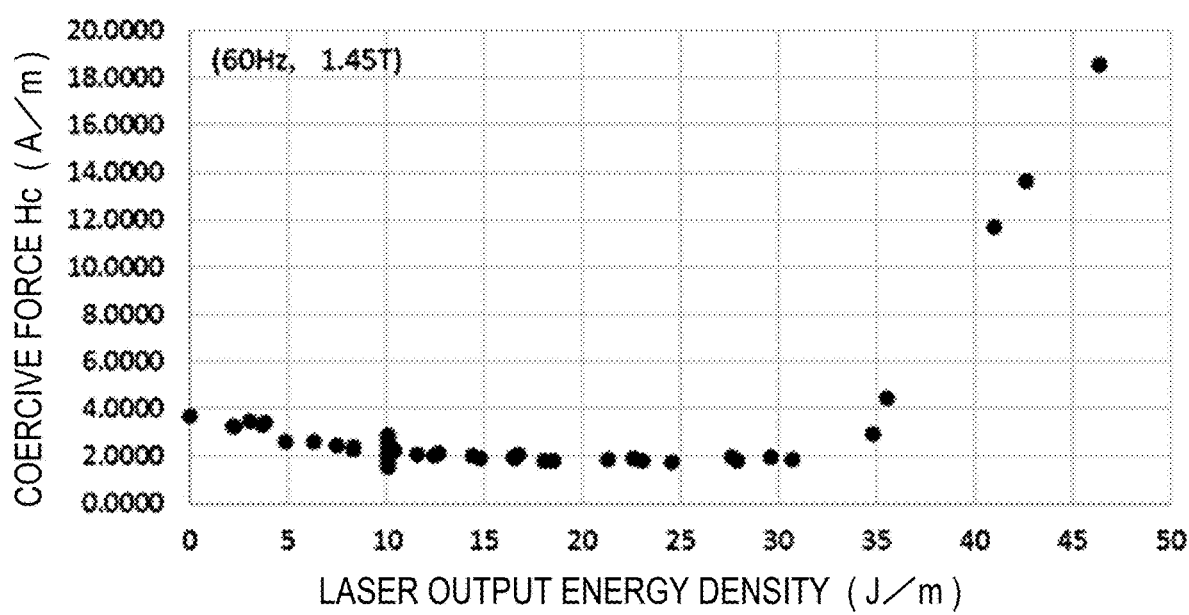
FIG. 4 is a diagram showing a relationship between the laser output energy density and a coercive force Hc (60 Hz, 1.45 T).

FIG. 4 shows a relationship between the laser output energy density and the coercive force Hc (60 Hz, 1.45 T) of each sample shown in Tables 1 and 2. Tables 1 and 2 and FIG. 4 show that the coercive force Hc sharply increases when the laser output energy density exceeds 35 J/m. Accordingly, the coercive force Hc can be reduced by setting the laser output energy density to 35 J/m or less. The coercive force Hc of 3.0 A/m or less is obtained when the laser output energy density is 5 J/m to 35 J/m.

Figure 5A:
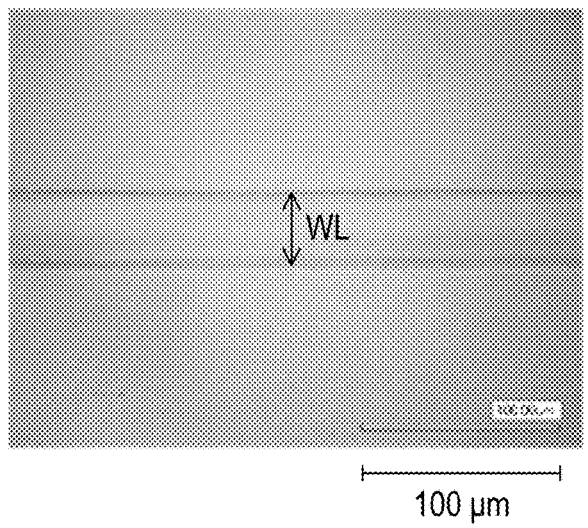
FIG. 5A is a micrograph of a linear laser irradiation mark of No. 13 of Example 1.
Figure 5B:
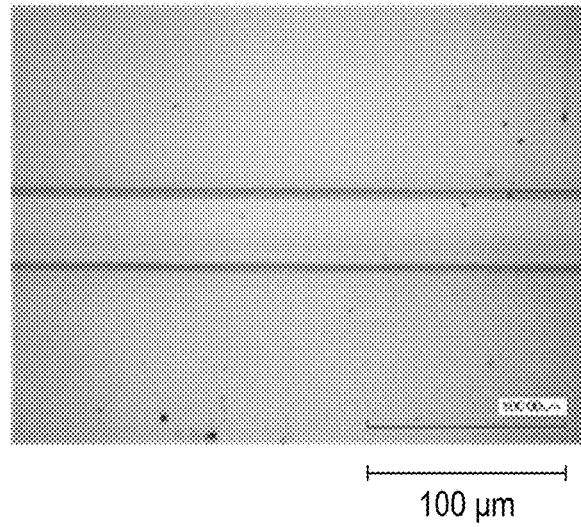
FIG. 5B is a micrograph of a linear laser irradiation mark of No. 17 of Example 1.
Figure 5C:
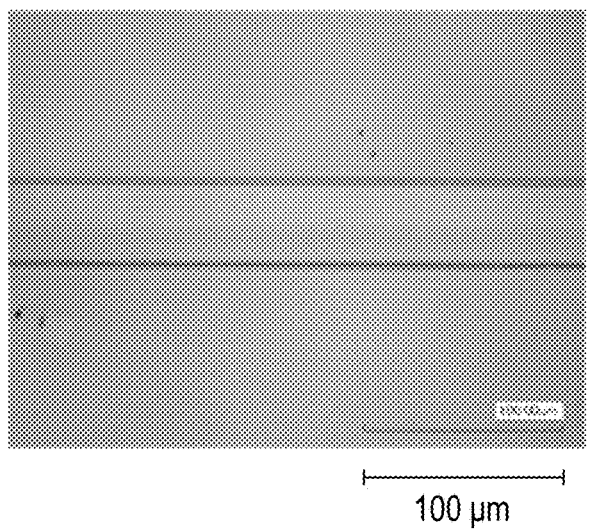
FIG. 5C is a micrograph of a linear laser irradiation mark of No. 20 of Example 1.
Figure 5D:
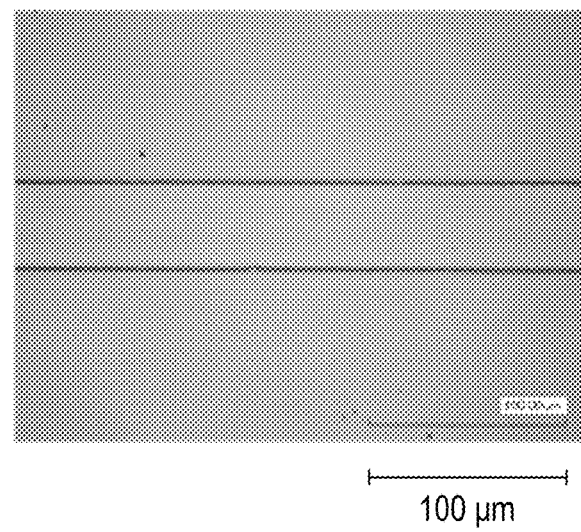
FIG. 5D is a micrograph of a linear laser irradiation mark of No. 24 of Example 1.
Figure 6A:
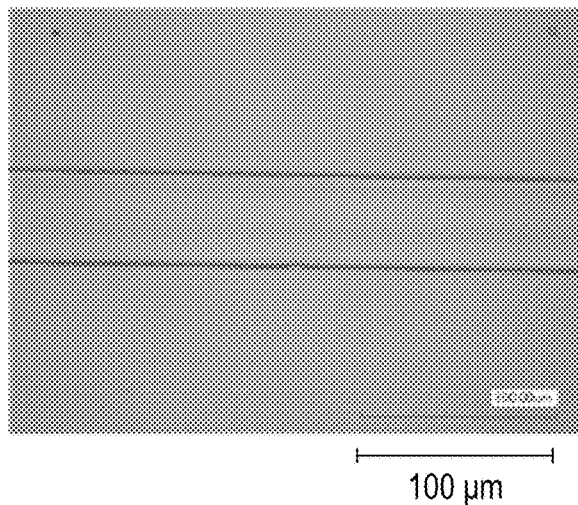
FIG. 6A is a micrograph of a linear laser irradiation mark of No. 26 of Example 1.
Figure 6B:
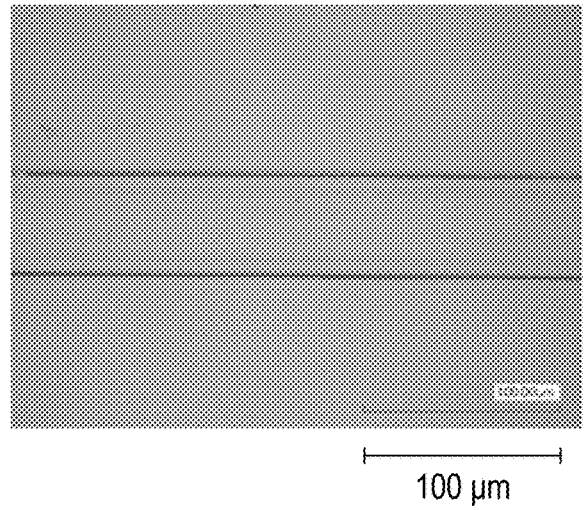
FIG. 6B is a micrograph of a linear laser irradiation mark of No. 28 of Example 1.
Figure 6C:
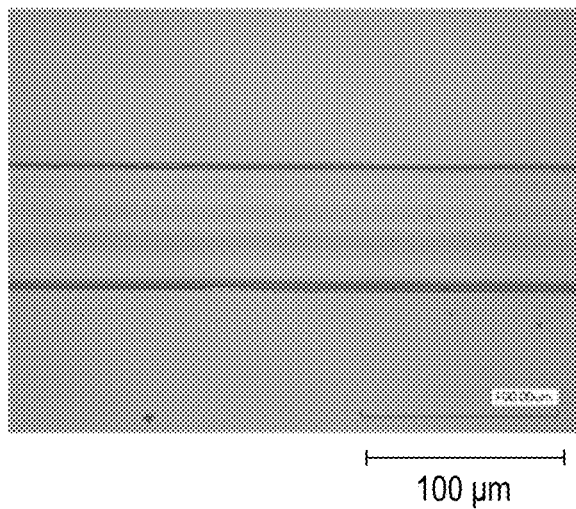
FIG. 6C is a micrograph of a linear laser irradiation mark of No. 34 of Example 1.
Figure 6D:
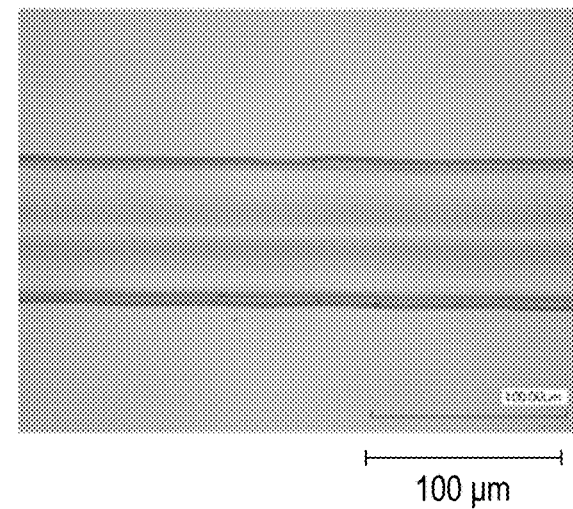
FIG. 6D is a micrograph of a linear laser irradiation mark of No. 36 of Example 1.

FIGS. 5A-5D and 6A-6D show micrographs of linear laser irradiation marks of Examples taken with a laser microscope. FIGS. 5A-5D show respective micrographs of Nos. 13, 17, 20, and 24 of Table 1, and FIGS. 6A-6D show respective micrographs of Nos. 26, 28, 34, and 36 of Table 1. FIG. 5A corresponds to No. 13, FIG. 5B corresponds to No. 17, FIG. 5C corresponds to No. 20, FIG. 5D corresponds to No. 24, FIG. 6A corresponds to No. 26, FIG. 6B corresponds to No. 28, FIG. 6C corresponds to No. 34, and FIG. 6D corresponds to No. 36. Other Examples were also observed; however, they are similar to the forms shown in FIGS. 5A-5D and 6A-6D.

The micrographs were taken at a magnification of 1000×.

Figure 18:
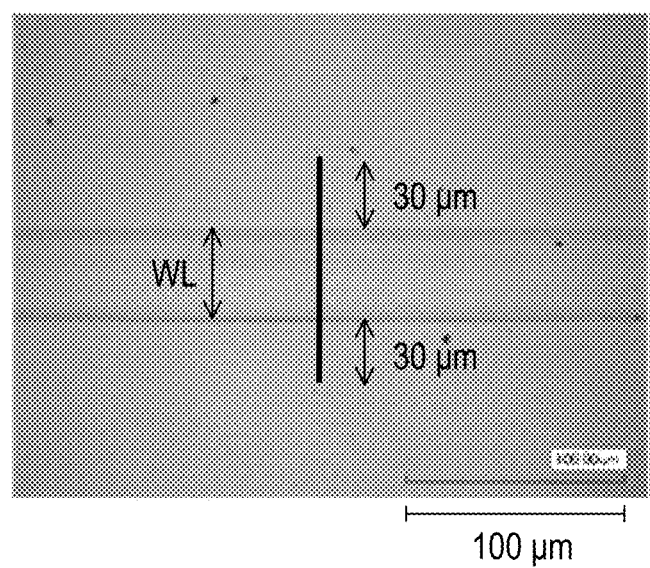
FIG. 18 is a micrograph of the linear laser irradiation mark.

As shown in FIGS. 5A-5D and 6A-6D, the linear laser irradiation marks of the Examples have a straight line shape (extend in the lateral direction in the figures). The appearance (color, shape) of the linear laser irradiation marks has changed by the laser irradiation. It is considered that the appearance has changed due to the melt-solidification of the ribbon. A width of a portion with the changed appearance (see FIG. 5A; width of the melt-solidified portion; length in the up-down direction in the figure) was defined as the line width WL of the linear laser irradiation mark. The line width was determined by measuring the width of the melt-solidified portion of the ribbon with a laser microscope. Specifically, a color 3D laser microscope VK-8710 (from KEYENCE Corporation) and a 50× objective lens CF IC EPI Plan 50× (from Nikon Corporation) are used to photograph the surface shape (at a magnification of 1000× (objective lens 50×× monitor magnification 20×)). FIG. 18 shows an example of an optical photograph (micrograph) taken with a laser microscope. The line width WL (width of the melt-solidified portion) was measured from the optical photograph. Table 1 shows the measured line width WL. In the present Example, the line width WL was measured at a portion at which the maximum line width value is approximately obtained. Measurements were made at three locations at which maximum line width values are approximately obtained to determine the average value.

The linear laser irradiation marks are melt-solidified by the laser, and shape deformation occurs during the melt-solidification. As a result, unevenness is formed on the surface. The unevenness on the surface was observed in the width direction of the linear laser irradiation mark (which corresponds to the casting direction, which corresponds to the up-down direction of FIGS. 5A-5D and 6A-6D). The laser microscope (the aforementioned color 3D laser microscope VK-8710, with the same magnification) was used for the observation. Specifically, a profile of the linear laser irradiation mark in the width direction is measured with the laser microscope. As shown in FIG. 18, a width of approximately 30 μm was added to each end of the line width WL, and a profile therebetween (30 μm+line width WL+30 μm) was measured.

Figure 7:
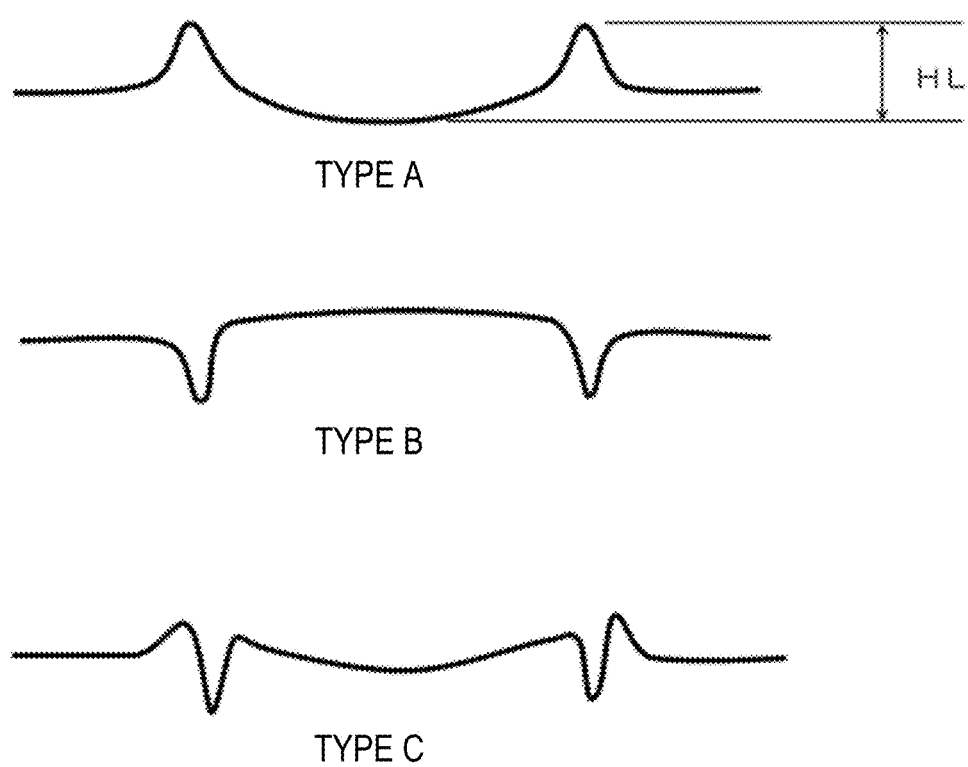
FIG. 7 is a schematic diagram showing unevenness on a surface of a linear laser irradiation mark.

The profile has the form as shown in FIG. 7. The height difference HL was measured from the profile. In a case in which the profile is inclined, the measurement was performed by linearly correcting the inclination, using the margin of 30 μm added to each end, so that the profile is in the horizontal direction.

The unevenness on the surface was roughly divided into Type A, Type B, and Type C shown in FIG. 7. Each type of FIG. 7 schematically shows a large change in shape, although there actually exists fine unevenness. The shape shown in FIG. 7 corresponds to the surface state of a cross-section of the Fe-based amorphous alloy ribbon, and unevenness was formed on the deformed portion (portion where the linear laser irradiation marks were formed). In the uneven portion, the difference (height difference HL) between the highest point (corresponds to the highest point in the thickness direction of the ribbon, and corresponds to the top of the figure) and the lowest point (corresponds to the lowest point in the thickness direction of the ribbon, and corresponds to the bottom of the figure) was measured from the profile as mentioned above. In the present Example, no significant fluctuation was observed in the unevenness of the linear laser irradiation marks in the width direction of the ribbon. The height difference HL was measured at three locations for each linear laser irradiation mark to determine the average value.

Table 1 shows the resulted height differences HL. Table 1 also shows the results obtained by multiplying the height difference HL and the line width WL.

Figure 8:
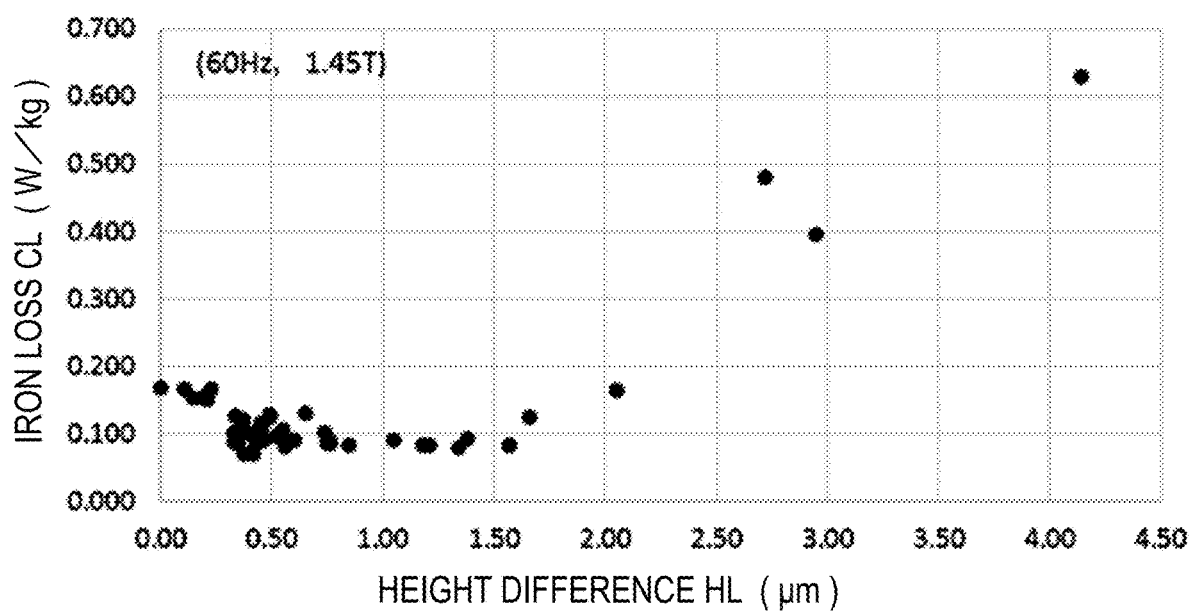
FIG. 8 is a diagram showing a relationship between a height difference HL and the iron loss CL (60 Hz, 1.45 T).

FIG. 8 shows a relationship between the height difference HL and the iron loss CL (60 Hz, 1.45 T) of each sample shown in Tables 1 and 2. In view of Tables 1 and 2 and FIG. 8, when the height difference HL is 0.25 μm or more and 2.0 μm or less, the iron loss CL (60 Hz, 1.45 T) is 0.150 W/kg or less. An Fe-based amorphous alloy ribbon with low loss was obtained at 60 Hz and 1.45 T.

Figure 9:
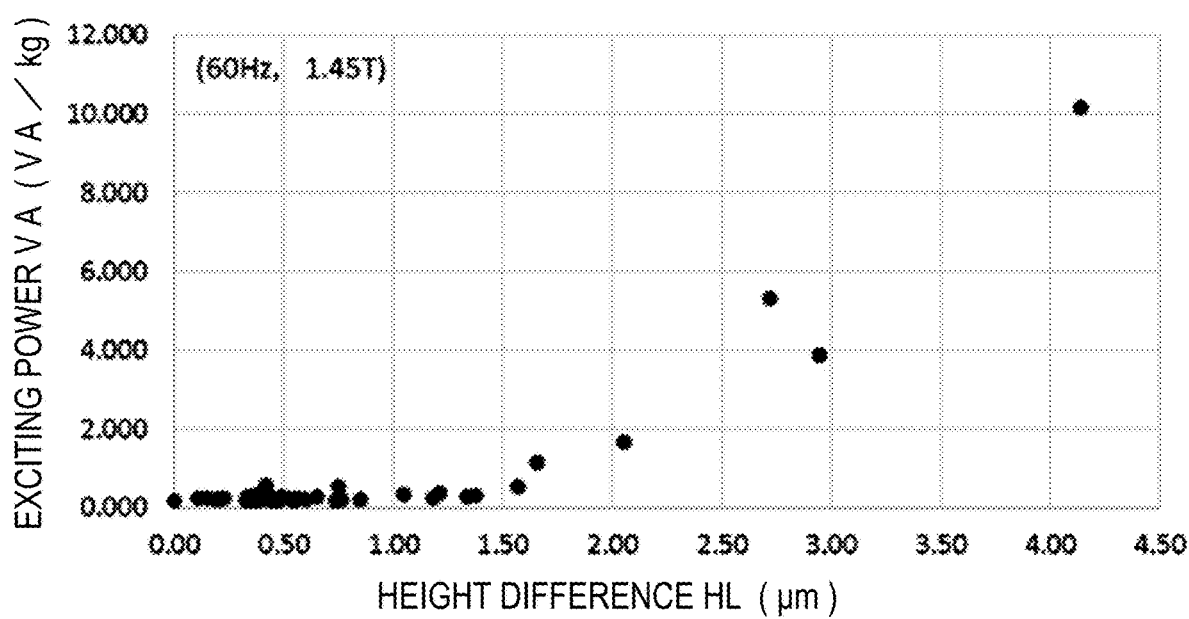
FIG. 9 is a diagram showing a relationship between the height difference HL and the exciting power VA (60 Hz, 1.45 T).

FIG. 9 shows a relationship between the height difference HL and the exciting power VA (60 Hz, 1.45 T) of each sample shown in Tables 1 and 2. Tables 1 and 2 and FIG. 9 show that the exciting power VA sharply increases when the height difference HL exceeds 2.0 μm. Accordingly, a large increase in the exciting power VA can be inhibited by setting the height difference HL to 2.0 μm or less.

Figure 10:
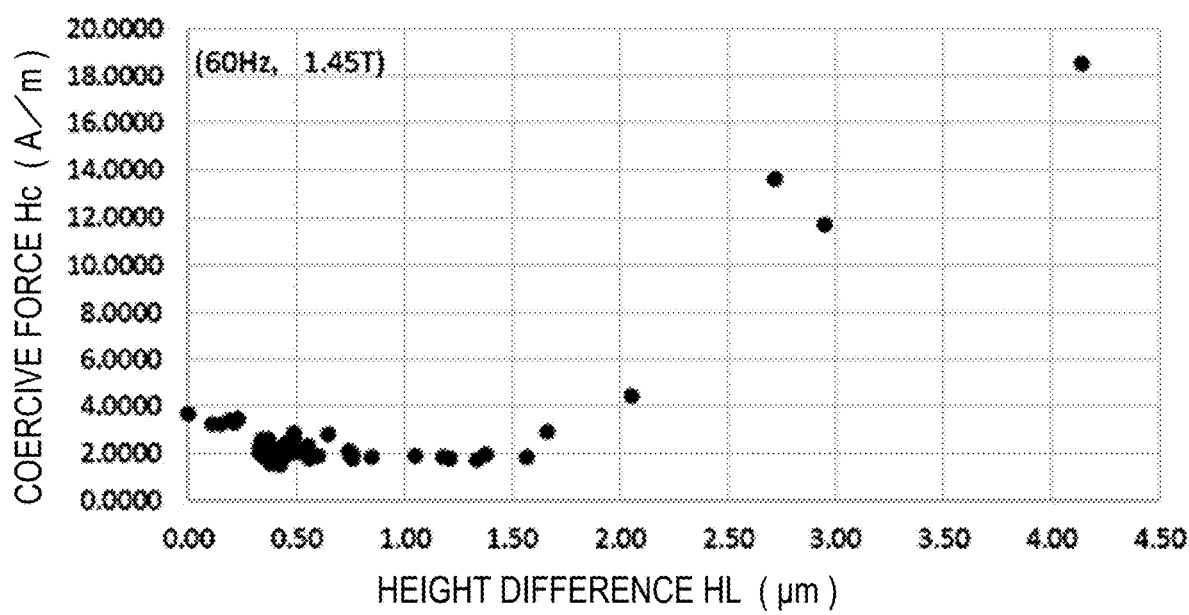
FIG. 10 is a diagram showing a relationship between the height difference HL and the coercive force Hc (60 Hz, 1.45 T).

FIG. 10 shows a relationship between the height difference HL and the coercive force Hc (60 Hz, 1.45 T) of each sample shown in Tables 1 and 2. Tables 1 and 2 and FIG. 10 show that the coercive force Hc sharply increases when the height difference HL exceeds 2.0 μm. Accordingly, the coercive force Hc can be reduced by setting the height difference HL to 2.0 μm or less. The coercive force Hc of 3.0 A/m or less was obtained when the height difference HL is 0.25 μm to 2.0 μm.

Figure 11:
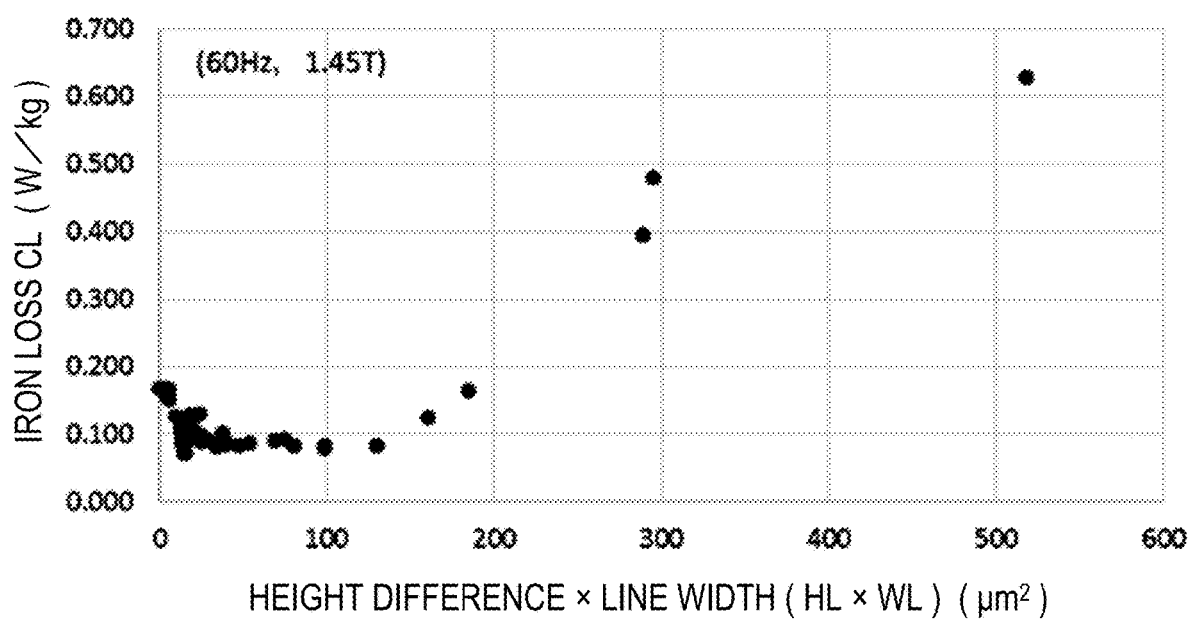
FIG. 11 is a diagram showing a relationship between the height difference HL×line width WL and the iron loss CL (60 Hz, 1.45 T).

FIG. 11 shows a relationship between the height difference HL×line width WL and the iron loss CL (60 Hz, 1.45 T) of each sample shown in Tables 1 and 2. In view of Tables 1 and 2 and FIG. 11, the iron loss CL (60 Hz, 1.45 T) is 0.150 W/kg or less when the height difference HL×line width WL is 6.0 to 180 μm². An Fe-based amorphous alloy ribbon with low loss was obtained at 60 Hz and 1.45 T.

Figure 12:
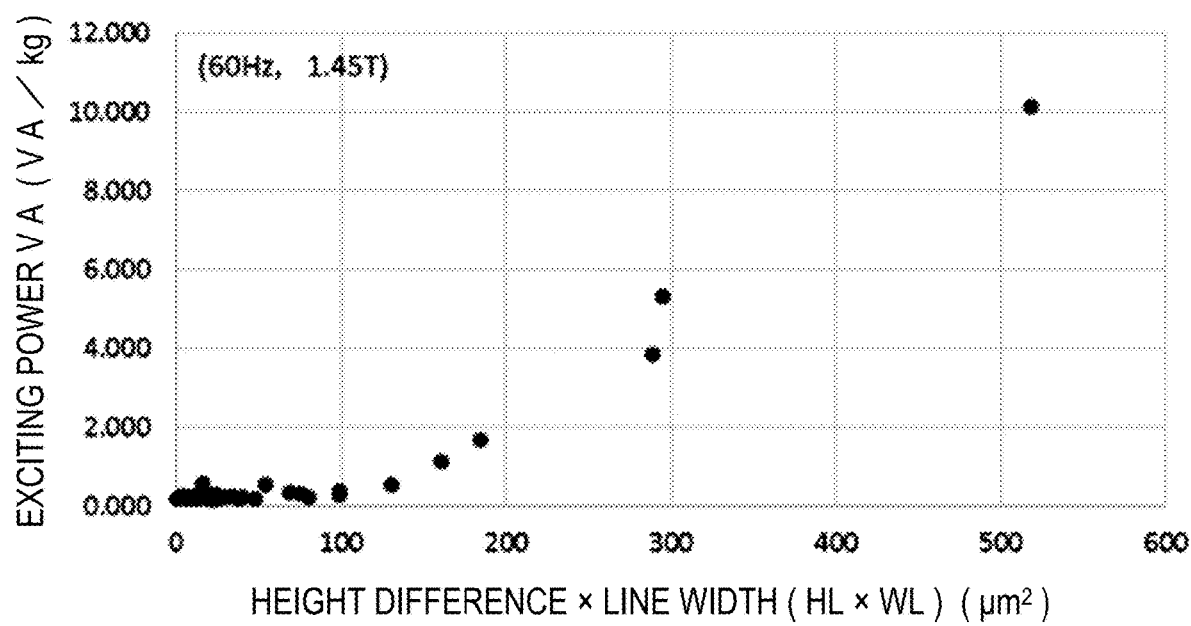
FIG. 12 is a diagram showing a relationship between the height difference HL×line width WL and the exciting power VA (60 Hz, 1.45 T).

FIG. 12 shows a relationship between the height difference HL×line width WL and the exciting power VA (60 Hz, 1.45 T) of each sample shown in Tables 1 and 2. Tables 1 and 2 and FIG. 12 show that the exciting power VA sharply increases when the height difference HL×line width WL exceeds 180 μm². Accordingly, a large increase in the exciting power VA can be inhibited by setting the height difference HL to 180 μm² or less.

Figure 13:
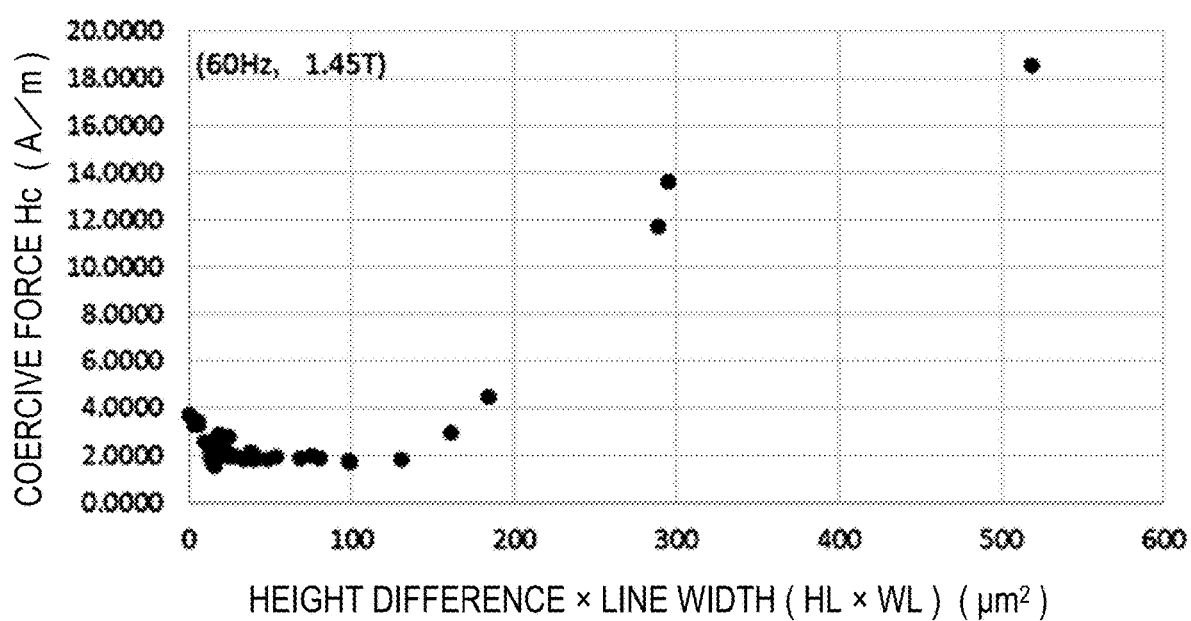
FIG. 13 is a diagram showing a relationship between the height difference HL×line width WL and the coercive force Hc (60 Hz, 1.45 T).

FIG. 13 shows a relationship between the height difference HL×line width WL and the coercive force Hc (60 Hz, 1.45 T) of each sample shown in Tables 1 and 2. Tables 1 and 2 and FIG. 13 show that the coercive force Hc can be reduced when the height difference HL×line width WL is 6.0 to 180 μm². The coercive force Hc of 3.0 A/m or less was obtained when the height difference HL×line width WL is 6.0 to 180 μm².

Figure 14:
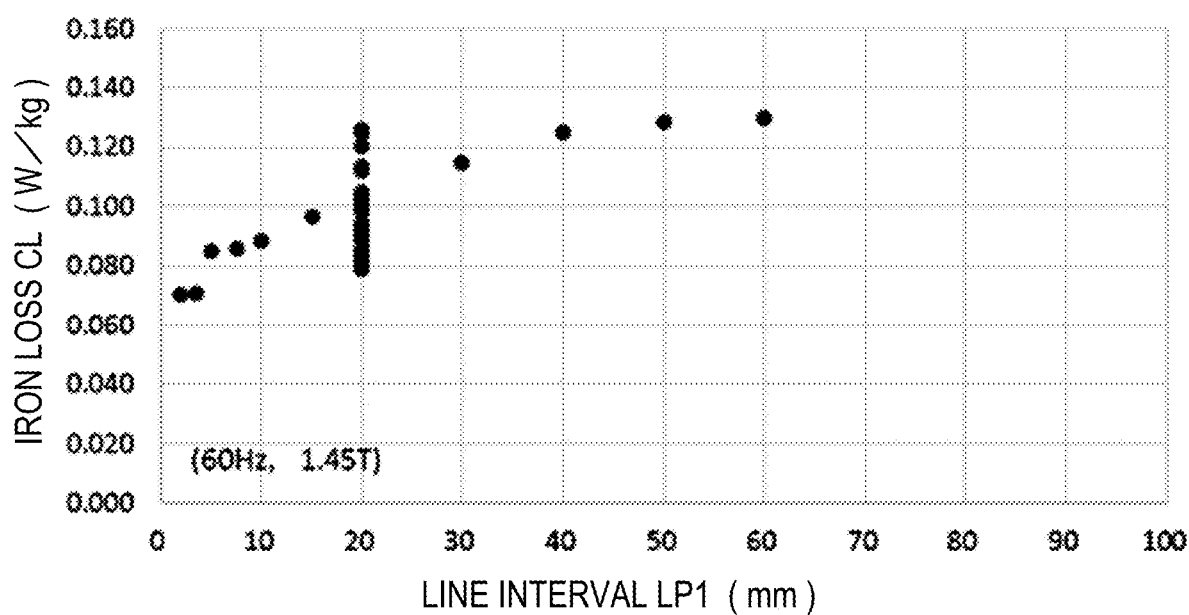
FIG. 14 is a diagram showing a relationship between a line interval LP1 and the iron loss CL (60 Hz, 1.45 T).

FIG. 14 shows a relationship between the line interval LP1 and the iron loss CL (60 Hz, 1.45 T) of Examples (excluding Comparative Examples) shown in Tables 1 and 2. In view of Tables 1 and 2 and FIG. 14, when the line interval is 2 mm or more and 60 mm or less, the iron loss CL (60 Hz, 1.45 T) is 0.150 W/kg or less. An Fe-based amorphous alloy ribbon with low loss was obtained at 60 Hz and 1.45 T. In view of FIG. 14, there is no tendency for the iron loss to sharply increase even if the line interval LP1 is broadened. It is considered that an Fe-based amorphous alloy ribbon reduced in the iron loss CL (60 Hz, 1.45 T) is obtained even if the line interval is 80 mm, 100 mm, or 200 mm, which exceeds 60 mm.

<Characteristics at Frequency of 1 kHz and Magnetic Flux Density of 1 T>

The Iron Loss CL and the Exciting Power VA were Evaluated, Using the samples of Example 1, under the condition of a frequency of 1 kHz and a magnetic flux density of 1 T. The results were shown in Table 3. Numbers of Table 3 correspond to the numbers of Table 1.

Figure 19:
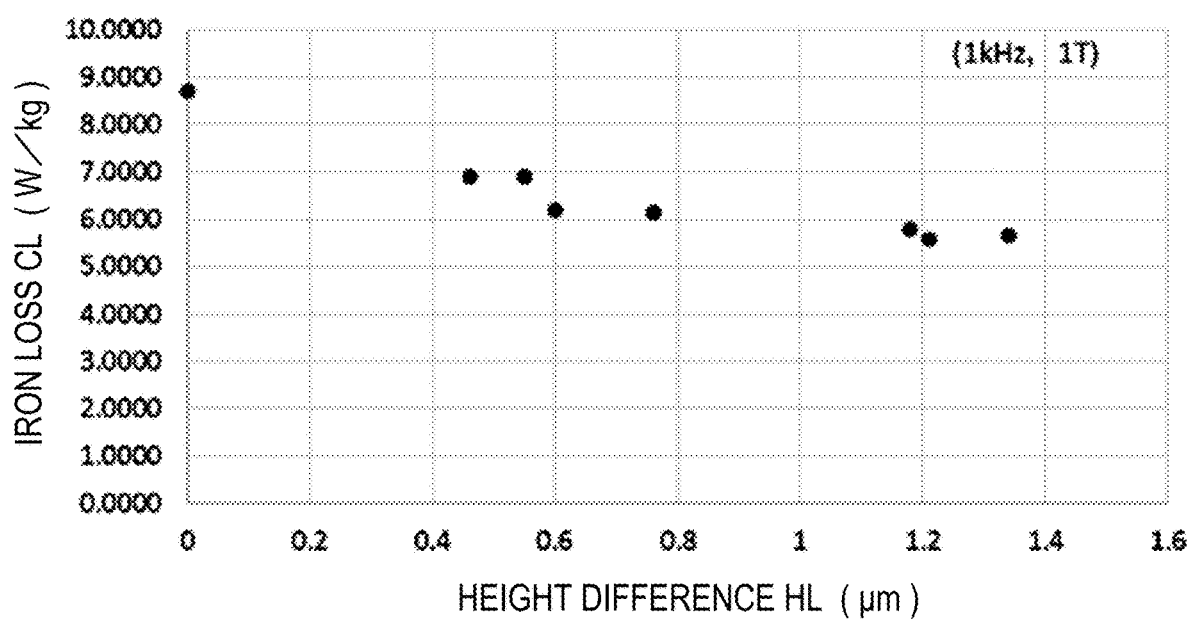
FIG. 19 is a diagram showing a relationship between the height difference HL and the iron loss CL (1 kHz, 1 T).

FIG. 19 shows a relationship between the height difference HL and the iron loss CL (1 kHz, 1 T). Table 3 and FIG. 19 show that the Fe-based amorphous alloy ribbon of the present disclosure has an iron loss of 8.6 W/kg or less under the condition of a frequency of 1 kHz and a magnetic flux density of 1 T, and formation of the linear laser irradiation marks of the present disclosure can reduce the iron loss at high frequencies. The iron loss (1 kHz, 1T) tends to be reduced as the height difference is larger.

Figure 20:
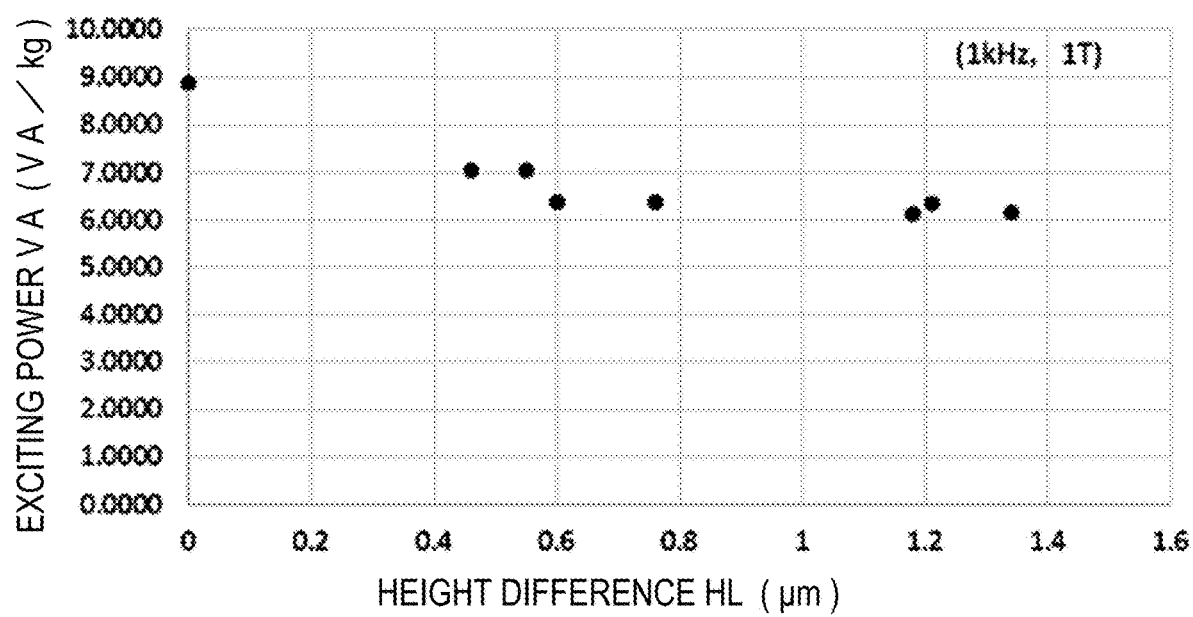
FIG. 20 is a diagram showing a relationship between the height difference HL and the exciting power VA (1 kHz, 1 T).

FIG. 20 shows a relationship between the height difference HL and the exciting power VA (1 kHz, 1 T). Table 3 and FIG. 20 show that the Fe-based amorphous alloy ribbon of the present disclosure has an exciting power of 8.7 VA/kg or less under the condition of a frequency of 1 kHz and a magnetic flux density of 1 T, and formation of the linear laser irradiation marks of the present disclosure can reduce the exciting power at high frequencies. The exciting power (1 kHz, 1 T) tends to be reduced as the height difference is larger.

Figure 21:
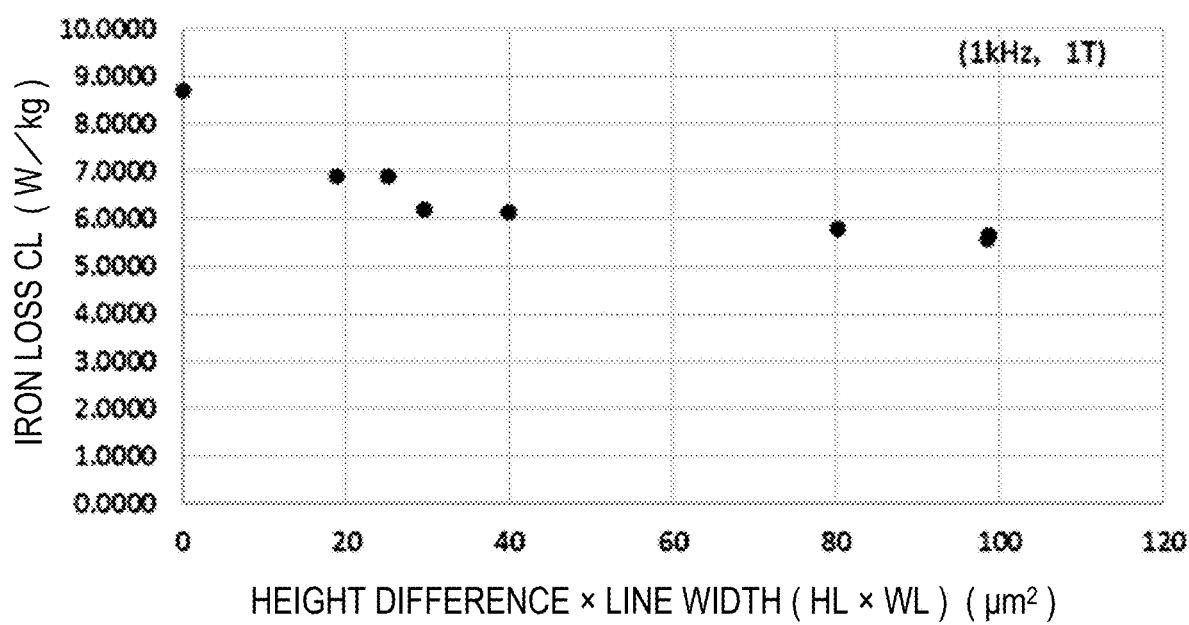
FIG. 21 is a diagram showing a relationship between the height difference HL×line width WL and the iron loss CL (1 kHz, 1 T).

FIG. 21 shows a relationship between the height difference HL×line width WL and the iron loss CL (1 kHz, 1 T). Table 3 and FIG. 21 show that the Fe-based amorphous alloy ribbon of the present disclosure has an iron loss of 8.6 W/kg or less under the condition of a frequency 1 kHz and a magnetic flux density of 1 T, and formation of the linear laser irradiation marks of the present disclosure can reduce the iron loss at high frequencies. The iron loss CL (1 kHz, 1 T) tends to be reduced as the height difference HL×line width WL is larger.

Figure 22:
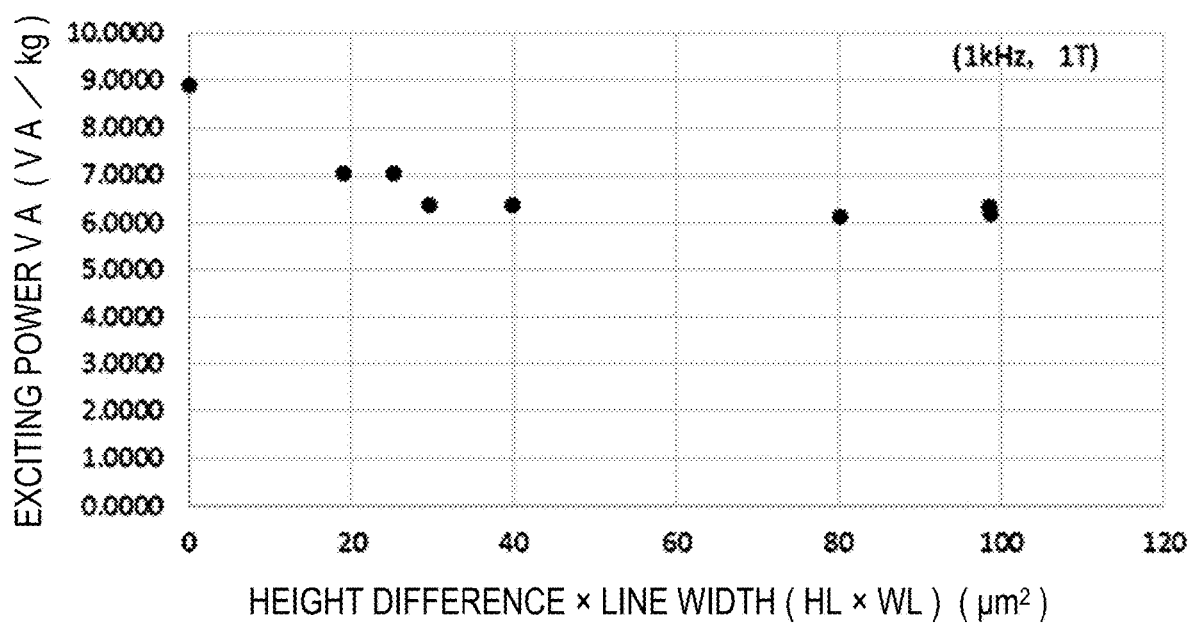
FIG. 22 is a diagram showing a relationship between the height difference HL×line width WL and the exciting power VA (1 kHz, 1 T).

FIG. 22 shows a relationship between the height difference HL×line width WL and the exciting power VA (1 kHz, 1 T). Table 3 and FIG. 22 show that the Fe-based amorphous alloy ribbon of the present disclosure has an exciting power of 8.7 VA/kg or less under the condition of a frequency of 1 kHz and a magnetic flux density of 1 T, and formation of the linear laser irradiation marks of the present disclosure can reduce the exciting power at high frequencies.

Figure 23:
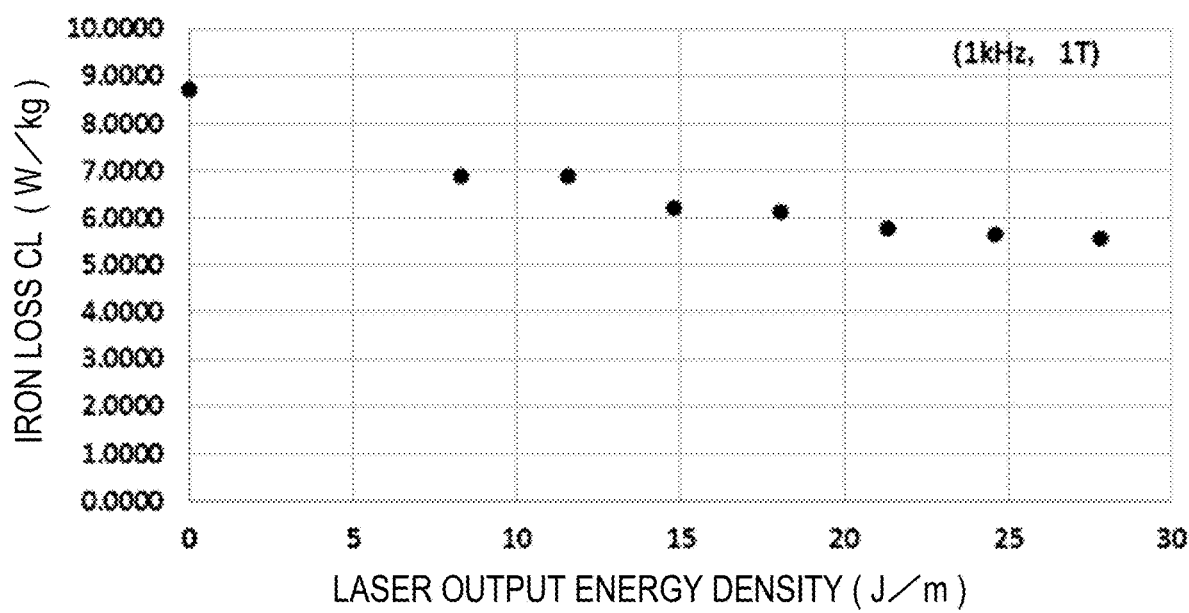
FIG. 23 is a diagram showing a relationship between the laser output energy density and the iron loss CL (1 kHz, 1 T).

FIG. 23 shows a relationship between the laser output energy density and the iron loss CL (1 kHz, 1 T). Table 3 and FIG. 23 show that the Fe-based amorphous alloy ribbon of the present disclosure has an iron loss of 8.6 W/kg or less under the condition of a frequency of 1 kHz and a magnetic flux density of 1 T, and formation of the linear laser irradiation marks of the present disclosure can reduce the iron loss at high frequencies. The iron loss CL (1 kHz, 1 T) tends to be reduced as the laser output energy density is larger.

Figure 24:
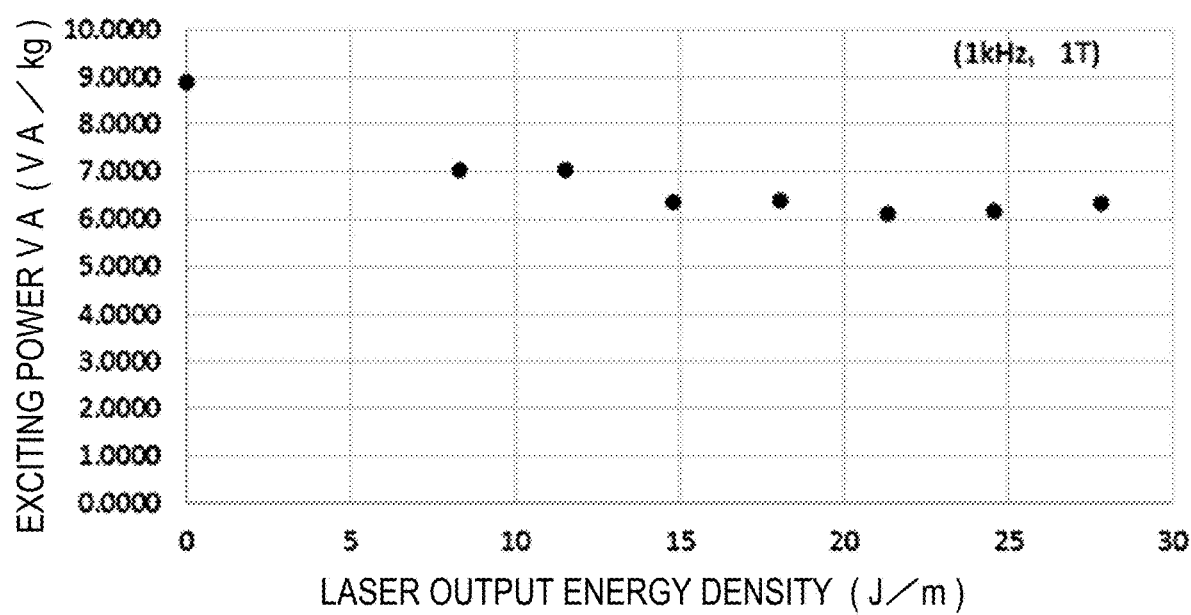
FIG. 24 is a diagram showing a relationship between the laser output energy density and the exciting power VA (1 kHz, 1 T).

FIG. 24 shows a relationship between the laser output energy density and the exciting power VA (1 kHz, 1 T). Table 3 and FIG. 24 show that the Fe-based amorphous alloy ribbon of the present disclosure has an exciting power of 8.7 VA/kg or less under the condition of a frequency of 1 kHz and a magnetic flux density of 1 T, and formation of the linear laser irradiation marks of the present disclosure can reduce the exciting power at high frequencies.

As described above, it is found that the Fe-based amorphous alloy ribbon of the present disclosure is also useful for high frequencies.

[Table 3]

<Characteristics Before Heat Treatment>

Characteristics before heat treatment were evaluated using the samples of Example 1. The results are shown in Table 4.

Numbers of Table 4 correspond to the numbers of Table 1. Evaluations of the characteristics are expressed in values obtained from a DC B-H loop measured at a maximum applied magnetic field of 800 A/m.

The Fe-based amorphous alloy ribbon of the present disclosure before the heat treatment has a coercive force Hc of 5.0 A/m or less. The square ratio was 40% or less. An effect of segmenting the magnetic domain is obtained on the ribbon before the heat treatment by laser irradiation, and the ribbon was easily magnetized.

[Table 4]

Example 2

Formation of Linear Laser Irradiation Mark on Roll Surface

Figure 15:
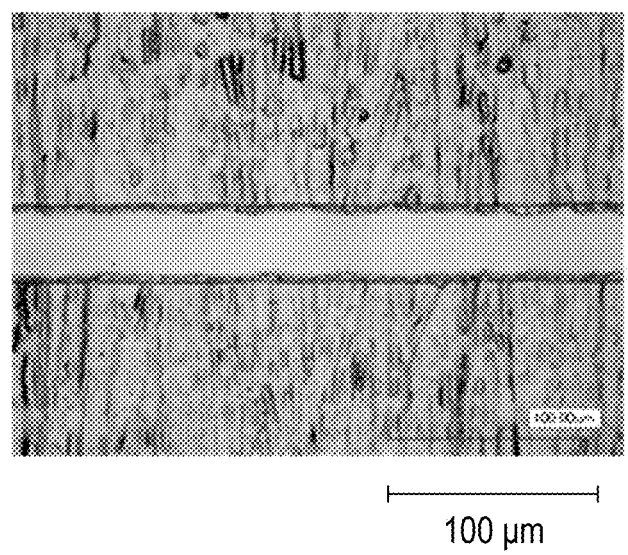
FIG. 15 is a micrograph of a linear laser irradiation mark of Example 2.

Linear laser irradiation marks were formed on a roll surface of a material ribbon, which is the same material ribbon as the material ribbon used in Example 1, at a line interval LP1 of 20 mm, a scanning speed of 5 m/sec, and a laser output energy density of 10 J/m. FIG. 15 shows an observation photo of the linear laser irradiation mark. The heat treatment conditions were the same as those used in Example 1.

The height difference HL of Example 2 was 1.04 μm, the line width WL was 38.56 μm, and the height difference HL×line width WL was 40.10 μm². The iron loss CL, the exciting power VA, and the coercive force Hc under the condition of a frequency of 60 Hz and a magnetic flux density of 1.45 T were respectively 0.0979 W/kg, 0.2413 VA/kg, and 2.0868 A/m, and the form of the linear laser irradiation marks and the characteristics obtained were the same as those of the Fe-based amorphous alloy ribbon of Example 1 in which the linear laser irradiation marks were formed on the free solidified surface. Accordingly, it is found that substantially the same characteristics are obtained regardless of whether the linear laser irradiation marks are formed on the free solidified surface or on the roll surface.

Example 3

Figure 16A:
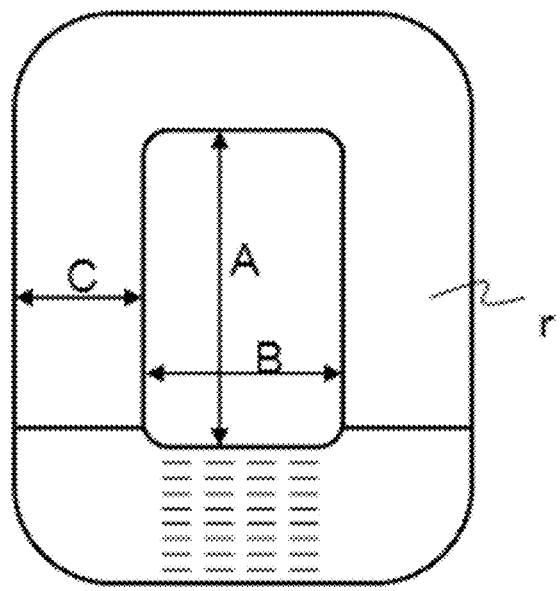
FIG. 16A is a plan view showing an example of an iron core obtained by bending and winding, in an overlapping manner, Fe-based amorphous alloy ribbons layered.
Figure 16B:
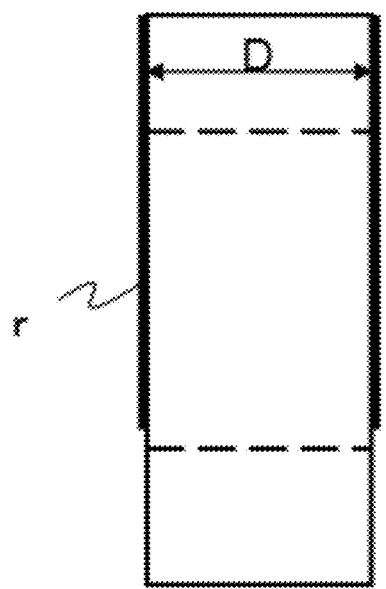
FIG. 16B is a side view of the iron core in FIG. 16A.

An Fe-based amorphous alloy ribbon (chemical composition: $Fe_{82}Si_4B_{14}$, thickness: 25 μm, width: 142 mm) was obtained in the same manner as in Example 1. Linear laser irradiation marks were formed at a line interval LP1 of 20 mm, a scanning speed of 8 m/sec, and a laser output energy density of 12 J/m, and Fe-based amorphous alloy ribbon pieces were prepared. The laser processing condition is the same as that of No. 24 of Example 1, and the unevenness of the linear laser irradiation mark was equivalent to that of No. 24. Ribbon pieces obtained were layered to form a laminated body, the laminated body was bent into a U-shape and wound with both ends thereof being overlapped, thereby providing an iron core having structures shown in FIG. 16 (FIGS. 16A and 16B). The shape of the iron core had a window frame height A of 330 mm, a window frame width B of 110 mm, a ribbon layer thickness C of 55 mm, and a height D of 142 mm (146 mm in a case in which the thickness of a resin coating described below was included), as shown in FIG. 16. The lamination factor and the weight of the iron core were 86% and 53 kg, respectively.

The iron core was wound in an overlapping manner in a lower portion in FIG. 16. When the ribbon pieces were layered to provide a laminated body, a resin coating r was applied to a laminated surface at the halfway of the laminated body so that the ribbon pieces were not away from one another.

The resulting iron core was subjected to measurements of the iron loss CL and the exciting power VA.

Figure 17:
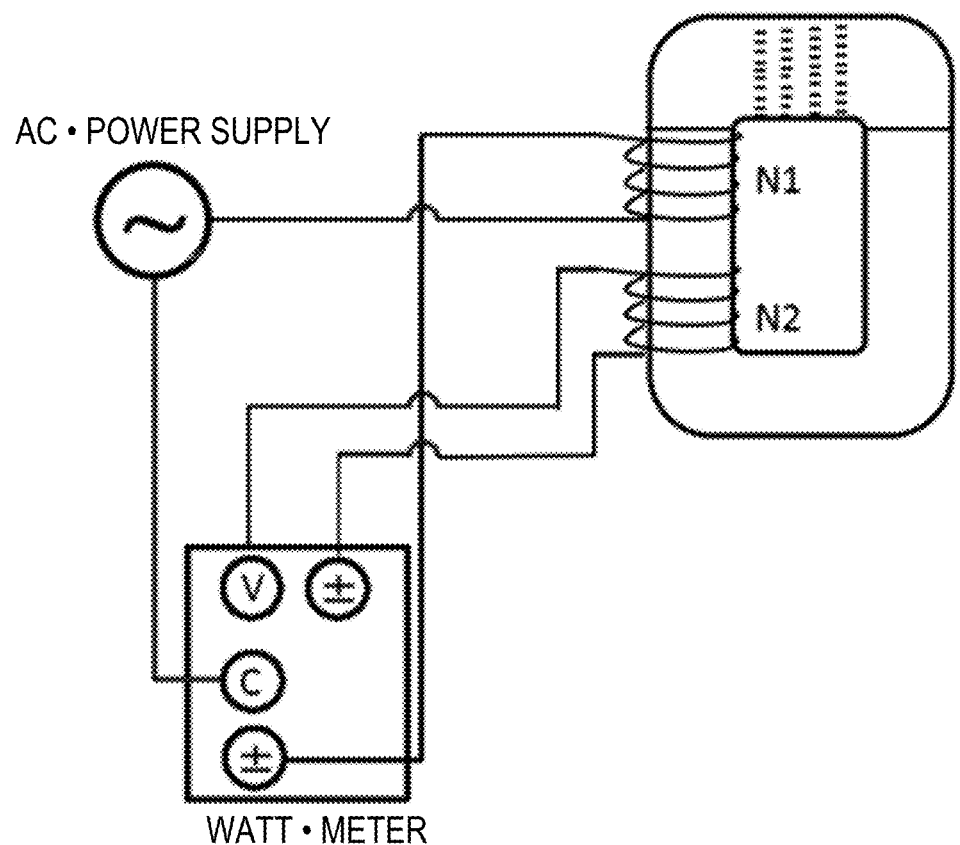
FIG. 17 is a circuit diagram showing a circuit for transformation by winding a primary winding wire (N1) and a secondary winding wire (N2) around the iron core, as one example shown in FIG. 16A.

As shown in FIG. 17, a primary winding wire (N1) and a secondary winding wire (N2) were wound as coils onto the iron core, and the frequency was 60 Hz and the magnetic flux densities were 1.45 T and 1.5 T. The number of windings of the primary winding wire was 10 turns and the number of windings of the secondary winding wire was 2 turns. Thus, a transformable circuit was produced.

The voltage E (V) read out by a power meter, the exciting power (VA/kg) obtained by the converted maximum magnetic flux density Bm (T) and the prescribed magnetic flux density Bm (T), and the iron loss (W/kg) were calculated by the following Formula 1, Formula 2, and Formula 3, respectively. The measurement results are shown in Table 5.

Comparative Example 2

An iron core produced for comparison in the same manner as described above except that a ribbon piece in which no linear laser irradiation marks were formed was used was subjected to the same measurement and evaluation.

$$\text{voltage } E\ (V) = 4.443 LF \cdot C \cdot W \cdot N_1 \cdot f \cdot Bm \times 10^{-6} \qquad \text{Formula 1}$$

$$\text{exciting power (VA/kg)} = E \cdot I / M \qquad \text{Formula 2}$$

$$\text{iron loss (W/kg)} = \text{Watt}/M \qquad \text{Formula 3}$$

The details of symbols in Formula 1 to Formula 3 are as follows.

E: effective voltage (V) measured by power meter
LF: lamination factor (=0.86)
C: core lamination thickness (mm)
W: nominal width (mm) of ribbon used
$N_1$: number of windings of excitation coil
f: frequency (Hz) measured
Bm: maximum magnetic flux density or prescribed magnetic flux density
I: effective current (A) measured by power meter
M: core weight (kg)
Watt: power (W) measured by power meter

[Table 5]

As shown in Table 5, the iron loss CL measured at 1.45 T and 60 Hz in the iron core using the ribbon piece in which no linear laser irradiation marks were formed was 0.246

W/kg, and the iron core using the ribbon piece in which the linear laser irradiation marks of the present embodiment were formed was 0.173 W/kg, which corresponds to a numerical value reduced by about three tenths.

A reduction in the iron loss CL to 0.200 W/kg or less in an iron core has not been conventionally achieved at all. Thus, a transformer extremely low in power loss can be obtained by providing a coil in the iron core of the present embodiment.

Figure 25:
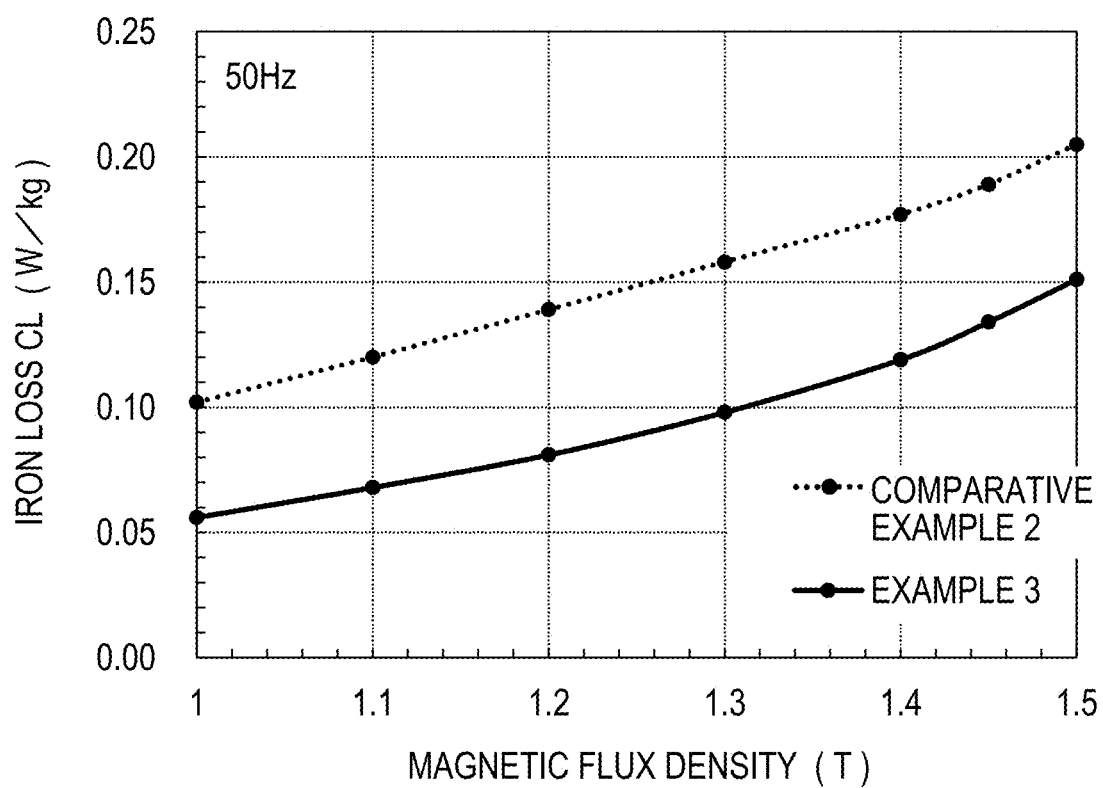
FIG. 25 is a diagram showing a relationship between a magnetic flux density and an iron loss at a frequency of 50 Hz of an iron core of Example 3 and an iron core of Comparative Example 2.

The aforementioned iron core of Example 3 and iron core of Comparative Example 2 were used to evaluate iron losses at the frequencies of 50 Hz and 60 Hz and different magnetic flux densities. The results were shown in Table 6. FIG. 25 shows a relationship between the magnetic flux density and the iron loss at the frequency of 50 Hz, and FIG. 26 shows a relationship between the magnetic flux density and the iron loss at the frequency of 60 Hz.

Figure 26:
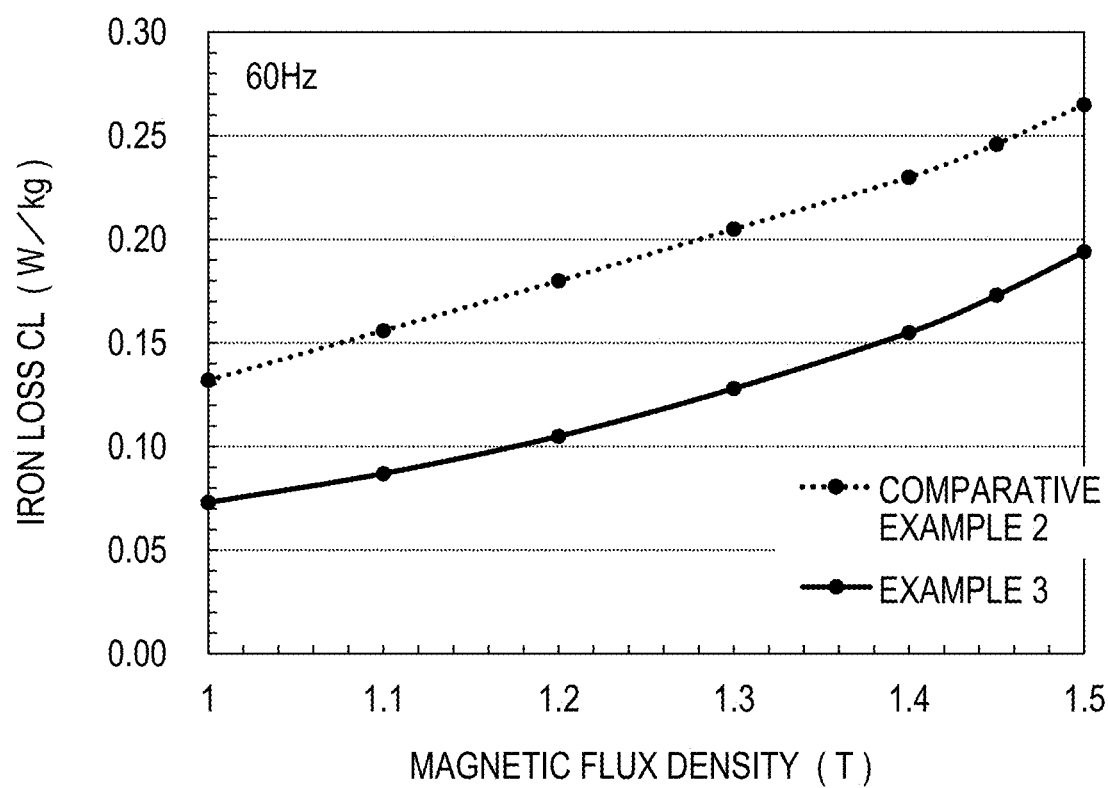
FIG. 26 is a diagram showing a relationship between the magnetic flux density and the iron loss at a frequency of 60 Hz of the iron core of Example 3 and the iron core of Comparative Example 2.

As shown in Table 6 and FIGS. 25 and 26, the iron core of the present embodiment was able to achieve extremely low iron loss at the frequencies of 50 Hz and 60 Hz even if the magnetic flux density is changed.

[Table 6]

Example 4

Figure 27:
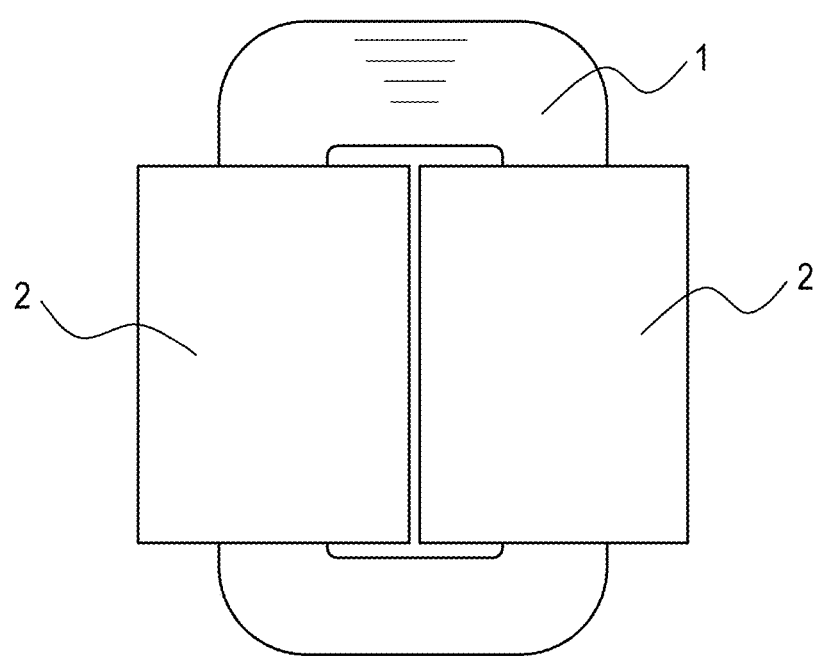
FIG. 27 is a schematic diagram showing an example of a transformer of the present embodiment.

An example configuration of the iron core and the windings of the transformer of the present embodiment is shown in FIG. 27. The transformer comprises a circular iron core 1 prepared by bending and winding, in an overlapping manner, Fe-based amorphous alloy ribbons layered, and windings 2 wound around the iron core. The iron core 1 in the first embodiment includes one circular iron core (a single-phase two-leg wound iron core). Table 7 shows main characteristics and a weight of a single-phase, 50 Hz, oil-immersed transformer of the present disclosure with a rated capacity of 10 kVA that uses the iron core 1 of this embodiment and complies with JIS C 4304: 2013 (hereinafter, referred to as Example 4) with comparison to Conventional Example 1. The Fe-based amorphous alloy ribbons used in Example 4 had the aforementioned characteristics; thus, in accordance with the definitions of "Letters for Types of Amorphous Strips" in section 5 of JIS C 2534: 2017, the iron core material for Example 4 was expressed as 25 AMP06-88. The Fe-based amorphous alloy ribbons used in Conventional Example 1 were 25 AMP08-88. The characteristics of the following Examples 4 to 11 are expressed in numbers obtained from analysis by simulation.

The Fe-based amorphous alloy ribbons used in Example 4 were 25 μm in thickness and 142.2 mm in width; had a difference HL of 0.62 μm between the highest point and the lowest point of the linear laser irradiation marks formed on a free solidified surface; had the iron loss of 0.075 W/kg at the frequency of 50 Hz and the magnetic flux density of 1.45 T; and had the iron loss of 0.095 W/kg at a frequency 60 Hz and the magnetic flux density of 1.45 T.

The Fe-based amorphous alloy ribbons used in Conventional Example 1 were 25 μm in thickness and 142.2 mm in width; included no laser irradiation marks; had the iron loss of 0.130 W/kg at the frequency of 50 Hz and the magnetic flux density of 1.45 T; and had the iron loss of 0.167 W/kg at the frequency of 60 Hz and the magnetic flux density of 1.45 T.

In Example 4 and Conventional Example 1, the circular iron core 1 had 1,875 layers of the ribbons. The weight of the iron core 1 is shown in Table 7.

A primary winding of the transformer was formed with a copper wire with a diameter of 0.9 mm which was wound 3,143 turns. A secondary winding of the transformer was formed with a rectangular aluminum wire with a size of 3.2 mm×6.0 mm; the secondary winding included windings wound 100 turns and connected in parallel.

[Table 7]

Table 7 shows that the no-load loss of the iron core per weight is 0.149 W/kg in Example 4, which is about 25% reduction from 0.197 W/kg of that in Conventional Example 1.

In response to this, the energy consumption efficiency ratio compared with the energy consumption efficiency standard value defined in JIS C 4304: 2013 (see "Energy Consumption Efficiency Ratio" in Table 7; the same applies hereinafter) was improved to 0.70 in Example 4 from 0.73 in Conventional Example 1. It is also found that an annual $CO_2$ emission at an average equivalent load factor of a distribution transformer being 15% was improved by about 17%. This is apparent by looking at "Annual $CO_2$ Emission Ratio at 15% Load Factor" on Table 7, which is 0.83 (the same applies hereinafter).

Example 5

As a second example of the transformer of the present embodiment configured with the iron core and the windings as shown in FIG. 27, Table 8 shows main characteristics and a weight of a single-phase, 60 Hz, oil-immersed transformer of the present disclosure with a rated capacity of 10 kVA that complies with JIS C 4304: 2013 (hereinafter, referred to as Example 5) with comparison to Conventional Example 2.

The Fe-based amorphous alloy ribbons used in Example 5 were the same as those used in Example 4; and the Fe-based amorphous alloy ribbons used in Conventional Example 2 were the same as those of Conventional Example 1.

In Example 5 and Conventional Example 2, the circular iron core 1 had 1,785 layers of the ribbons. The weight of the iron core 1 is shown in Table 8.

The primary winding of this transformer was formed with a copper wire with a diameter of 0.9 mm which was wound 2,776 turns. The secondary winding of the transformer was formed with a rectangular aluminum wire with a size of 2.6 mm×6.0 mm; the secondary winding included windings wound 88 turns and connected in parallel.

[Table 8]

Table 8 shows that the no-load loss of the iron core per weight was 0.180 W/kg in Example 5, which was about 30% reduction from 0.259 W/kg of that in Conventional Example 2.

In response to this, the energy consumption efficiency ratio compared with the energy consumption efficiency standard value defined in JIS C 4304: 2013 was improved to 0.67 in Example 5 from 0.72 in Conventional Example 2. It is also found that the annual $CO_2$ emission at the average equivalent load factor of a distribution transformer being 15% was improved by about 20%.

Example 6

As a third example of the transformer of the present embodiment configured with the iron core and the windings as shown in FIG. 27, Table 9 shows main characteristics and a weight of a single-phase, 50 Hz, oil-immersed transformer of the present disclosure with a rated capacity of 30 kVA that complies with JIS C 4304: 2013 (hereinafter, referred to as Example 6) with comparison to Conventional Example 3.

The Fe-based amorphous alloy ribbons used in Example 6 were 25 μm in thickness and 213.4 mm in width; had a difference HL between the highest point and the lowest point of linear laser irradiation mark formed on the free solidified surface of 0.52 μm; had the iron loss of 0.076 W/kg at the frequency of 50 Hz and the magnetic flux density of 1.45 T; and had the iron loss of 0.097 W/kg at the frequency of 60 Hz and the magnetic flux density of 1.45 T.

The Fe-based amorphous alloy ribbons used in Conventional Example 3 were 25 μm in thickness and 213.4 mm in width; included no laser irradiation marks; had the iron loss of 0.132 W/kg at the frequency of 50 Hz and the magnetic flux density of 1.45 T; and had the iron loss of 0.168 W/kg at the frequency of 60 Hz and the magnetic flux density of 1.45 T.

In Example 6 and Conventional Example 3, the circular iron core 1 had 3,015 layers of the ribbons. The weight of the iron core 1 is shown in Table 9.

The primary winding of this transformer was formed with a copper wire with a diameter of 1.4 mm which was wound 1,509 turns. The secondary winding of this transformer was formed with a rectangular aluminum wire with a size of 3.2 mm×15 mm; the secondary winding included windings wound 44 turns and connected in parallel.

[Table 9]

Table 9 shows that the no-load loss of the iron core per weight was 0.126 W/kg in Example 6, which was about 36% reduction from 0.197 W/kg of that in Conventional Example 3.

In response to this, the energy consumption efficiency ratio compared with the energy consumption efficiency standard value defined in JIS C 4304: 2013 was improved to 0.67 in Example 6 from 0.72 in Conventional Example 3. It is also found that the annual $CO_2$ emission at the average equivalent load factor of a distribution transformer being 15% was improved by about 22%. In addition, the no-load loss of the iron core per weight was 0.126 W/kg in Example 6, improving by 0.023 W/kg from 0.149 W/kg in Example 4. The reason for this was that an increase in size of the iron core caused a length of the curve of the iron core to be small in proportion to a length of a magnetic path of the iron core, which inhibited an increase in no-load loss due to residual stress at the curve of the iron core.

Example 7

As a fourth example of the transformer of the present embodiment configured with the iron core and the windings as shown in FIG. 27, Table 10 shows main characteristics and a weight of a single-phase, 60 Hz, oil-immersed transformer of the present disclosure with a rated capacity of 30 kVA that complies with JIS C 4304: 2013 (hereinafter, referred to as Example 7) with comparison to Conventional Example 4.

The Fe-based amorphous alloy ribbons used in Example 7 were the same as those used in Example 6; and the Fe-based amorphous alloy ribbons used in Conventional Example 4 were the same as those used in Conventional Example 3.

In Example 7 and Conventional Example 4, the circular iron core 1 had 2,715 layers of the ribbons. The weight of the iron core 1 is shown in Table 10.

The primary winding of this transformer was formed with a copper wire with a diameter of 1.3 mm which was wound 1,509 turns. The secondary winding of the transformer was formed with a rectangular aluminum wire with a size of 4.0 mm×13 mm; the secondary winding included windings wound 44 turns and connected in parallel.

[Table 10]

Table 10 shows that the no-load loss of the iron core per weight was 0.161 W/kg in Example 7, which was about 37% reduction from 0.256 W/kg of that in Conventional Example 4.

In response to this, the energy consumption efficiency ratio compared to the energy consumption efficiency standard value defined in JIS C 4304: 2013 was improved to 0.66 in Example 7 from 0.72 in Conventional Example 4. It is also found that the annual $CO_2$ emission at the average equivalent load factor of a distribution transformer being 15% was improved by about 24%. In addition, the no-load loss of the iron core per weight was 0.161 W/kg in Example 7, improving by 0.019 W/kg from 0.180 W/kg in Example 5. The reason for this reduction was the same as the reason mentioned in the Example 6.

Example 8

Figure 28:
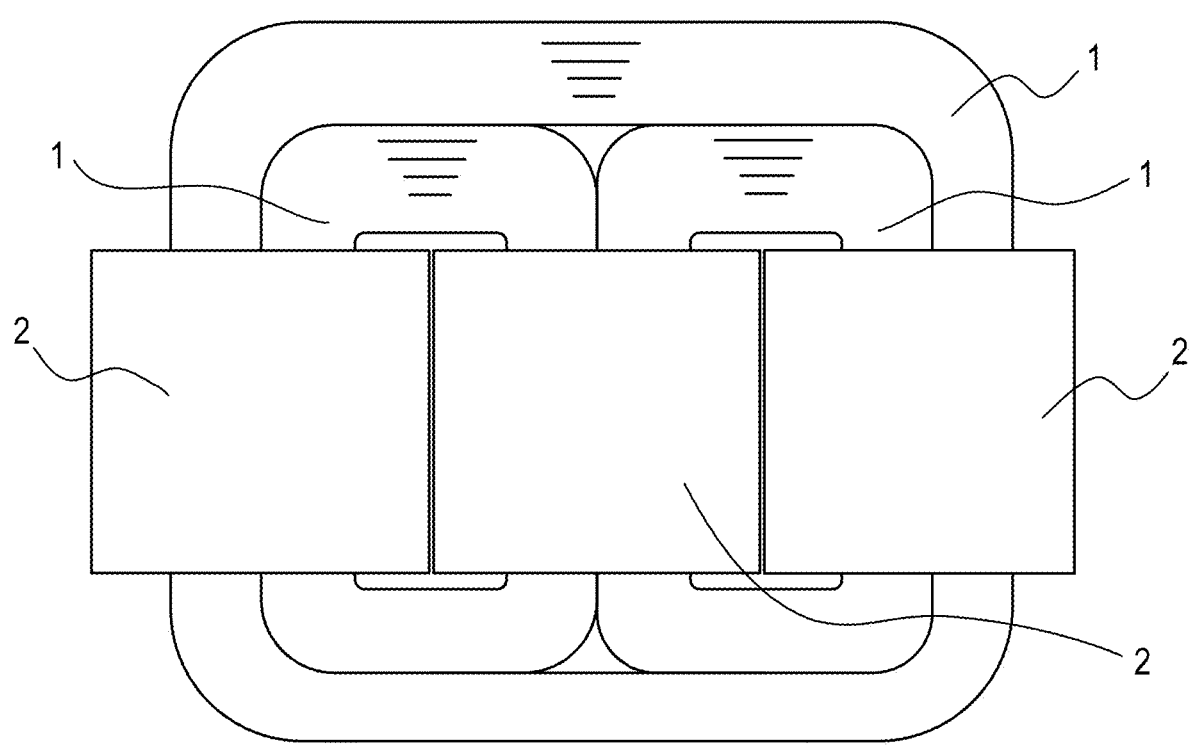
FIG. 28 is a schematic diagram showing another example of the transformer of the present embodiment.

Another example configuration of the iron core and the windings in the present embodiment is shown in FIG. 28. The transformer comprises three-phase three-leg wound iron cores formed by combining the circular iron cores 1 prepared by bending and winding, in an overlapping manner, the Fe-based amorphous alloy ribbons layered (combining three circular iron cores), and three sets of the windings 2 wound around the iron cores. Table 11 shows main characteristics and a weight of a three-phase, 50 Hz, oil-immersed transformer of the present disclosure with the rated capacity of 100 kVA that uses the iron cores of the present embodiment and complies with JIS C 4304: 2013 (hereinafter, referred to as Example 8) with comparison to Conventional Example 5.

The Fe-based amorphous alloy ribbons used in Example 8 were the same as those used in Example 6; and the Fe-based amorphous alloy ribbons used in Conventional Example 5 were the same as those used in Conventional Example 3.

In Example 8 and Conventional Example 5, the circular iron cores 1 each had 3,480 layers of the ribbons. The weight of the iron cores 1 (total weight of the three circular iron cores) is shown in Table 11.

The primary winding in Example 8 was formed with a copper wire with a diameter of 2.2 mm which was wound 653 turns by star connection. The secondary winding was formed with a rectangular aluminum wire with a size of 0.4 mm×247 mm which was wound 36 turns by delta connection. The primary winding in Conventional Example 5 was formed with a copper wire with a diameter of 2.2 mm which was wound 653 turns by star connection. The secondary winding was formed with a rectangular aluminum wire with a size of 0.4 mm×248 mm which was wound 36 turns by delta connection.

[Table 11]

Table 11 shows that the no-load loss of the iron core per weight was 0.188 W/kg in Example 8, which was about 30% reduction from 0.269 W/kg of that in Conventional Example 5.

In response to this, the energy consumption efficiency ratio compared to the energy consumption efficiency standard value defined in JIS C 4304: 2013 was improved to 0.72 in Example 8 from 0.78 in Conventional Example 5. It is also found that the annual $CO_2$ emission at the average equivalent load factor of a distribution transformer being 15% was improved by about 21%.

Example 9

As another example of the transformer of the present embodiment configured with the iron cores and the windings as shown in FIG. 28, Table 12 shows main characteristics and a weight of a three-phase, 60 Hz, oil-immersed transformer of the present disclosure with the rated capacity of 100 kVA that complies with JIS C 4304: 2013 (hereinafter, referred to as Example 9) with comparison to Conventional Example 6.

The Fe-based amorphous alloy ribbons used in Example 9 were the same as those used in Example 6; and the Fe-based amorphous alloy ribbons used in Conventional Example 6 were the same as those used in Conventional Example 3. In Example 9 and Conventional Example 6, the circular iron cores 1 each had 2,895 layers of the ribbons. The weight of the iron cores 1 is shown in Table 12.

The primary winding and the secondary winding of this transformer were the same as those in Example 8 and Conventional Example 5.

[Table 12]

Table 12 shows that the no-load loss of the iron core per weight was 0.238 W/kg in Example 9, which was about 30% reduction from 0.339 W/kg of that in Conventional Example 6.

In response to this, the energy consumption efficiency ratio compared to the energy consumption efficiency standard value defined in JIS C 4304: 2013 was improved to 0.76 in Example 9 from 0.81 in Conventional Example 6. It is also found that the annual $CO_2$ emission at the average equivalent load factor of a distribution transformer being 15% was improved by about 21%.

Example 10

As another example of the transformer of the present embodiment configured with the iron cores and the windings as shown in FIG. 28, Table 13 shows main characteristics and a weight of a three-phase, 50 Hz, oil-immersed transformer of the present disclosure with the rated capacity of 500 kVA that complies with JIS C 4304: 2013 (hereinafter, referred to as Example 10) with comparison to Conventional Example 7.

The Fe-based amorphous alloy ribbons used in Example 10 were the same as those used in Example 6; and the Fe-based amorphous alloy ribbons used in Conventional Example 7 were the same as those used in Conventional Example 3.

In Example 10 and Conventional Example 7, the circular iron cores 1 had 5,685 layers of the ribbons and 5,955 layers of the ribbons, respectively. The weight of the iron cores 1 (total weight of the three circular iron cores) is shown in Table 13.

The primary winding of Example 10 was formed with a rectangular copper wire with a size of 3.5 mm×4.5 mm which was wound 399 turns by star connection. The secondary winding was formed with a rectangular aluminum wire with a size of 1.3 mm×438 mm which was wound 22 turns by delta connection. The primary winding of Conventional Example 7 was formed with a rectangular copper wire with a size of 3.2 mm×5.0 mm which was wound 381 turns by star connection. The secondary winding was formed with a rectangular aluminum wire with a size of 1.4 mm×383 mm which was wound 21 turns by delta connection.

[Table 13]

Table 13 shows that the no-load loss of the iron core per weight was 0.163 W/kg in Example 10, which was about 34% reduction from 0.246 W/kg of that in Conventional Example 7.

In response to this, the energy consumption efficiency ratio compared to the energy consumption efficiency standard value defined in JIS C 4304: 2013 was improved to 0.90 in Example 10 from 0.93 in Conventional Example 7. It is also found that the annual $CO_2$ emission at the average equivalent load factor of a distribution transformer being 15% was also improved by about 18%. In addition, the no-load loss of the iron core per weight was 0.163 W/kg in Example 10, improving 0.025 W/kg from 0.188 W/kg in the Example 8. The reason for this improvement was that an increase in size of the iron core caused the length of the curve of the iron core to be small in proportion to the length of the magnetic path of the iron core, which inhibited an increase in no-load loss due to residual stress at the curve of the iron core.

Example 11

Figure 29:
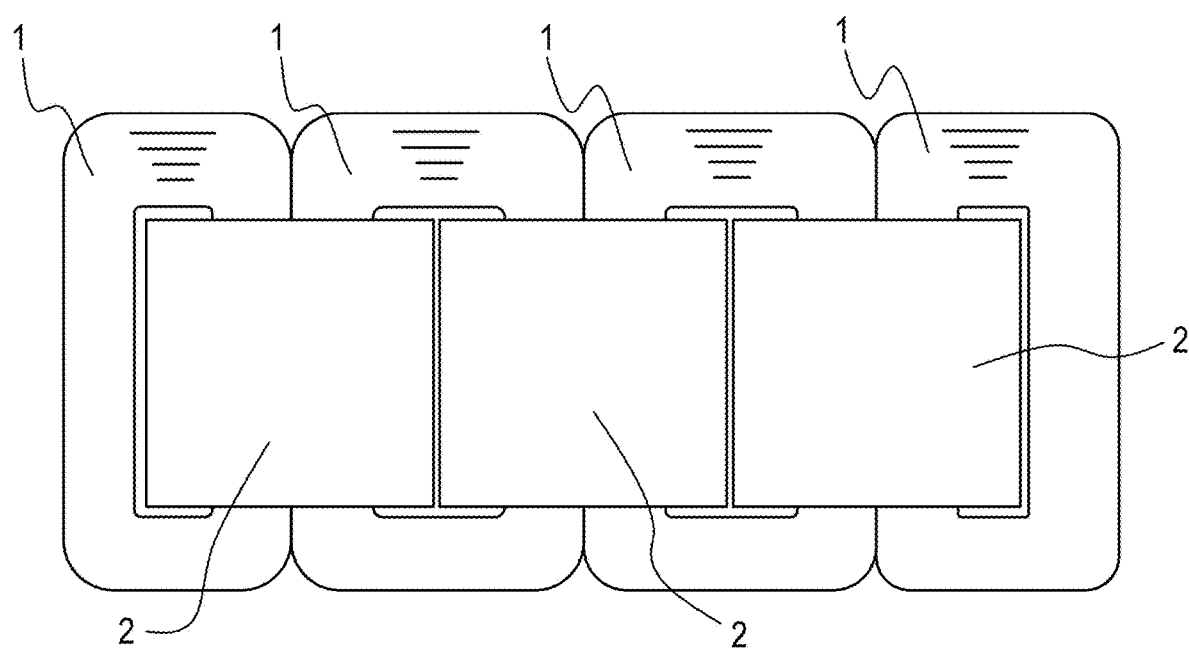
FIG. 29 is a schematic diagram showing yet another example of the transformer of the present embodiment.

Another example configuration of the iron cores and the windings of the present embodiment is shown in FIG. 29. The transformer comprises three-phase five-leg wound iron cores formed by combining the circular iron cores 1 prepared by bending and winding, in an overlapping manner, the Fe-based amorphous alloy ribbons layered, and three sets of the windings 2 wound around the iron cores.

Table 14 shows main characteristics and a weight of a three-phase, 50 Hz, oil-immersed transformer of the present disclosure with the rated capacity of 1000 kVA that uses the iron cores of the present embodiment and complies with JIS C 4304: 2013 (hereinafter, referred to as Example 11) with comparison to Conventional Example 8.

The Fe-based amorphous alloy ribbons used in Example 11 were the same as those used in Example 6; and the Fe-based amorphous alloy ribbons used in Conventional Example 8 is the same as those used in Conventional Example 3.

In Example 11 and Conventional Example 8, the circular iron cores 1 each had 2,610 layers of the ribbons. The circular iron cores 1 each included two iron cores stacked in a vertical direction of FIG. 29. The weight of the iron cores 1 (total weight of the eight circular iron cores) is shown in Table 14.

The primary winding of Example 11 was formed with a rectangular copper wire with a size of 2.8 mm×7.0 mm which was wound 377 turns by delta connection. The secondary winding was formed with a rectangular aluminum wire with a size of 3.0 mm×305 mm which was wound 12 turns by delta connection. The primary winding of Conventional Example 8 was formed with a rectangular copper wire with a size of 2.8 mm×7.0 mm which was wound 377 turns by delta connection. The secondary winding was formed with a rectangular aluminum wire with a size of 3.2 mm×306 mm which was wound 12 turns by delta connection.

[Table 14]

Table 14 shows that the no-load loss of the iron core per weight was 0.179 W/kg in Example 11, which was about 33% reduction from 0.269 W/kg of that in Conventional Example 8. In response to this, the energy consumption efficiency ratio compared to the energy consumption efficiency standard value defined in JIS C 4304: 2013 was improved to 0.99 in Example 11 from 1.00 in Conventional Example 8. It is also found that the annual $CO_2$ emission at the average equivalent load factor of a distribution transformer being 15% is also improved by about 16%.

As described above, the transformer of the present disclosure can reduce the no-load loss and thus is particularly effective in reducing loss of, for example, distribution transformers with low average equivalent load factors, and in reducing $CO_2$ emission. The examples in the present disclosure provide detailed explanations about applications of wound iron core transformers; nevertheless, it should be noted that the effect of reducing the no-load loss can also be obtained in applications of laminated iron core transformers.

All documents, patent applications, and technical standards described herein are herein incorporated by reference, as if each individual document, patent application, and technical standard were specifically and individually indicated to be incorporated by reference.

TABLE 1

| NO | LINE INTERVAL LP1 (mm) | SCANNING SPEED (m/sec) | LASER OUTPUT ENERGY DENSITY (J/m) | HEIGHT DIFFERENCE HL (μm) | LINE WIDTH WL (μm) | HEIGHT DIFFERENCE × LINE WIDTH [HL × WL] (μm²) |
|---|---|---|---|---|---|---|
| *1 | — | — | 0 | 0 | 0 | 0 |
| *2 | 20 | 8 | 2 | 0.15 | 28.30 | 4.25 |
| *3 | 20 | 5 | 2 | 0.11 | 27.40 | 3.01 |
| *4 | 20 | 10 | 3 | 0.23 | 24.20 | 5.57 |
| 5 | 2 | 5 | 10 | 0.42 | 37.67 | 15.82 |
| 6 | 3.5 | 5 | 10 | 0.38 | 38.71 | 14.71 |
| 7 | 5 | 5 | 10 | 0.43 | 36.50 | 15.70 |
| 8 | 7.5 | 5 | 10 | 0.35 | 39.20 | 13.72 |
| 9 | 10 | 5 | 10 | 0.33 | 41.10 | 13.56 |
| 10 | 15 | 5 | 10 | 0.52 | 37.30 | 19.40 |
| *11 | 20 | 3 | 4 | 0.21 | 28.12 | 5.91 |
| *12 | 20 | 8 | 4 | 0.19 | 27.49 | 5.22 |
| 13 | 20 | 5 | 5 | 0.34 | 28.26 | 9.61 |
| 14 | 20 | 8 | 6 | 0.37 | 34.15 | 12.64 |
| 15 | 20 | 5 | 7 | 0.37 | 33.44 | 12.37 |
| 16 | 20 | 10 | 8 | 0.46 | 41.20 | 18.95 |
| 17 | 20 | 8 | 8 | 0.33 | 37.43 | 12.35 |
| 18 | 20 | 5 | 10 | 0.55 | 38.20 | 21.01 |
| 19 | 20 | 3 | 10 | 0.44 | 37.81 | 16.64 |
| 20 | 20 | 8 | 10 | 0.40 | 42.21 | 16.88 |
| 21 | 20 | 3 | 17 | 0.34 | 48.82 | 16.60 |
| 22 | 30 | 5 | 10 | 0.45 | 36.70 | 16.52 |
| 23 | 20 | 10 | 12 | 0.55 | 45.65 | 25.11 |
| 24 | 20 | 8 | 12 | 0.45 | 49.25 | 22.16 |
| 25 | 20 | 5 | 13 | 0.74 | 50.66 | 37.49 |
| 26 | 20 | 8 | 14 | 0.47 | 53.13 | 24.97 |
| 27 | 20 | 10 | 15 | 0.60 | 49.19 | 29.51 |
| 28 | 20 | 8 | 16 | 0.76 | 52.93 | 40.23 |
| 29 | 20 | 5 | 17 | 0.45 | 54.80 | 24.66 |
| 30 | 40 | 5 | 10 | 0.49 | 42.20 | 20.68 |
| 31 | 20 | 10 | 18 | 0.76 | 52.52 | 39.92 |
| 32 | 50 | 5 | 10 | 0.49 | 37.50 | 18.38 |
| 33 | 60 | 5 | 10 | 0.65 | 37.50 | 24.38 |
| 34 | 20 | 8 | 19 | 0.85 | 56.12 | 47.70 |
| 35 | 20 | 10 | 21 | 1.18 | 67.98 | 80.22 |
| 36 | 20 | 8 | 23 | 1.05 | 65.48 | 68.75 |
| 37 | 20 | 5 | 23 | 0.56 | 60.50 | 33.88 |
| 38 | 20 | 10 | 25 | 1.34 | 73.65 | 98.69 |
| 39 | 20 | 3 | 28 | 1.38 | 54.43 | 75.11 |
| 40 | 20 | 10 | 28 | 1.21 | 81.44 | 98.54 |
| 41 | 20 | 5 | 30 | 0.75 | 71.60 | 53.70 |
| 42 | 20 | 8 | 31 | 1.57 | 82.96 | 130.25 |
| 43 | 20 | 8 | 35 | 1.66 | 96.70 | 160.52 |
| *44 | 20 | 6 | 36 | 2.05 | 90.10 | 184.71 |
| *45 | 20 | 6 | 41 | 2.95 | 97.90 | 288.81 |
| *46 | 20 | 5 | 43 | 2.72 | 108.40 | 294.85 |
| *47 | 20 | 6 | 46 | 4.14 | 125.14 | 518.08 |

NOTE 1:
ASTERISK (*) BEFORE NO INDICATES COMPARATIVE EXAMPLE.

TABLE 2

| NO | IRON LOSS CL (W/kg) at 60 Hz, 1.45 T | EXCITING POWER VA (VA/kg) at 60 Hz, 1.45 T | COERCIVE FORCE Hc (A/m) at 60 Hz, 1.45 T | IRON LOSS CL (W/kg) at 60 Hz, 1.50 T | EXCITING POWER VA (VA/kg) at 60 Hz, 1.50 T | COERCIVE FORCE Hc (A/m) at 60 Hz, 1.50 T |
|---|---|---|---|---|---|---|
| *1 | 0.1678 | 0.1826 | 3.7127 | 0.1756 | 0.2440 | 3.1446 |
| *2 | 0.1536 | 0.2395 | 3.2727 | 0.1574 | 0.3518 | 3.1024 |
| *3 | 0.1665 | 0.2603 | 3.2551 | 0.1836 | 0.3470 | 3.3861 |

TABLE 2-continued

| NO | IRON LOSS CL (W/kg) at 60 Hz, 1.45 T | EXCITING POWER VA (VA/kg) at 60 Hz, 1.45 T | COERCIVE FORCE Hc (A/m) at 60 Hz, 1.45 T | IRON LOSS CL (W/kg) at 60 Hz, 1.50 T | EXCITING POWER VA (VA/kg) at 60 Hz, 1.50 T | COERCIVE FORCE Hc (A/m) at 60 Hz, 1.50 T |
|---|---|---|---|---|---|---|
| *4 | 0.1651 | 0.2387 | 3.4533 | 0.1727 | 0.3534 | 3.4368 |
| 5 | 0.0705 | 0.5630 | 1.5584 | 0.0827 | 0.6804 | 1.6331 |
| 6 | 0.0707 | 0.3315 | 1.5935 | 0.0819 | 0.4347 | 1.6293 |
| 7 | 0.0849 | 0.3128 | 1.7783 | 0.0983 | 0.4325 | 1.8582 |
| 8 | 0.0857 | 0.2542 | 1.8299 | 0.0961 | 0.3414 | 1.9002 |
| 9 | 0.0884 | 0.2488 | 2.0037 | 0.1014 | 0.3190 | 2.0741 |
| 10 | 0.0968 | 0.2353 | 2.0534 | 0.1087 | 0.3768 | 2.1079 |
| *11 | 0.1510 | 0.2037 | 3.2941 | 0.1652 | 0.3166 | 3.3298 |
| *12 | 0.1523 | 0.2259 | 3.4119 | 0.1625 | 0.3733 | 3.4083 |
| 13 | 0.1257 | 0.2648 | 2.6039 | 0.1405 | 0.3844 | 2.7052 |
| 14 | 0.1203 | 0.1917 | 2.5929 | 0.1365 | 0.3048 | 2.7733 |
| 15 | 0.1132 | 0.1922 | 2.4523 | 0.1217 | 0.3343 | 2.3699 |
| 16 | 0.1122 | 0.1800 | 2.3951 | 0.1211 | 0.3025 | 2.4488 |
| 17 | 0.1025 | 0.1825 | 2.3126 | 0.1136 | 0.2911 | 2.4522 |
| 18 | 0.1049 | 0.2246 | 2.3233 | 0.1139 | 0.3434 | 2.3306 |
| 19 | 0.1046 | 0.2352 | 2.3178 | 0.1168 | 0.3802 | 2.3928 |
| 20 | 0.0999 | 0.2093 | 2.2211 | 0.1136 | 0.3659 | 2.2788 |
| 21 | 0.0923 | 0.2069 | 2.0702 | 0.1052 | 0.3189 | 2.1555 |
| 22 | 0.1146 | 0.2453 | 2.4347 | 0.1303 | 0.3749 | 2.6557 |
| 23 | 0.0985 | 0.1904 | 2.0557 | 0.1096 | 0.3812 | 2.2071 |
| 24 | 0.0944 | 0.1727 | 2.0202 | 0.1046 | 0.3067 | 2.1052 |
| 25 | 0.1018 | 0.1844 | 2.1408 | 0.1127 | 0.2906 | 2.3083 |
| 26 | 0.0933 | 0.1924 | 2.0216 | 0.1012 | 0.3003 | 2.0858 |
| 27 | 0.0906 | 0.2061 | 1.9329 | 0.1005 | 0.3028 | 1.9667 |
| 28 | 0.0888 | 0.2157 | 1.9809 | 0.0996 | 0.3623 | 2.0261 |
| 29 | 0.0888 | 0.2053 | 1.9214 | 0.0981 | 0.3351 | 1.9920 |
| 30 | 0.1250 | 0.2732 | 2.6869 | 0.1382 | 0.3835 | 2.7461 |
| 31 | 0.0845 | 0.2106 | 1.8220 | 0.0969 | 0.3488 | 1.8193 |
| 32 | 0.1287 | 0.2923 | 2.8796 | 0.1420 | 0.4655 | 3.0600 |
| 33 | 0.1298 | 0.2863 | 2.8138 | 0.1407 | 0.4574 | 2.9788 |
| 34 | 0.0830 | 0.2017 | 1.8303 | 0.0942 | 0.3118 | 1.9140 |
| 35 | 0.0827 | 0.2365 | 1.8668 | 0.0918 | 0.3032 | 1.8824 |
| 36 | 0.0900 | 0.3509 | 1.9041 | 0.1018 | 0.4595 | 1.9901 |
| 37 | 0.0805 | 0.2522 | 1.8043 | 0.0905 | 0.2928 | 1.7138 |
| 38 | 0.0788 | 0.2846 | 1.7345 | 0.0893 | 0.3434 | 1.7781 |
| 39 | 0.0925 | 0.3233 | 1.9682 | 0.1044 | 0.4026 | 2.0096 |
| 40 | 0.0826 | 0.3737 | 1.7844 | 0.0906 | 0.4359 | 1.8046 |
| 41 | 0.0859 | 0.5310 | 1.9573 | 0.0961 | 0.6049 | 1.9840 |
| 42 | 0.0827 | 0.5304 | 1.8420 | 0.0946 | 0.6045 | 1.9448 |
| 43 | 0.1247 | 1.1379 | 2.9579 | 0.1395 | 1.3401 | 3.0455 |
| *44 | 0.1644 | 1.6629 | 4.4618 | 0.1800 | 1.9509 | 4.5131 |
| *45 | 0.3960 | 3.8543 | 11.7318 | 0.4325 | 4.8159 | 12.0131 |
| *46 | 0.4804 | 5.3109 | 13.6284 | 0.5295 | 6.7549 | 13.9283 |
| *47 | 0.6288 | 10.1520 | 18.5676 | 0.6850 | 13.5769 | 18.9594 |

NOTE 1:
ASTERISK (*) BEFORE NO INDICATES COMPARATIVE EXAMPLE.

TABLE 3

| NO | LINE INTERVAL LP1 (mm) | SCANNING SPEED (m/sec) | LASER OUTPUT ENERGY DENSITY (J/m) | HEIGHT DIFFERENCE HL (μm) | LINE WIDTH WL (μm) | HEIGHT DIFFERENCE × LINE WIDTH [HL × WL] (μm$^2$) | IRON LOSS CL (W/kg) at 1 kHz, 1 T | EXCITING POWER VA (VA/kg) at 1 kHz, 1 T |
|---|---|---|---|---|---|---|---|---|
| *1 | — | — | 0 | 0 | 0 | 0 | 8.7106 | 8.8922 |
| 16 | 20 | 10 | 8 | 0.46 | 41.20 | 18.95 | 6.9020 | 7.0383 |
| 23 | 20 | 10 | 12 | 0.55 | 45.65 | 25.11 | 6.8951 | 7.0373 |
| 27 | 20 | 10 | 15 | 0.60 | 49.19 | 29.51 | 6.2123 | 6.3724 |
| 31 | 20 | 10 | 18 | 0.76 | 52.52 | 39.92 | 6.1492 | 6.3858 |
| 35 | 20 | 10 | 21 | 1.18 | 67.98 | 80.22 | 5.7927 | 6.1326 |
| 38 | 20 | 10 | 25 | 1.34 | 73.65 | 98.69 | 5.6568 | 6.1730 |
| 40 | 20 | 10 | 28 | 1.21 | 81.44 | 98.54 | 5.5828 | 6.3395 |

TABLE 4

| NO | Bm (T) | Br (T) | Hc (A/m) | SQUARE RATIO (%) |
|---|---|---|---|---|
| *1 | 1.558 | 0.788 | 5.05 | 50.6 |
| *2 | 1.546 | 0.647 | 6.51 | 41.9 |
| 5 | 1.500 | 0.312 | 4.08 | 20.8 |
| 6 | 1.532 | 0.331 | 3.51 | 21.6 |
| 7 | 1.554 | 0.387 | 3.66 | 24.9 |
| 8 | 1.560 | 0.424 | 3.71 | 27.2 |
| 9 | 1.563 | 0.478 | 4.49 | 30.6 |
| 10 | 1.562 | 0.517 | 4.66 | 33.1 |
| *11 | 1.555 | 0.644 | 5.52 | 41.4 |
| *12 | 1.540 | 0.683 | 5.56 | 44.4 |
| 13 | 1.548 | 0.615 | 4.33 | 39.7 |
| 15 | 1.579 | 0.543 | 2.76 | 34.4 |
| 16 | 1.578 | 0.573 | 2.86 | 36.3 |
| 18 | 1.550 | 0.547 | 4.15 | 35.2 |
| 21 | 1.543 | 0.207 | 3.81 | 13.4 |
| 23 | 1.556 | 0.425 | 2.73 | 27.3 |
| 25 | 1.588 | 0.484 | 2.49 | 30.5 |
| 27 | 1.570 | 0.204 | 2.96 | 13.0 |
| 29 | 1.554 | 0.109 | 3.51 | 7.0 |
| 31 | 1.559 | 0.076 | 2.68 | 4.9 |
| 35 | 1.562 | 0.050 | 2.61 | 3.2 |
| 37 | 1.563 | 0.067 | 3.85 | 4.3 |
| 38 | 1.568 | 0.047 | 2.82 | 3.0 |
| 39 | 1.552 | 0.066 | 4.10 | 4.3 |
| 40 | 1.558 | 0.037 | 2.45 | 2.4 |
| 41 | 1.556 | 0.060 | 4.33 | 3.8 |
| 42 | 1.552 | 0.051 | 3.67 | 3.3 |
| *44 | 1.511 | 0.114 | 9.72 | 7.5 |
| *45 | 1.512 | 0.155 | 15.45 | 10.2 |

NOTE 1:
ASTERISK (*) BEFORE NO INDICATES COMPARATIVE EXAMPLE.

TABLE 5

| | LINE INTERVAL LP1 (mm) | SCANNING SPEED (m/sec) | LASER OUTPUT ENERGY DENSITY (J/m) | IRON LOSS CL (W/kg) at 1.45 T 60 HZ | EXCITING POWER VA (VA/kg) at 1.45 T 60 HZ | IRON LOSS CL (W/kg) at 1.50 T 60 HZ | EXCITING POWER (VA/kg) at 1.50 T 60 HZ |
|---|---|---|---|---|---|---|---|
| EXAMPLE 3 | 20 | 8 | 12 | 0.1728 | 0.7271 | 0.1936 | 1.0651 |
| COMPARATIVE EXAMPLE 2 | — | — | — | 0.2455 | 0.6378 | 0.2651 | 0.9550 |

TABLE 6

| FREQUENCY (Hz) | MAGNETIC FLUX DENSITY (T) | EXAMPLE 3 IRON LOSS (W/kg) | COMPARATIVE EXAMPLE 2 IRON LOSS (W/kg) |
|---|---|---|---|
| 50 | 1.00 | 0.056 | 0.102 |
| 50 | 1.10 | 0.068 | 0.120 |
| 50 | 1.20 | 0.081 | 0.139 |
| 50 | 1.30 | 0.098 | 0.158 |
| 50 | 1.40 | 0.119 | 0.177 |
| 50 | 1.45 | 0.134 | 0.189 |
| 50 | 1.50 | 0.151 | 0.205 |
| 60 | 1.00 | 0.073 | 0.132 |
| 60 | 1.10 | 0.087 | 0.156 |
| 60 | 1.20 | 0.105 | 0.180 |
| 60 | 1.30 | 0.128 | 0.205 |
| 60 | 1.40 | 0.155 | 0.230 |
| 60 | 1.45 | 0.173 | 0.246 |
| 60 | 1.50 | 0.194 | 0.265 |

TABLE 7

| SPECIFICATION OF TRANSFORMER | EXAMPLE 4 | CONVENTIONAL EXAMPLE 1 |
|---|---|---|
| APPLIED STANDARD FOR TRANSFORMER | JIS C 4304: 2013 | |
| RATED CAPACITY (kVA) | 10 | |
| PRIMARY WINDING VOLTAGE (kV) | 6.6 | |
| SECONDARY WINDING VOLTAGE (V) | 210-105 | |
| NUMBER OF PHASE | 1 | |
| FREQUENCY (Hz) | 50 | |
| IRON CORE MATERIAL | 25AMP06-88 (NOMINAL THICKNESS: 0.025 mm, WIDTH: 142.2 mm) | 25AMP08-88 (NOMINAL THICKNESS: 0.025 mm, WIDTH: 142.2 mm) |
| IRON CORE TYPE | SINGLE-PHASE TWO-LEG WOUND IRON CORE | |
| PRIMARY WINDING | φ0.9 mm Cu WIRE 3,143 TURNS | |
| SECONDARY WINDING | 3.2 mm × 6.0 mm Al RECTANGULAR WIRE 2 PARALLEL/100 TURNS | |
| NO-LOAD LOSS (W) | 5.8 | 8.0 |
| NO-LOAD LOSS PER IRON CORE WEIGHT (W/kg) | 0.149 | 0.197 |
| RATIO OF NO-LOAD LOSS PER IRON CORE WEIGHT | 0.756 | 1.000 |

TABLE 7-continued

| SPECIFICATION OF TRANSFORMER | EXAMPLE 4 | CONVENTIONAL EXAMPLE 1 |
| --- | --- | --- |
| LOAD LOSS (W) | 225 | 225 |
| STANDARD EFFICIENCY VALUE (%) AT OUTPUT POWER EQUIVALENT TO RATED CAPACITY | 97.60 | |
| EFFICIENCY (%) AT OUTPUT POWER EQUIVALENT TO RATED CAPACITY | 97.74 | 97.71 |
| ENERGY CONSUMPTION EFFICIENCY STANDARD VALUE (W) | 60 | |
| ENERGY CONSUMPTION EFFICIENCY (W) | 42 | 44 |
| ENERGY CONSUMPTION EFFICIENCY RATIO | 0.70 | 0.73 |
| IRON CORE WEIGHT (kg) | 40.0 | 40.0 |
| PRIMARY WINDING WEIGHT (kg) | 9.5 | 9.5 |
| SECONDARY WINDING WEIGHT (kg) | 3.7 | 3.7 |
| WEIGHT (kg) OF STRUCTURE MATERIAL OF TRANSFORMER INCLUDING HEAT DISSIPATION FIN | 24.4 | 24.4 |
| INSULATION OIL WEIGHT (kg) | 30.9 | 30.8 |
| MAIN MATERIAL WEIGHT (kg) OF TRANSFORMER | 108.5 | 108.4 |
| RATIO BY WEIGHT OF MAIN MATERIAL OF TRANSFORMER | 1.00 | 1.00 |
| $CO_2$ EMISSION FACTOR (kg/kWh) | 0.490 | |
| ANNUAL $CO_2$ EMISSION (t/YEAR) AT 15% LOAD FACTOR | 0.047 | 0.056 |
| ANNUAL $CO_2$ EMISSION RATE AT 15% LOAD FACTOR | 0.83 | 1.00 |

TABLE 8

| SPECIFICATION OF TRANSFORMER | EXAMPLE 5 | CONVENTIONAL EXAMPLE 2 |
| --- | --- | --- |
| APPLIED STANDARD FOR TRANSFORMER | JIS C 4304: 2013 | |
| RATED CAPACITY (kVA) | 10 | |
| PRIMARY WINDING VOLTAGE (kV) | 6.6 | |
| SECONDARY WINDING VOLTAGE (V) | 210-105 | |
| NUMBER OF PHASE | 1 | |
| FREQUENCY (Hz) | 60 | |
| IRON CORE MATERIAL | 25AMP06-88 (NOMINAL THICKNESS: 0.025 mm, WIDTH: 142.2 mm) | 25AMP08-88 (NOMINAL THICKNESS: 0.025 mm, WIDTH: 142.2 mm) |
| IRON CORE TYPE | SINGLE-PHASE TWO-LEG WOUND IRON CORE | |
| PRIMARY WINDING | φ0.9 mm Cu WIRE 2,776 TURNS | |
| SECONDARY WINDING | 2.6 mm × 6.0 mm Al RECTANGULAR WIRE 2 PARALLEL/88 TURNS | |
| NO-LOAD LOSS (W) | 6.4 | 9.2 |
| NO-LOAD LOSS PER IRON CORE WEIGHT (W/kg) | 0.180 | 0.259 |
| RATIO OF NO-LOAD LOSS PER IRON CORE WEIGHT | 0.696 | 1.900 |
| LOAD LOSS (W) | 204 | 204 |
| STANDARD EFFICIENCY VALUE (%) AT OUTPUT POWER EQUIVALENT TO RATED CAPACITY | 97.68 | |
| EFFICIENCY (%) AT OUTPUT POWER EQUIVALENT TO RATED CAPACITY | 97.93 | 97.90 |
| ENERGY CONSUMPTION EFFICIENCY STANDARD VALUE (W) | 58 | |
| ENERGY CONSUMPTION EFFICIENCY (W) | 39 | 42 |
| ENERGY CONSUMPTION EFFICIENCY RATIO | 0.67 | 0.72 |
| IRON CORE WEIGHT (kg) | 35.5 | 35.5 |
| PRIMARY WINDING WEIGHT (kg) | 8.3 | 8.3 |
| SECONDARY WINDING WEIGHT (kg) | 3.0 | 3.0 |
| WEIGHT (kg) OF STRUCTURE MATERIAL OF TRANSFORMER INCLUDING HEAT DISSIPATION FIN | 23.1 | 23.1 |
| INSULATION OIL WEIGHT (kg) | 28.2 | 28.1 |
| MAIN MATERIAL WEIGHT (kg) OF TRANSFORMER | 98.2 | 98.1 |
| RATIO BY WEIGHT OF MAIN MATERIAL OF TRANSFORMER | 1.00 | 1.00 |
| $CO_2$ EMISSION FACTOR (kg/kWh) | 0.490 | |
| ANNUAL $CO_2$ EMISSION (t/YEAR) AT 15% LOAD FACTOR | 0.047 | 0.059 |
| ANNUAL $CO_2$ EMISSION RATE AT 15% LOAD FACTOR | 0.80 | 1.00 |

TABLE 9

| SPECIFICATION OF TRANSFORMER | EXAMPLE 6 | CONVENTIONAL EXAMPLE 3 |
|---|---|---|
| APPLIED STANDARD FOR TRANSFORMER | JIS C 4304: 2013 | |
| RATED CAPACITY (kVA) | 30 | |
| PRIMARY WINDING VOLTAGE (kV) | 6.6 | |
| SECONDARY WINDING VOLTAGE (V) | 210-105 | |
| NUMBER OF PHASE | 1 | |
| FREQUENCY (Hz) | 50 | |
| IRON CORE MATERIAL | 25AMP06-88 (NOMINAL THICKNESS: 0.025 mm, WIDTH: 213.4 mm) | 25AMP08-88 (NOMINAL THICKNESS: 0.025 mm, WIDTH: 213.4 mm) |
| IRON CORE TYPE | SINGLE-PHASE TWO-LEG WOUND IRON CORE | |
| PRIMARY WINDING | φ1.4 mm Cu WIRE 1,509 TURNS | |
| SECONDARY WINDING | 3.2 mm × 15 mm Al RECTANGULAR WIRE 2 PARALLEL/44 TURNS | |
| NO-LOAD LOSS (W) | 11 | 17 |
| NO-LOAD LOSS PER IRON CORE WEIGHT (W/kg) | 0.126 | 0.197 |
| RATIO OF NO-LOAD LOSS PER IRON CORE WEIGHT | 0.638 | 1.000 |
| LOAD LOSS (W) | 499 | 500 |
| STANDARD EFFICIENCY VALUE (%) AT OUTPUT POWER EQUIVALENT TO RATED CAPACITY | 98.10 | |
| EFFICIENCY (%) AT OUTPUT POWER EQUIVALENT TO RATED CAPACITY | 98.33 | 98.30 |
| ENERGY CONSUMPTION EFFICIENCY STANDARD VALUE (W) | 135 | |
| ENERGY CONSUMPTION EFFICIENCY (W) | 91 | 97 |
| ENERGY CONSUMPTION EFFICIENCY RATIO | 0.67 | 0.72 |
| IRON CORE WEIGHT (kg) | 87.5 | 87.5 |
| PRIMARY WINDING WEIGHT (kg) | 11.5 | 11.5 |
| SECONDARY WINDING WEIGHT (kg) | 7.4 | 7.4 |
| WEIGHT (kg) OF STRUCTURE MATERIAL OF TRANSFORMER INCLUDING HEAT DISSIPATION FIN | 33.9 | 34.1 |
| INSULATION OIL WEIGHT (kg) | 55.2 | 56.0 |
| MAIN MATERIAL WEIGHT (kg) OF TRANSFORMER | 195.4 | 196.4 |
| RATIO BY WEIGHT OF MAIN MATERIAL OF TRANSFORMER | 0.99 | 1.00 |
| $CO_2$ EMISSION FACTOR (kg/kWh) | 0.490 | |
| ANNUAL $CO_2$ EMISSION (t/YEAR) AT 15% LOAD FACTOR | 0.095 | 0.122 |
| ANNUAL $CO_2$ EMISSION RATE AT 15% LOAD FACTOR | 0.78 | 1.00 |

TABLE 10

| SPECIFICATION OF TRANSFORMER | EXAMPLE 7 | CONVENTIONAL EXAMPLE 4 |
|---|---|---|
| APPLIED STANDARD FOR TRANSFORMER | JIS C 4304: 2013 | |
| RATED CAPACITY (kVA) | 30 | |
| PRIMARY WINDING VOLTAGE (kV) | 6.6 | |
| SECONDARY WINDING VOLTAGE (V) | 210-105 | |
| NUMBER OF PHASE | 1 | |
| FREQUENCY (Hz) | 60 | |
| IRON CORE MATERIAL | 25AMP06-88 (NOMINAL THICKNESS: 0.025 mm, WIDTH: 213.4 mm) | 25AMP08-88 (NOMINAL THICKNESS: 0.025 mm, WIDTH: 213.4 mm) |
| IRON CORE TYPE | SINGLE-PHASE TWO-LEG WOUND IRON CORE | |
| PRIMARY WINDING | φ1.3 mm Cu WIRE 1,509 TURNS | |
| SECONDARY WINDING | 4.0 mm × 13 mm Al RECTANGULAR WIRE 2 PARALLEL/44 TURNS | |
| NO-LOAD LOSS (W) | 12 | 19 |
| NO-LOAD LOSS PER IRON CORE WEIGHT (W/kg) | 0.161 | 0.256 |
| RATIO OF NO-LOAD LOSS PER IRON CORE WEIGHT | 0.629 | 1.000 |
| LOAD LOSS (W) | 462 | 463 |
| STANDARD EFFICIENCY VALUE (%) AT OUTPUT POWER EQUIVALENT TO RATED CAPACITY | 98.19 | |
| EFFICIENCY (%) AT OUTPUT POWER EQUIVALENT TO RATED CAPACITY | 98.44 | 98.42 |
| ENERGY CONSUMPTION EFFICIENCY STANDARD VALUE (W) | 130 | |
| ENERGY CONSUMPTION EFFICIENCY (W) | 86 | 93 |
| ENERGY CONSUMPTION EFFICIENCY RATIO | 0.66 | 0.72 |
| IRON CORE WEIGHT (kg) | 74.4 | 74.4 |
| PRIMARY WINDING WEIGHT (kg) | 10.6 | 10.6 |
| SECONDARY WINDING WEIGHT (kg) | 6.9 | 6.9 |
| WEIGHT (kg) OF STRUCTURE MATERIAL OF TRANSFORMER INCLUDING HEAT DISSIPATION FIN | 32.0 | 32.2 |
| INSULATION OIL WEIGHT (kg) | 50.3 | 51.2 |
| MAIN MATERIAL WEIGHT (kg) OF TRANSFORMER | 174.1 | 175.2 |

TABLE 10-continued

| SPECIFICATION OF TRANSFORMER | EXAMPLE 7 | CONVENTIONAL EXAMPLE 4 |
|---|---|---|
| RATIO BY WEIGHT OF MAIN MATERIAL OF TRANSFORMER | 0.99 | 1.00 |
| $CO_2$ EMISSION FACTOR (kg/kWh) | 0.490 | |
| ANNUAL $CO_2$ EMISSION (t/YEAR) AT 15% LOAD FACTOR | 0.096 | 0.127 |
| ANNUAL $CO_2$ EMISSION RATE AT 15% LOAD FACTOR | 0.76 | 1.00 |

TABLE 11

| SPECIFICATION OF TRANSFORMER | EXAMPLE 8 | CONVENTIONAL EXAMPLE 5 |
|---|---|---|
| APPLIED STANDARD FOR TRANSFORMER | JIS C 4304: 2013 | |
| RATED CAPACITY (kVA) | 100 | |
| PRIMARY WINDING VOLTAGE (kV) | 6.6 | |
| SECONDARY WINDING VOLTAGE (V) | 0.21 | |
| NUMBER OF PHASE | 3 | |
| FREQUENCY (Hz) | 50 | |
| IRON CORE MATERIAL | 25AMP06-88 (NOMINAL THICKNESS: 0.025 mm, WIDTH: 213.4 mm) | 25AMP08-88 (NOMINAL THICKNESS: 0.025 mm, WIDTH: 213.4 mm) |
| IRON CORE TYPE | THREE-PHASE THREE-LEG WOUND IRON CORE | |
| PRIMARY WINDING | STAR CONNECTION φ2.2 mm Cu WIRE 653 TURNS | STAR CONNECTION φ2.2 mm Cu WIRE 653 TURNS |
| SECONDARY WINDING | DELTA CONNECTION 0.4 mm × 247 mm Al SHEET 36 TURNS | DELTA CONNECTION 0.4 mm × 248 mm Al SHEET 36 TURNS |
| NO-LOAD LOSS (W) | 43 | 64 |
| NO-LOAD LOSS PER IRON CORE WEIGHT (W/kg) | 0.188 | 0.269 |
| RATIO OF NO-LOAD LOSS PER IRON CORE WEIGHT | 0.699 | 1.000 |
| LOAD LOSS (W) | 1,582 | 1,595 |
| STANDARD EFFICIENCY VALUE (%) AT OUTPUT POWER EQUIVALENT TO RATED CAPACITY | 98.71 | |
| EFFICIENCY (%) AT OUTPUT POWER EQUIVALENT TO RATED CAPACITY | 98.40 | 98.37 |
| ENERGY CONSUMPTION EFFICIENCY STANDARD VALUE (W) | 409 | |
| ENERGY CONSUMPTION EFFICIENCY (W) | 296 | 319 |
| ENERGY CONSUMPTION EFFICIENCY RATIO | 0.72 | 0.78 |
| IRON CORE WEIGHT (kg) | 237 | 237 |
| PRIMARY WINDING WEIGHT (kg) | 66 | 66 |
| SECONDARY WINDING WEIGHT (kg) | 23 | 23 |
| WEIGHT (kg) OF STRUCTURE MATERIAL OF TRANSFORMER INCLUDING HEAT DISSIPATION FIN | 91 | 92 |
| INSULATION OIL WEIGHT (kg) | 118 | 122 |
| MAIN MATERIAL WEIGHT (kg) OF TRANSFORMER | 535 | 541 |
| RATIO BY WEIGHT OF MAIN MATERIAL OF TRANSFORMER | 0.99 | 1.00 |
| $CO_2$ EMISSION FACTOR (kg/kWh) | 0.490 | |
| ANNUAL $CO_2$ EMISSION (t/YEAR) AT 15% LOAD FACTOR | 0.337 | 0.428 |
| ANNUAL $CO_2$ EMISSION RATE AT 15% LOAD FACTOR | 0.79 | 1.00 |

TABLE 12

| SPECIFICATION OF TRANSFORMER | EXAMPLE 9 | CONVENTIONAL EXAMPLE 6 |
|---|---|---|
| APPLIED STANDARD FOR TRANSFORMER | JIS C 4304: 2013 | |
| RATED CAPACITY (kVA) | 100 | |
| PRIMARY WINDING VOLTAGE (kV) | 6.6 | |
| SECONDARY WINDING VOLTAGE (V) | 6.21 | |
| NUMBER OF PHASE | 3 | |
| FREQUENCY (Hz) | 60 | |
| IRON CORE MATERIAL | 25AMP06-88 (NOMINAL THICKNESS: 0.025 mm, WIDTH: 213.4 mm) | 25AMP08-88 (NOMINAL THICKNESS: 0.025 mm, WIDTH: 213.4 mm) |
| IRON CORE TYPE | THREE-PHASE THREE-LEG WOUND IRON CORE | |
| PRIMARY WINDING | STAR CONNECTION φ2.2 mm Cu WIRE 653 TURNS | STAR CONNECTION φ2.2 mm Cu WIRE 653 TURNS |
| SECONDARY WINDING | DELTA CONNECTION 0.4 mm × 247 mm Al SHEET 36 TURNS | DELTA CONNECTION 0.4 mm × 248 mm Al SHEET 36 TURNS |

TABLE 12-continued

| SPECIFICATION OF TRANSFORMER | EXAMPLE 9 | CONVENTIONAL EXAMPLE 6 |
|---|---|---|
| NO-LOAD LOSS (W) | 42 | 63 |
| NO-LOAD LOSS PER IRON CORE WEIGHT (W/kg) | 0.238 | 0.339 |
| RATIO OF NO-LOAD LOSS PER IRON CORE WEIGHT | 0.703 | 1.000 |
| LOAD LOSS (W) | 1,607 | 1,600 |
| STANDARD EFFICIENCY VALUE (%) AT OUTPUT POWER EQUIVALENT TO RATED CAPACITY | 98.71 | |
| EFFICIENCY (%) AT OUTPUT POWER EQUIVALENT TO RATED CAPACITY | 98.38 | 98.36 |
| ENERGY CONSUMPTION EFFICIENCY STANDARD VALUE (W) | 392 | |
| ENERGY CONSUMPTION EFFICIENCY (W) | 299 | 319 |
| ENERGY CONSUMPTION EFFICIENCY RATIO | 0.76 | 0.81 |
| IRON CORE WEIGHT (kg) | 186 | 186 |
| PRIMARY WINDING WEIGHT (kg) | 63 | 63 |
| SECONDARY WINDING WEIGHT (kg) | 19 | 19 |
| WEIGHT (kg) OF STRUCTURE MATERIAL OF TRANSFORMER INCLUDING HEAT DISSIPATION FIN | 85 | 87 |
| INSULATION OIL WEIGHT (kg) | 103 | 106 |
| MAIN MATERIAL WEIGHT (kg) OF TRANSFORMER | 456 | 461 |
| RATIO BY WEIGHT OF MAIN MATERIAL OF TRANSFORMER | 0.99 | 1.00 |
| $CO_2$ EMISSION FACTOR (kg/kWh) | 0.490 | |
| ANNUAL $CO_2$ EMISSION (t/YEAR) AT 15% LOAD FACTOR | 0.336 | 0.425 |
| ANNUAL $CO_2$ EMISSION RATE AT 15% LOAD FACTOR | 0.79 | 1.00 |

TABLE 13

| SPECIFICATION OF TRANSFORMER | EXAMPLE 10 | CONVENTIONAL EXAMPLE 7 |
|---|---|---|
| APPLIED STANDARD FOR TRANSFORMER | JIS C 4304: 2013 | |
| RATED CAPACITY (kVA) | 500 | |
| PRIMARY WINDING VOLTAGE (kV) | 6.6 | |
| SECONDARY WINDING VOLTAGE (V) | 0.21 | |
| NUMBER OF PHASE | 3 | |
| FREQUENCY (Hz) | 50 | |
| IRON CORE MATERIAL | 25AMP06-88 (NOMINAL THICKNESS: 0.025 mm, WIDTH: 213.4 mm) | 25AMP08-88 (NOMINAL THICKNESS: 0.025 mm, WIDTH: 213.4 mm) |
| IRON CORE TYPE | THREE-PHASE THREE-LEG WOUND IRON CORE | |
| PRIMARY WINDING | STAR CONNECTION 3.5 mm × 4.5 mm Cu RECTANGULAR WIRE 399 TURNS | STAR CONNECTION 3.2 mm × 5.0 mm Cu RECTANGULAR WIRE 381 TURNS |
| SECONDARY WINDING | DELTA CONNECTION 1.3 mm × 438 mm Al SHEET 22 TURNS | DELTA CONNECTION 1.4 mm × 383 mm Al SHEET 21 TURNS |
| NO-LOAD LOSS (W) | 100 | 155 |
| NO-LOAD LOSS PER IRON CORE WEIGHT (W/kg) | 0.163 | 0.246 |
| RATIO OF NO-LOAD LOSS PER IRON CORE WEIGHT | 0.665 | 1.000 |
| LOAD LOSS (W) | 6,394 | 6,338 |
| STANDARD EFFICIENCY VALUE (%) AT OUTPUT POWER EQUIVALENT TO RATED CAPACITY | 98.71 | |
| EFFICIENCY (%) AT OUTPUT POWER EQUIVALENT TO RATED CAPACITY | 98.72 | 98.72 |
| ENERGY CONSUMPTION EFFICIENCY STANDARD VALUE(W) | 1,250 | |
| ENERGY CONSUMPTION EFFICIENCY (W) | 1,123 | 1,169 |
| ENERGY CONSUMPTION EFFICIENCY RATIO | 0.90 | 0.93 |
| IRON CORE WEIGHT (kg) | 612 | 629 |
| PRIMARY WINDING WEIGHT (kg) | 208 | 205 |
| SECONDARY WINDING WEIGHT (kg) | 105 | 97 |
| WEIGHT (kg) OF STRUCTURE MATERIAL OF TRANSFORMER INCLUDING HEAT DISSIPATION FIN | 228 | 231 |
| INSULATION OIL WEIGHT (kg) | 361 | 373 |
| MAIN MATERIAL WEIGHT (kg) OF TRANSFORMER | 1,514 | 1,535 |
| RATIO BY WEIGHT OF MAIN MATERIAL OF TRANSFORMER | 0.99 | 1.00 |
| $CO_2$ EMISSION FACTOR (kg/kWh) | 0.490 | |
| ANNUAL $CO_2$ EMISSION (t/YEAR) AT 15% LOAD FACTOR | 1.047 | 1.275 |
| ANNUAL $CO_2$ EMISSION RATE AT 15% LOAD FACTOR | 0.82 | 1.00 |

TABLE 14

| SPECIFICATION OF TRANSFORMER | EXAMPLE 11 | CONVENTIONAL EXAMPLE 8 |
|---|---|---|
| APPLIED STANDARD FOR TRANSFORMER | JIS C 4304: 2013 | |
| RATED CAPACITY (kVA) | 1000 | |
| PRIMARY WINDING VOLTAGE (kV) | 6.6 | |
| SECONDARY WINDING VOLTAGE (V) | 0.21 | |
| NUMBER OF PHASE | 3 | |
| FREQUENCY (Hz) | 50 | |
| IRON CORE MATERIAL | 25AMP06-88 (NOMINAL THICKNESS: 0.025 mm, WIDTH: 213.4 mm) | 25AMP08-88 (NOMINAL THICKNESS: 0.025 mm, WIDTH: 213.4 mm) |
| IRON CORE TYPE | THREE-PHASE FIVE-LEG WOUND IRON CORE | |
| PRIMARY WINDING | STAR CONNECTION 2.8 mm × 7.0 mm Cu RECTANGULAR WIRE 377 TURNS | STAR CONNECTION 2.8 mm × 7.0 mm Cu RECTANGULAR WIRE 377 TURNS |
| SECONDARY WINDING | DELTA CONNECTION 3.0 mm × 305 mm Al SHEET 12 TURNS | DELTA CONNECTION 3.2 mm × 306 mm Al SHEET 12 TURNS |
| NO-LOAD LOSS (W) | 177 | 267 |
| NO-LOAD LOSS PER IRON CORE WEIGHT (W/kg) | 0.179 | 0.269 |
| RATIO OF NO-LOAD LOSS PER IRON CORE WEIGHT | 0.667 | 1.000 |
| LOAD LOSS (W) | 11,055 | 10,761 |
| STANDARD EFFICIENCY VALUE (%) AT OUTPUT POWER EQUIVALENT TO RATED CAPACITY | 98.80 | |
| EFFICIENCY (%) AT OUTPUT POWER EQUIVALENT TO RATED CAPACITY | 98.89 | 98.91 |
| ENERGY CONSUMPTION EFFICIENCY STANDARD VALUE (W) | 2,960 | |
| ENERGY CONSUMPTION EFFICIENCY (W) | 2,941 | 2,958 |
| ENERGY CONSUMPTION EFFICIENCY RATIO | 0.99 | 1.00 |
| IRON CORE WEIGHT (kg) | 986 | 993 |
| PRIMARY WINDING WEIGHT (kg) | 347 | 350 |
| SECONDARY WINDING WEIGHT (kg) | 143 | 154 |
| WEIGHT (kg) OF STRUCTURE MATERIAL OF TRANSFORMER INCLUDING HEAT DISSIPATION FIN | 777 | 779 |
| INSULATION OIL WEIGHT (kg) | 619 | 629 |
| MAIN MATERIAL WEIGHT (kg) OF TRANSFORMER | 2,872 | 2,904 |
| RATIO BY WEIGHT OF MAIN MATERIAL OF TRANSFORMER | 0.99 | 1.00 |
| $CO_2$ EMISSION FACTOR (kg/kWh) | 0.490 | |
| ANNUAL $CO_2$ EMISSION (t/YEAR) AT 15% LOAD FACTOR | 1.827 | 2.186 |
| ANNUAL $CO_2$ EMISSION RATE AT 15% LOAD FACTOR | 0.84 | 1.00 |

The invention claimed is:

1. An Fe-based amorphous alloy ribbon having continuous linear laser irradiation marks on at least one surface,
the linear laser irradiation marks being formed by a CW (continuous wave) oscillation method and arranged along a direction orthogonal to a casting direction of the Fe-based amorphous alloy ribbon,
each linear laser irradiation mark having unevenness on its surface, and a difference HL between a highest point and a lowest point in a thickness direction of the Fe-based amorphous alloy ribbon being 0.25 µm to 2.0 µm when the unevenness is evaluated in the casting direction, and
an iron loss under a condition of a frequency of 60 Hz and a magnetic flux density of 1.45 T being 0.130 W/kg or less.

2. The Fe-based amorphous alloy ribbon according to claim 1, wherein HL×WL calculated from the difference HL between the highest point and the lowest point of the linear laser irradiation mark and a line width WL, which is a length of the linear laser irradiation mark in the casting direction, is 6.0 to 180 µm².

3. The Fe-based amorphous alloy ribbon according to claim 1, wherein the line width WL, which is the length of the linear laser irradiation mark in the casting direction, is 28 µm or more.

4. The Fe-based amorphous alloy ribbon according to claim 1, wherein a line interval, when the line interval is defined as an interval between mutually adjacent linear laser irradiation marks of the linear laser irradiation marks, is 2 mm to 200 mm.

5. The Fe-based amorphous alloy ribbon according to claim 1, wherein a proportion of the length of the linear laser irradiation mark to a total length of the Fe-based amorphous alloy ribbon in a width direction, when the width direction is defined as a direction orthogonal to the casting direction, is in a range from 10% to 50% each in both directions from a midpoint of the Fe-based amorphous alloy ribbon in the width direction towards ends in the width direction.

6. The Fe-based amorphous alloy ribbon according to claim 1, wherein a portion where the linear laser irradiation marks are formed is non-crystalline.

7. The Fe-based amorphous alloy ribbon according to claim 1, having a free solidified surface and a roll surface, wherein a maximum cross-sectional height Rt on the free solidified surface, except for a portion where the linear laser irradiation marks are formed, is 3.0 µm or less.

8. The Fe-based amorphous alloy ribbon according to claim 1, wherein an alloy composition of the Fe-based amorphous alloy ribbon consists of Fe, Si, B, and an impurity, and a content of Fe is 78 atom % or more, a content of B is 10 atom % or more, and a total content of B and Si is 17 atom % to 22 atom % when a total content of Fe, Si, and B is 100 atom %.

9. The Fe-based amorphous alloy ribbon according to claim 1, having a thickness of 18 µm to 35 µm.

10. The Fe-based amorphous alloy ribbon according to claim 1, having an iron loss of 8.6 W/kg or less and an exciting power VA of 8.7 VA/kg or less under a condition of a frequency of 1 kHz and a magnetic flux density of 1 T.

11. The Fe-based amorphous alloy ribbon according to claim 1, wherein a coercive force Hc of a DC B-H loop measured at a maximum applied magnetic field of 800 A/m is 5.0 A/m or less.

12. The Fe-based amorphous alloy ribbon according to claim 11, wherein a square ratio [residual magnetic flux density Br/maximum magnetic flux density Bm] of the DC B-H loop measured at the maximum applied magnetic field of 800 A/m is 40% or less.

13. An iron core formed by layering Fe-based amorphous alloy ribbons according to claim 1, or by winding at least one Fe-based amorphous alloy ribbon according to claim 1.

14. The iron core according to claim 13 formed by bending and winding, in an overlapping manner, the Fe-based amorphous alloy ribbons layered, wherein
the iron core has an iron loss of 0.240 W/kg or less under a condition of a frequency of 60 Hz and a magnetic flux density of 1.45 T.

15. A transformer comprising:
an iron core that is formed using an Fe-based amorphous alloy ribbon according to claim 1; and
a coil wound around the iron core.

16. The transformer according to claim 15, wherein the iron core is formed by bending and winding, in an overlapping manner, the Fe-based amorphous alloy ribbons layered, and has an iron loss of 0.240 W/kg or less under a condition of a frequency of 60 Hz and a magnetic flux density of 1.45 T.

17. The transformer according to claim 15, wherein the transformer is a single phase transformer, and a no-load loss per weight of the iron core at 50 Hz is 0.15 W/kg or less, or a no-load loss per weight of the iron core at 60 Hz is 0.19 W/kg or less.

18. The transformer according to claim 15, wherein the transformer is a three-phase transformer, and a no-load loss per weight of the iron core at 50 Hz is 0.19 W/kg or less, or a no-load loss per weight of the iron core at 60 Hz is 0.24 W/kg or less.

19. The transformer according to claim 15, having a rated capacity of 10 kVA or more.

* * * * *